(12) United States Patent
Carter et al.

(10) Patent No.: US 11,208,134 B2
(45) Date of Patent: Dec. 28, 2021

(54) MONITORING SYSTEM CAPABLE OF CLASSIFYING ITEMS ADDED TO A SHOPPING CART

(71) Applicant: Gatekeeper Systems, Inc., Foothill Ranch, CA (US)

(72) Inventors: Scott J. Carter, Seal Beach, CA (US); Narayanan V. Ramanathan, Lake Forest, CA (US); Stephen E. Hannah, Placentia, CA (US); Jesse M. James, Santa Ana, CA (US)

(73) Assignee: Gatekeeper Systems, Inc., Foothill Ranch, CA (US)

( * ) Notice: Subject to any disclaimer, the term of this patent is extended or adjusted under 35 U.S.C. 154(b) by 0 days.

(21) Appl. No.: 17/196,843

(22) Filed: Mar. 9, 2021

(65) Prior Publication Data

US 2021/0287013 A1    Sep. 16, 2021

Related U.S. Application Data

(60) Provisional application No. 62/988,174, filed on Mar. 11, 2020.

(51) Int. Cl.
*B62B 5/04*    (2006.01)
*G06Q 20/40*   (2012.01)
(Continued)

(52) U.S. Cl.
CPC ........ *B62B 5/0423* (2013.01); *G06K 9/00624* (2013.01); *G06K 9/00771* (2013.01);
(Continued)

(58) Field of Classification Search
CPC .................. G06K 9/00771; G06Q 20/203
(Continued)

(56) References Cited

U.S. PATENT DOCUMENTS 5,881,846 A    3/1999  French et al.
5,883,968 A    3/1999  Welch et al.
(Continued)

FOREIGN PATENT DOCUMENTS

WO    WO 2020/051359 A1    3/2020
WO    WO 2021/183606 A1    9/2021

OTHER PUBLICATIONS

Abdellatif Abdelfattah, "Image Classification Using Deep Neural Networks—A Beginner Friendly Approach using TensorFlow", https://medium.com/@tifa2up/image-classification-using-deep-neural-networks-a-beginner-friendly-approach-using-tensorflow-94b0a090ccd4, accessed online on Jul. 10, 2018, in 13 pages.

(Continued)

*Primary Examiner* — Jeffery A Williams
(74) *Attorney, Agent, or Firm* — Knobbe, Martens, Olson & Bear, LLP

(57)    ABSTRACT

A system for monitoring shopping carts uses cameras to generate images of the carts moving in a store. In some implementations, cameras may additionally or alternatively be mounted to the shopping carts and configured to image cart contents. The system may use the collected image data, and/or other types of sensor data (such as the store location at which an item was added to the basket), to classify items detected in the shopping carts. For example, a trained machine learning model may classify item in a cart as "non-merchandise," "high theft risk merchandise," "electronics merchandise," etc. When a shopping cart approaches a store exit without any indication of an associated payment transaction, the system may use the associated item classification data, optionally in combination with other data such as cart path data, to determine whether to execute an anti-theft action, such as locking a cart wheel or activating a store alarm. The system may also compare the classifica- (Continued)

tions of cart contents to payment transaction records (or summaries thereof) to, e.g., detect underpayment events.

36 Claims, 27 Drawing Sheets

(51) Int. Cl.
*G06N 20/00* (2019.01)
*G06K 9/62* (2006.01)
*G06K 9/00* (2006.01)
*G06Q 20/20* (2012.01)
*G06T 7/20* (2017.01)
*H04N 5/225* (2006.01)
*H04N 7/18* (2006.01)

(52) U.S. Cl.
CPC ......... *G06K 9/6201* (2013.01); *G06K 9/6217* (2013.01); *G06K 9/6256* (2013.01); *G06K 9/6267* (2013.01); *G06N 20/00* (2019.01); *G06Q 20/203* (2013.01); *G06Q 20/4015* (2020.05); *G06T 7/20* (2013.01); *H04N 5/2253* (2013.01); *H04N 7/18* (2013.01); *G06T 2207/10016* (2013.01); *G06T 2207/10048* (2013.01); *G06T 2207/30232* (2013.01)

(58) Field of Classification Search
USPC ....................................................... 348/150
See application file for complete search history.

(56) References Cited

U.S. PATENT DOCUMENTS

| | | | |
|---|---|---|---|
| 6,127,927 A | 10/2000 | Durban et al. | |
| 6,362,728 B1 | 3/2002 | Lace et al. | |
| 6,945,366 B2 | 9/2005 | Taba | |
| 7,416,117 B1 | 8/2008 | Morrison | |
| 7,420,461 B2 | 9/2008 | Nebolon et al. | |
| 7,944,368 B2 | 5/2011 | Carter et al. | |
| 8,046,160 B2 | 10/2011 | Carter et al. | |
| 8,132,725 B2 | 3/2012 | Kundu et al. | |
| 8,463,540 B2 | 6/2013 | Hannah et al. | |
| 8,558,698 B1 | 10/2013 | Hannah et al. | |
| 8,602,176 B2 | 12/2013 | Khuu et al. | |
| 8,820,447 B2 | 9/2014 | Carter et al. | |
| 9,403,548 B2 | 8/2016 | Hannah et al. | |
| 9,473,747 B2 | 10/2016 | Kobres et al. | |
| 9,606,238 B2 | 3/2017 | Carter et al. | |
| 9,637,151 B2 | 5/2017 | Hannah et al. | |
| 9,702,707 B2 | 7/2017 | Goldman et al. | |
| 9,731,744 B2 | 8/2017 | Carter et al. | |
| 9,963,162 B1 | 5/2018 | Hannah et al. | |
| 10,023,216 B2 | 7/2018 | Hannah et al. | |
| 10,129,507 B2 | 11/2018 | Landers, Jr. et al. | |
| 10,579,875 B2 | 3/2020 | Dal Mutto et al. | |
| 10,614,514 B2 | 4/2020 | Glaser et al. | |
| 10,740,742 B2 | 8/2020 | Glaser et al. | |
| 2007/0197229 A1 | 8/2007 | Kalliola et al. | |
| 2007/0242856 A1 | 10/2007 | Suzuki et al. | |
| 2009/0268941 A1 | 10/2009 | French et al. | |
| 2010/0259450 A1 | 10/2010 | Kainulainen et al. | |
| 2011/0208613 A1 | 8/2011 | Parham | |
| 2014/0125019 A1 | 5/2014 | Hannah et al. | |
| 2015/0029339 A1 | 1/2015 | Kobres et al. | |
| 2015/0206121 A1 | 7/2015 | Joseph et al. | |
| 2016/0332653 A1 | 11/2016 | Hannah et al. | |
| 2017/0311120 A1 | 10/2017 | Hannah et al. | |
| 2017/0323376 A1* | 11/2017 | Glaser | G06Q 20/203 |
| 2017/0327142 A1 | 11/2017 | Hannah et al. | |
| 2017/0357939 A1 | 12/2017 | Jones et al. | |
| 2018/0077532 A1 | 3/2018 | Wulff | |
| 2018/0197218 A1* | 7/2018 | Mallesan | G06K 9/00771 |
| 2018/0218351 A1* | 8/2018 | Chaubard | H04N 7/181 |
| 2018/0240180 A1 | 8/2018 | Glaser et al. | |
| 2018/0257688 A1 | 9/2018 | Carter et al. | |
| 2019/0057435 A1 | 2/2019 | Chomley et al. | |
| 2019/0236531 A1 | 8/2019 | Adato et al. | |
| 2019/0256334 A1 | 8/2019 | High et al. | |
| 2019/0294932 A1* | 9/2019 | Rodriguez | G06K 9/00993 |
| 2020/0034812 A1 | 1/2020 | Nemati et al. | |
| 2020/0079412 A1 | 3/2020 | Ramanathan et al. | |
| 2020/0118400 A1 | 4/2020 | Zalewski et al. | |
| 2021/0042762 A1 | 2/2021 | Budano et al. | |
| 2021/0284223 A1 | 9/2021 | Carter et al. | |

OTHER PUBLICATIONS

Analog Devices, "Analog Devices Time of Flight (ToF)", https://www.analog.com/en/applications/technology/3d-time-of-flight.html, accessed online on Aug. 27, 2019, in 6 pages.

Analog Devices, "CCD TOF Signal Processor with Programmable Timing and V-Driver Data Sheet", 2018, accessed online on Aug. 27, 2019, in 2 pages.

Analog Devices Wiki, "3D Time of Flight Rapid Prototyping Platform", Aug. 30, 2019, https://wiki.analog.com/resources/eval/user-guides/ad-96tof1-ebz, in 5 pages.

Wolfgang Beyer, "How to Build a Simple Image Recognition System with TensorFlow (Part 1)", Dec. 5, 2016, https://www.wolfib.com/Image-Recognition-Intro-Part-1/, accessed online on Jul. 10, 2018, in 16 pages.

Ronan Collobert et al., "Torch: A Modular Machine Learning Software Library", IDIAP Research Report, Oct. 30, 2002, in 9 pages.

Gatekeeper Systems, "Purchek®—Your Edge in the Battle Against Pushout Theft", Jan. 16, 2018, in 2 pages.

Google LLC, "Dev Board", 2019, https://coral.withgoogle.com/products/dev-board/, accessed online on Aug. 26, 2019, in 4 pages.

PyTorch, "About PyTorch", https://pytorch.org/about/, accessed online on Jul. 30, 2018, in 4 pages.

Smart Radar System, "Retina 4D Image Radar", www.smartradarsystem.com/GB/sub/product.html, accessed online on Sep. 4, 2019, in 5 pages.

Tensorflow, "Image Recognition", https://www.tensorflow.com.org/tutorials/image_recognition, accessed online on Jul. 10, 2018, in 11 pages.

Tensorflow, "How to Retrain an Image Classifier for New Categories", https://www.tensorflow.org/tutorials/image_retraining, accessed online on Jul. 10, 2018, in 11 pages.

Wikipedia, "TensorFlow", https://en.wikipedia.org/wiki/TensorFlow, accessed online on Jul. 10, 2018, in 5 pages.

Invitation to Pay Additional Search Fee in International Patent Application No. PCT/US2019/049788, dated Nov. 4, 2019, in 2 pages.

International Search Report and Written Opinion in corresponding International Patent Application No. PCT/US2019/049788, dated Jan. 13, 2020, in 12 pages.

Invitation to Pay Additional Fees in corresponding International Patent Application No. PCT/US2021/021640, dated May 13, 2021, in 2 pages.

International Search Report and Written Opinion dated Jul. 28, 2021, in corresponding International Patent Application No. PCT/US2021/021640, in 24 pages.

* cited by examiner

| Cart RF ID #1 | |
|---|---|
| Front wheel | Back wheel |
| Timestamp fr1 | Timestamp bk1 |
| Timestamp fr2 | Timestamp bk2 |
| Timestamp fr3 | Timestamp bk3 |

| Cart image track A |
|---|
| Metadata for track A |
| Location/heading/timestamp A1 |
| Location/heading/timestamp A2 |
| Location/heading/timestamp A3 |
| Location/heading/timestamp A4 |
| Location/heading/timestamp A5 |

| Cart RF ID #2 | |
|---|---|
| Front wheel | Back wheel |
| Timestamp fr1 | Timestamp bk1 |
| Timestamp fr2 | Timestamp bk2 |
| Timestamp fr3 | |
| Timestamp fr4 | |

| Cart image track B |
|---|
| Metadata for track B |
| Location/heading/timestamp B1 |
| Location/heading/timestamp B2 |
| Location/heading/timestamp B3 |
| Location/heading/timestamp B4 |

More rotations on front wheel => cart RF ID #2 is turning

| Cart RF ID #3 | |
|---|---|
| Front wheel | Back wheel |
| Timestamp fr1 | Timestamp bk1 |
| Timestamp fr2 | Timestamp bk2 |
| Timestamp fr3 | Timestamp bk3 |
| Timestamp fr4 | Timestamp bk4 |

| Cart image track C |
|---|
| Metadata for track C |
| Location/heading/timestamp C1 |
| Location/heading/timestamp C2 |
| Location/heading/timestamp C3 |
| Location/heading/timestamp C4 |

| Cart RF ID | Track ID | | |
|---|---|---|---|
| | #A | #B | #C |
| #1 | 1% | 65% | 2% |
| #2 | 88% | 9% | 1% |
| #3 | 1% | 1% | 2% |

*FIG. 16*

MONITORING SYSTEM CAPABLE OF CLASSIFYING ITEMS ADDED TO A SHOPPING CART

PRIORITY CLAIM

This application claims the benefit of U.S. Provisional Appl. No. 62/988,174, filed Mar. 11, 2020, the disclosure of which is hereby incorporated by reference.

BACKGROUND

Field

The disclosure generally relates to systems and methods for tracking the movement and status of movable shopping baskets, including but not limited to motorized and non-motorized (e.g., human-propelled) shopping carts and handheld shopping baskets, using computer vision and machine learning techniques.

Description of the Related Art

Containment systems exist for deterring the theft of shopping carts. Typically, these systems include a wire that is embedded in the pavement of a store parking lot to define an outer boundary of area in which shopping cart use is permitted. When a shopping cart is pushed over this wire, a sensor in or near one of the wheels detects an electromagnetic signal generated via the wire, causing a brake mechanism in the wheel to be activated to lock or inhibit rotation of the wheel. To unlock the wheel, an attendant typically uses a handheld remote control to send an unlock signal to the wheel. There are challenges associated with some such containment systems.

SUMMARY

A system for monitoring shopping baskets (e.g., baskets on human-propelled carts, motorized shopping or mobility carts, or hand-carried baskets) can include a computer vision unit that can image a surveillance region (e.g., an exit to a store), determine whether a basket is empty or loaded with merchandise, and assess a potential for theft of the merchandise. The computer vision unit can include a camera and (optionally) an image processor programmed to execute a computer vision algorithm to identify shopping baskets in the image and to determine a load status of the basket. The load status can include, for example, a semantic classifier (e.g., full, partially full, empty), a numerical value indicative of an estimate for the amount of merchandise in the basket (e.g., a range from 1 to 5 where 1 is empty and 5 is full), a score (which may weight an amount of merchandise and a value for the merchandise), and so forth. The image processor can be disposed apart from the computer vision unit in some implementations.

The computer vision algorithm can comprise a neural network. The system can identify a shopping basket that is exiting the store, determine a load status (e.g., at least partially loaded), determine that there are no indicia of the customer having paid for the merchandise, and execute an anti-theft action, e.g., actuate an audible or visual alarm, notify store personnel, activate a store surveillance system, activate an anti-theft device associated with the basket (e.g., a locking shopping cart wheel), activate an external anti-theft device such as a remote-controlled locking gate, etc.

The systems and methods disclosed herein can be applied in a variety of applications including but not limited to retail shopping stores (e.g., supermarkets or big box retailers). Such systems and methods can be applied to tracking baskets or carts in both indoor and outdoor settings and in, e.g., retail, transportation (e.g., airport, train, subway, bus depots), medical (e.g., hospital or clinic), or warehouse settings. Such systems and methods can be used in applications where it may be desirable to identify whether a cart, trolley, basket or the like is at least partially loaded with goods or objects.

Details of one or more implementations of the subject matter described in this specification are set forth in the accompanying drawings and the description below. Other features, aspects, and advantages will become apparent from the description, the drawings, and the claims. Neither this summary nor the following detailed descriptions purport to define or limit the scope of the inventive subject matter.

BRIEF DESCRIPTION OF THE DRAWINGS

In FIG. 1A, a cart full of merchandise is attempting to exit a store, and an anti-theft action is performed to prevent the theft of merchandise (e.g., a wheel of the cart is locked or an alarm is activated). In FIG. 1B, the cart is empty and an anti-theft action is not taken.

FIG. 16 illustrates example datasets that may be maintained and used in the process of FIG. 15.

Figure 1A:
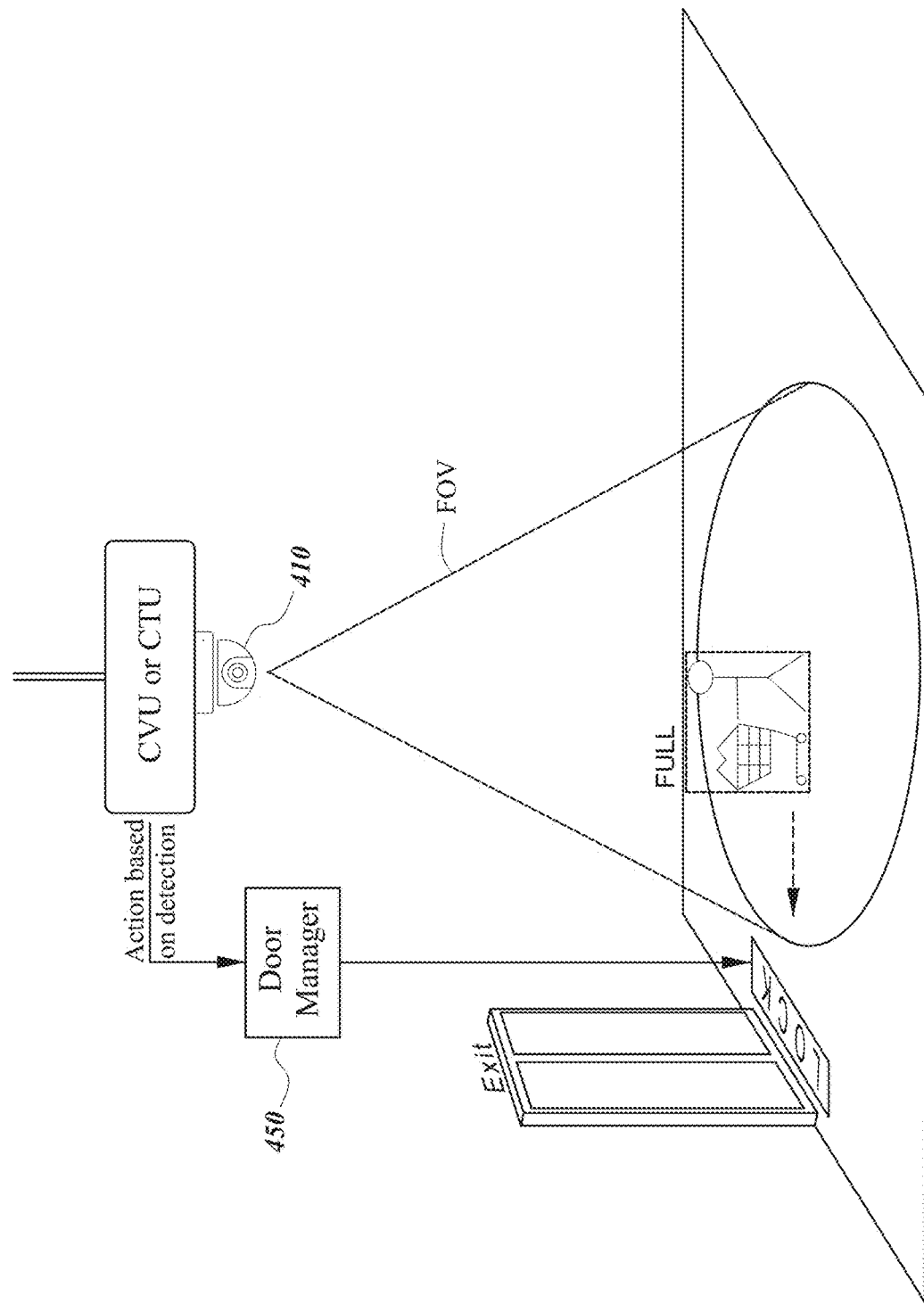
FIGS. 1A and 1B schematically illustrate example functioning of a cart containment system.

Throughout the drawings, reference numbers may be re-used to indicate correspondence between referenced elements. The drawings are provided to illustrate examples of implementations described herein and are not intended to limit the scope of the disclosure.

DETAILED DESCRIPTION OF SPECIFIC EMBODIMENTS

Overview

While existing cart containment systems are useful for deterring theft of a shopping cart, some such systems may not be capable of detecting other types of shopping-related misuse. For example, a thief may push a shopping cart that is at least partially loaded with groceries or merchandise out of a store without paying for the groceries or merchandise (such theft is sometimes called "pushout" theft). Cart containment systems may have no (or only limited) ability to determine whether a shopping cart pushed out of a store is empty (in which case there is no or only a limited threat of merchandise theft) or loaded with merchandise (in which case there may be a substantial threat of merchandise theft). If the cart containment system is triggered every time a cart leaves a store (whether loaded or unloaded), many false alarms can result, because the system will be triggered even when empty carts exit the store.

False alarms may be reduced by determining whether a shopping cart passed through an active store checkout lane prior to attempting to exit the store. If so, it may be likely the shopper purchased the merchandise, and the cart containment system may be configured not to trigger in such cases. If the cart did not pass through an active store checkout lane (or was present in the lane for an insufficient time to actually pay), the cart containment system may be configured to trigger upon exit. However, even in such situations, false alarms can still result, because the shopper may be pushing an empty cart back outside the store for some non-theft reason (for example, to pick a different cart (e.g., one with a less chattery cart wheel), to return to a parked car to retrieve grocery bags or a shopping list, etc.). Containment systems that detect cart passage through active checkout lanes may require installation of specific hardware in each checkout lane to detect the passage, path, speed, distance traveled, dwell time, etc. of the cart in the checkout lane. Such hardware can add expense to these installations. Further, this approach may have significant limitations for retail stores that have implemented mobile payment systems, where a shopper is not required to pass through a fixed checkout lane to pay, but rather can use a mobile application (e.g., on the shopper's smart phone) to pay for the merchandise.

While merchandise theft can often be detected using an Electronic Article Surveillance (EAS) system (e.g., comprising EAS towers at the store exits), the cost and burden of attaching EAS tags to merchandise items is often impractical (particularly in a grocery store context).

The retail store may wish to identify whether a shopping cart that is approaching an exit is at least partially loaded with goods from the store (e.g., groceries, health care products, liquor, etc.) and if so, whether the cart has previously passed through a checkout lane or the shopper has paid via mobile payment. The cart containment system can use cameras installed in the store (and/or cameras mounted to the shopping carts) to image shopping cart baskets and can use computer vision and machine learning techniques to analyze the images to determine whether, e.g., the cart basket is empty (e.g. a lower threat of theft situation) or at least partially loaded with merchandise (e.g. a higher threat of theft situation). The images can be still images or one or more frames from a video. In some embodiments, the system may also use the images to classify or identify the items in the basket; for example, a detected item can be classified as merchandise versus non-merchandise, or can be classified in terms of whether it is a high-theft-risk merchandise item. The system may also take cart location data into consideration in classifying the items; for example, the system may refrain from (or lower the probability of) classifying a detected item as an electronics item if the cart does not enter the store's electronics department.

If the system detects that an at least partially loaded cart is attempting to exit the store without any sufficient indicia that the goods have been paid for, the cart containment system can be triggered to perform an anti-theft action (e.g., braking or locking a wheel of the cart to inhibit its movement, displaying an alert or message to the shopper to return to the store, activating a store video surveillance system or alarm, notifying store security personnel, etc.). In embodiments in which the system classifies items detected in the cart, such classifications may also be considered in determining whether to perform an anti-theft action and/or what type of anti-theft action to perform. For example, the system may score a given cart in terms of its likelihood of containing a high theft risk item, the value of merchandise contained in the cart, etc., and consider such score(s) in determining whether to perform a particular anti-theft action.

Figure 1B:
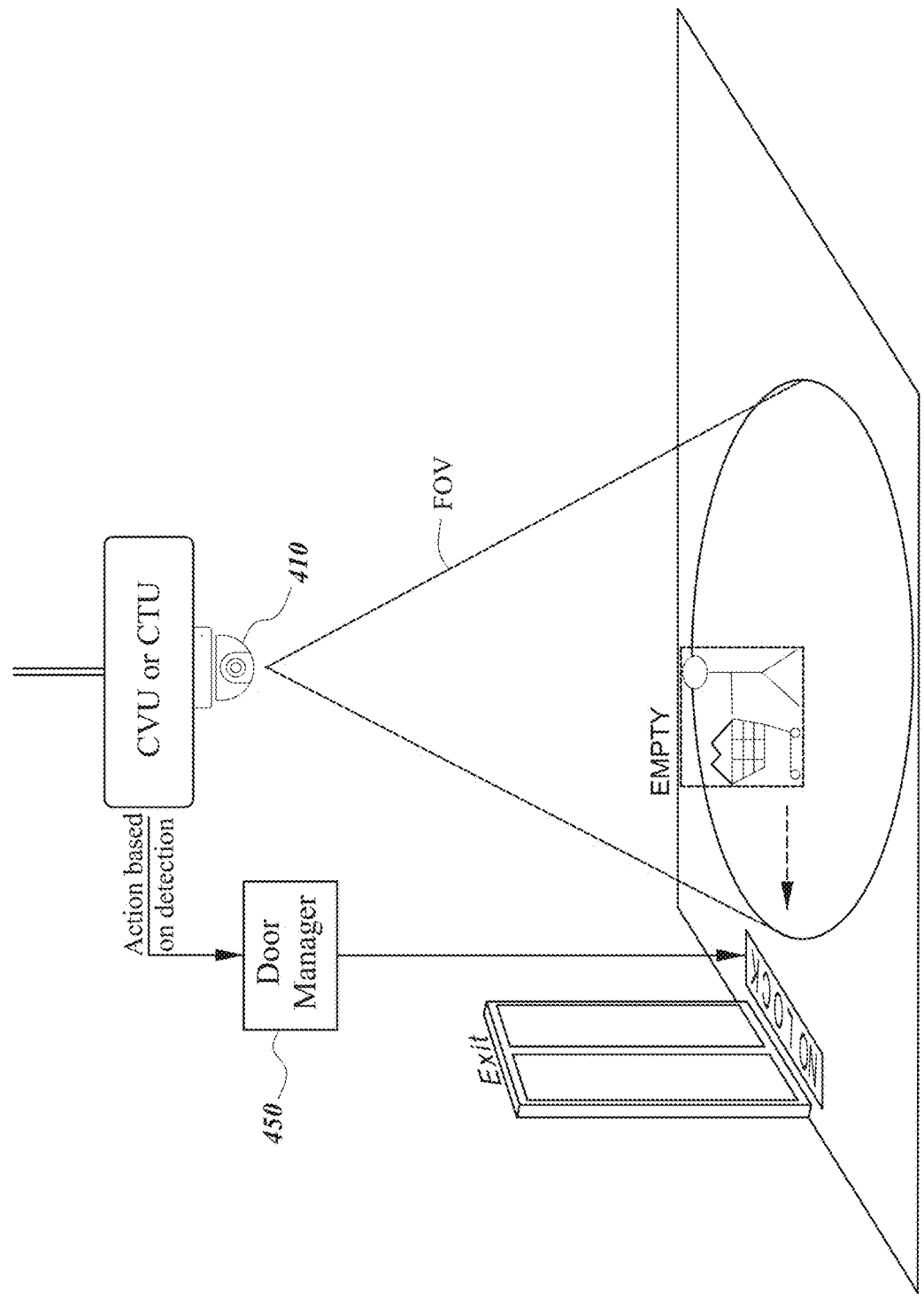

FIGS. 1A and 1B schematically illustrate example functioning of a cart containment system. The features shown in FIGS. 1A and 1B will be further described below (see, e.g., FIGS. 1C, 4A, and 4B). In FIG. 1A, a computer vision unit (CVU) or a cart transceiver unit (CTU) includes a camera 410 that can image a region of the store near the exit to the store. The region of the store is within the field of view (FOV) of the camera 410. The CVU or the CTU may perform (or communicate to another system to perform) computer vision analysis of the images from the camera 410. The computer vision analysis can determine a load status of the cart such as, e.g., whether a shopping cart is empty, at least partially loaded with merchandise, full of merchandise, etc. The CVU or CTU can be in communication with a door manager 450 that controls anti-theft functioning of the cart containment system. An example of a door manager 450 is the Purchek® pushout prevention system available from Gatekeeper Systems, Inc. (Foothill Ranch, Calif.) and described, for example, in U.S. Pat. Nos. 8,463,540; 9,731,744; and 10,232,869; each of which is hereby incorporated by reference herein in its entirety for all it discloses. Other examples of door managers and anti-theft systems are described in U.S. Pat. No. 5,881,846 or 7,420,461; each of which is hereby incorporated by reference herein in its entirety for all it discloses.

If, as shown in FIG. 1A, a cart at least partially loaded with merchandise is approaching the store exit without indicia of having paid for the merchandise, the CVU or CTU may communicate to the door manager 450 a signal to activate an anti-theft function (e.g., lock or brake one of the cart's wheels, sound an alarm, activate a store surveillance system, etc.). If instead, as shown in FIG. 1B, the shopping cart is substantially empty of merchandise, then there is a low risk of theft, and the CVU or CTU may take no action or communicate to the door manager 450 a signal not to take an anti-theft action. As mentioned above, the determination of whether to take an anti-theft action may also depend on the types or identities of items detected in the cart.

Accordingly, the example cart containment system of FIGS. 1A and 1B can advantageously reduce or prevent theft of merchandise from the store, while reducing or preventing occurrence of false alarms where an empty cart is being pushed out of the store for some reason (e.g., to exchange the cart for another cart, to return to the shopper's car to retrieve shopping bags or a shopping list, etc.). Also, the system can, in some implementations, limit anti-theft actions to scenarios in which expensive or high-theft-risk merchandise is detected in the cart.

In some implementations, a separate door manager 450 is not utilized and the CVU communicates an anti-theft signal to the shopping basket, the shopping cart, or a store surveillance system.

Although many shoppers use a shopping cart in retail stores, the computer vision techniques described herein are not limited to shopping carts and can apply to any movable shopping basket, including a human-propelled shopping cart, a motorized mobility cart having a basket, or a handheld shopping basket carried by a shopper. Moreover, these computer vision techniques are not limited to retail applications and can be applied to determine whether other types of carts are loaded with goods, objects, or merchandise, for example, a warehouse, industrial, or utility cart, a luggage or baggage cart, a medical, hospital, or pharmacy cart, a wheelchair, stroller, or hospital bed, and so forth.

The following describes various examples and implementations. These examples and implementations are intended to illustrate the scope of the disclosure and are not intended to be limiting.

Example Retail Store Scenario

Figure 1C:
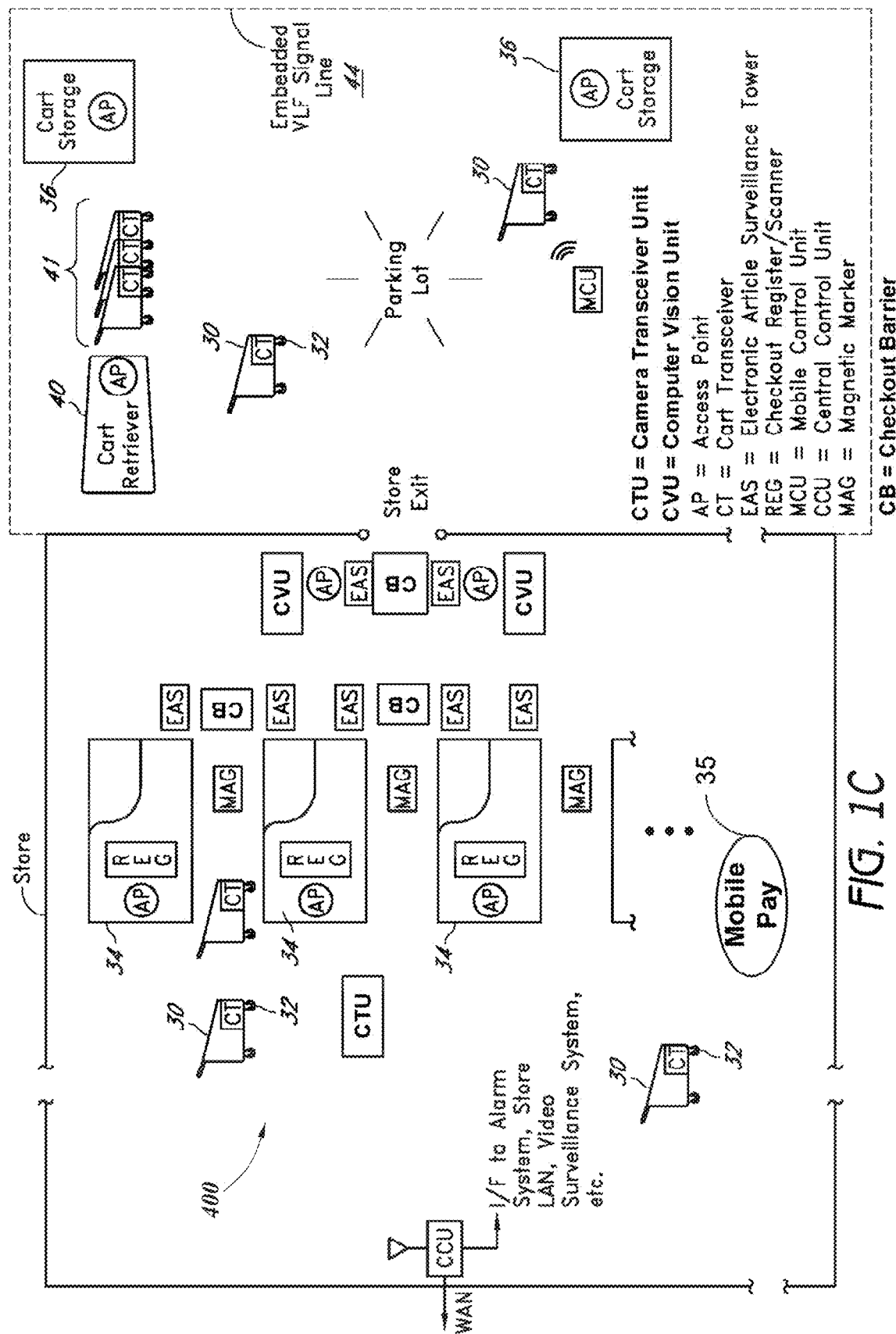
FIG. 1C illustrates various types of anti-theft system components that may be deployed in and around a store for purposes of tracking movable shopping baskets such as, e.g., motorized and non-motorized (e.g., human-propelled) shopping carts, handheld shopping baskets, and motorized mobility carts. A computer vision unit (CVU) or a camera transceiver unit (CTU) can be used to image movable shopping baskets, e.g., to determine if they are empty or at least partially loaded with merchandise.

FIG. 1C illustrates an example of an anti-theft system 400. The anti-theft system is shown deployed in a store for purposes of tracking or controlling the movement of shopping carts 30 and preventing theft of merchandise in the carts. However, the inventive components and methods of the anti-theft system may be used for other applications, such as tracking luggage carts in an airport or carts in a warehouse.

The system includes a set of cart transceivers (CTs) that communicate bi-directionally with a set of wireless access points (APs) to create two-way radio frequency (RF) communications links with the shopping carts 30. In one example, each cart transceiver (CT) is fully contained within one of the standard-size (e.g., 5-inch diameter) wheels 32 (typically a front wheel) of a respective shopping cart 30, together with a braking unit that can be actuated by the cart transceiver to lock the wheel. Examples of a braking unit that may be used for this purpose are described in U.S. Pat. Nos. 6,362,728, 8,820,447, or U.S. Pat. No. 8,602,176, or U.S. Pat. No. 8,973,716; each of which is hereby incorporated by reference herein in its entirety. (For purposes of this detailed description, the term "cart transceiver" refers collectively to the cart's RF transceiver and the associated sensor circuitry). Alternatively, a progressive or partial braking unit may be used that is additionally capable of inhibiting the wheel's rotation without placing the wheel in a locked state.

Some of the circuitry of the cart transceivers (CTs) may alternatively be provided elsewhere on the shopping carts 30. For example, as described below, some or all of the transceiver circuitry may alternatively be included in a display unit that attaches to the shopping cart's handle or the front of the cart, or in a camera module mounted to the cart (as shown in FIGS. 2C-2E). As another example, some or all of the circuitry, including sensor circuitry, could be housed in the wheel assembly (e.g., in the wheel's caster or fork) without being included in the wheel itself or in the handlebar or frame of the cart. A CT can be included in the frame or body of a motorized mobility cart. A CT is not limited to use on carts and can be attached to a handheld shopping basket (e.g., on a side or bottom of the basket or in the handle).

The access points (APs) are generally responsible for communicating with the cart transceivers (CTs) for purposes of retrieving and generating cart status information, including information indicative or reflective of cart location. The types of cart status information that may be retrieved and monitored include, for example, whether the wheel 32 is in a locked versus unlocked state, whether the cart is moving; the wheel's average rotation speed (as may be sensed using a rotation sensor in the wheel 32); whether the cart has detected a particular type of location-dependent signal such as a VLF, EAS or magnetic signal (discussed below); whether the wheel 32 is skidding; the CT's battery level and a general wheel "health"; and the number of lock/unlock cycles experienced by the cart since some reference time. In some examples, the cart may include sensors that can determine whether its shopping basket is at least partially loaded (e.g., by analyzing vibration data of the cart) and the CT may communicate a load status (e.g., empty, partially loaded, fully loaded) to the AP. (The term "wheel 32" is used herein to refer specifically to a wheel that includes electronics as described herein, as opposed to the other wheels of the shopping cart.) The access points (APs) are also capable of generating and/or relaying commands to the cart transceivers (CTs), including lock and unlock commands (or other types of anti-theft commands) that are sent to specific shopping carts.

In the example shown in FIG. 1C, all of the access points (APs) communicate wirelessly with a central control unit (CCU), either directly or via intermediate access points. The central control unit may be implemented as a desktop computer or hardware server that includes a wireless transceiver card or which is wire-connected to an external transceiver unit. The CCU is generally responsible for collecting, storing and analyzing cart status information, including location information, gathered by the access points (APs). In addition to the data retrieved from the cart transceivers (CTs), the CCU may collect data generated by the access points, such as signal strength measurements of detected cart transmissions. Some or all of the collected data is preferably stored by the CCU together with associated event timestamps.

The system shown in FIG. 1C can include one or more computer vision units (CVUs), for example, the CVU 1000 described with reference to FIGS. 4A and 4B. The CVU may include a camera (still camera or video camera), an image processor, and a transceiver configured to communicate with APs or the CCU or CTs. As further described below, the CVU (alone or in combination with the CCU or an AP) can analyze images (taken by the camera) of shopping baskets to determine a load status of the basket, e.g., empty, partially loaded, or fully loaded. CVUs can be placed near store entrance/exits (e.g., to image incoming or outgoing shopping baskets), checkout stations 34 (e.g., to image shopping baskets in the checkout lanes), or other areas of the retail store (e.g., in areas where high value items are kept). In some examples, the CVU 1000 comprises a camera transceiver unit (CTU), which may include a subset of less than all the components of the CVU. For example, a CTU may include a camera and an RF transceiver (or wired Ethernet connection) and not include the image processor. An installation can include any number of CVUs or CTUs. In some implementations, use of CTUs is more cost effective (since each unit does not include an image processor) and the image processing functionality is off-loaded to the CCU (or a primary CVU). The choice of whether to use, and the corresponding placement of, a CVU or a CTU will depend on the particulars of the installation in any particular retail store (e.g., location or number of exits/entrances, location or number of checkout lanes, physical size or layout of the store interior, volume of customers, presence or location of high value goods, etc.). For example, an installation may primarily or exclusively use CTUs and offload the image processing to a single CVU or the CCU. However, another installation may primarily use CVUs. Yet another installation may utilize CVUs in areas where high-value goods are stored so that the image processing can be performed locally and utilize CTUs in other areas of the store. Many installation options are possible to suit the needs of a particular retail store.

In embodiments in which camera modules are mounted to the shopping carts, the CVU(s) or a CCU may additionally or alternatively analyze images generated by the cart-mounted cameras. In some implementations, these cart-mounted camera modules may be the only source of image data within the system (e.g., the CVUs and CTUs may be omitted or may lack cameras).

The CCU or CVU may analyze the collected data in real time for purposes of making decisions, such as whether to send a lock command to a particular cart 30, whether to actuate a store video surveillance system, or whether to send an alert message to personnel. FIGS. 1A and 1B illustrate examples of a CVU or a CTU communicating with a door manager and taking an appropriate anti-theft action, if needed. The door manager may include access points (APs) as described herein for communicating with cart transceivers in the cart wheels. For example, when a cart is approaching or passing through the store exit, the CCU or CVU may analyze the cart's recent history (e.g., path and speed) to evaluate whether a customer is attempting to leave the store without paying. The CCU (or CVU) may analyze camera images to evaluate whether a shopping basket that is exiting the store is at least partially loaded or whether a shopping basket has passed through a checkout station 34. (The access points may additionally or alternatively be responsible for making such determinations.) Based on the outcome of this determination, the CCU may send a lock command to the cart (typically via an access point), or may refrain from issuing a command that authorizes the cart to exit. As another example, if the CCU detects a rapid increase in the number of active carts, the CCU may alert personnel (e.g., over a store LAN) regarding the possible need to open an additional checkout station. As another example, if the CVU detects that a shopping basket is exiting the store and is at least partially loaded (or contains high theft risk merchandise), the CVU may send an alert to store personnel, actuate an alarm, communicate a warning that is displayed to the shopper by a display (or smart navigation module) on the basket, or communicate a lock command to a smart wheel of a cart to actuate a brake (e.g., to inhibit motion of the cart).

The task of analyzing the images preferably involves the use of one or more trained machine learning models. Different trained models may be created and used for different types of classification tasks (e.g., whether the cart is empty, whether the cart contains high theft risk merchandise, etc.) and different image types (e.g., photos taken from cart-mounted versus non-cart-mounted cameras). To train a machine learning model, a team of human taggers may review and label or "tag" images of carts taken at a particular store or at a group or chain of stores that use similar shopping carts and sell similar merchandise. Examples of tags include "empty cart," "contains only non-merchandise item(s)," "contains child," "contains merchandise," "partially loaded," "fully loaded," "contains high theft risk item," and "contains an electronics item." These labeled images may be used to train and validate machine learning models. In some cases (especially where cart-mounted cameras are used), labeled images may be generated of carts containing particular merchandise items known to be frequently stolen, and these images may be used to train one or more models to detect these merchandise items in the cart.

The CCU may also run data mining and reporting software that analyzes the data collected over time for purposes of detecting meaningful traffic patterns and trends. For example, the CCU may generate reports showing how customers typically progress through the store, how much time they spend in each aisle or other shopping area, a load level of shopping baskets that exit the store, data on theft events (e.g., fully or partially loaded baskets that exit the store without paying), etc. This information may be used to, for example, adjust the store layout or adjust the size or number of shopping baskets provided to shoppers.

The CCU (or CVU) may additionally or alternatively convey the data it collects over a cellular network or a wireless network (e.g., the Internet) to a remote node that handles analysis and reporting tasks. For example, the CCU (and possibly one or more access points or the CVU) may have an autonomous WAN link that uses a cellular data service such as general packet radio service (GPRS) to convey the collected data to a remote node for analysis and reporting. This feature can be used to monitor the system's health from a remote facility. The system may also be capable of being tested and configured via the WAN link from the remote facility.

As depicted in FIG. 1C, the CCU (or CVU) may connect to various other types of systems that exist within the store. For example, the CCU or CVU may connect to a preexisting alarm system and/or video surveillance system, in which case the CCU or CVU may be configured to activate an audible alarm or a video camera upon detecting an unauthorized exit event (the video camera in the surveillance system may be different from the camera in the CVU or the same camera, in various implementations). As another example, the CCU or the CVU may connect to a pre-existing central store computer that maintains information regarding the states of the store's checkout registers or mobile payment platform; as described below, this information may be retrieved and used by the CCU or the CVU to evaluate whether a customer has passed through an active checkout lane or paid for merchandise using a mobile payment application or mobile payment point.

In some implementations of the system, the CCU may be omitted. In these implementations, the access points (APs) may implement all of the real time analysis functionality that might otherwise be handled by the CCU. For example, an access point or CVU mounted in the vicinity of the store exit may be capable of detecting that a customer is attempting to exit the store without paying (or determining the cart's basket is at least partially loaded), and deciding whether to send a lock command to the cart. To accommodate both centralized and distributed installations, each access point or CVU may be capable of operating both with and without a CCU. Implementations are also possible in which the access points are omitted, such that the CCU or the CVU communicates directly with the cart transceivers. Many variations of distributed, network connected components and circuitry are contemplated.

The cart transceivers (CTs), access points (APs), computer vision unit (CVU), checkout barrier (CB), cart-mounted camera modules, and central control unit (CCU) all can operate as uniquely addressable nodes on a wireless tracking network. As shown in FIG. 1C, another type of node that may be included on the network is a handheld mobile control unit (MCU). The mobile control unit is designed to enable store personnel to unlock individual carts via depression of a button on the MCU. The mobile control unit may also include functionality for retrieving and displaying various types of cart status information, for configuring the wheels/cart transceivers and updating their firmware, and for controlling a motorized cart retrieval unit 40 (see discussion of cart retriever 40 below).

The various types of nodes (e.g., cart transceivers, access points, central control unit, computer vision unit, cart-mounted camera module and mobile control unit) may, in some implementations, communicate with each other using a non-standard wireless communications protocol that enables the cart transceivers to operate at very low duty cycles, without the need to maintain synchronization with the access points when inactive. Consequently, the cart transceivers can operate for extended periods of time (e.g., several years) using a relatively small battery mounted in the wheel 32. The details of a particular wireless communications protocol that may be used are described in U.S. Pat. No. 8,463,540, Two-Way Communication System for Tracking Locations and Statuses of Wheeled Vehicles, which is hereby incorporated by reference herein in its entirety for all it discloses.

Each cart transceiver (CT) is preferably capable of measuring the received signal strength, in terms of an RSSI (received signal strength indication) value, of the transmissions it receives on the wireless tracking network. The system may use these RSSI measurements in various ways. For example, a cart transceiver may compare the RSSI value of an access point's transmission to a threshold value to determine whether to respond to the transmission. The cart transceiver may also report this RSSI value to the access point (together with the cart transceiver's unique ID) to enable the system to estimate the location of, or distance to, the shopping cart. As another example, the cart transceivers may be programmed to generate and report RSSI values of transmissions from other nearby cart transceivers; this information may in turn be used to estimate the number of carts that are queued at a checkout lane, in a cart storage structure, near store entrance/exits, in a cart stack being retrieved with a mechanized cart retrieval unit 40, or elsewhere.

Three checkout stations 34 are shown in FIG. 1C, each of which includes a checkout register (REG), which typically includes a merchandise scanner. Each checkout station 34 in this particular example includes an access point (AP), which may be mounted to the preexisting pole (if present) that indicates the number of the checkout lane. Each such access point may include a connection or sensor that enables it to determine whether the respective checkout station is currently active. This information is useful for assessing whether a customer who passes through the checkout lane has paid. Several different methods that may be used to sense the active/inactive state of a checkout station are described below. Each access point that is positioned at a checkout station 34 may use a directional antenna to communicate with nearby shopping carts/cart transceivers, such as those that are queued in the corresponding checkout lane (see FIG. 2, discussed below).

In some implementations, the store may utilize a checkout barrier (CB) located at the end of a checkout lane, at the store exit (as illustrated in FIG. 1C), in areas with high value goods, etc. A CB generally includes a gate, barrier, or turnstile that is locked unless a customer is permitted to exit the checkout lane or the store or the high value area (e.g., the customer has paid for the goods). The CB can then be unlocked to permit the customer to exit (e.g., by pushing against the gate which swings open to permit passage). After exit, the gate swings closed and locks to prevent other customers from leaving without payment. A CB may be in communication with the store's CCU, CVUs, CTUs, checkout registers, mobile payment points 35 (described below), etc. in order to receive a command to unlock the barrier (or to lock the barrier).

FIG. 1C also schematically illustrates a mobile payment point 35. Mobile payment points need not be fixed, physical locations in the store but can represent a wireless network connection that permits a shopper to pay for items in the shopper's basket. For example, the shopper may access a mobile payment application (e.g., on the shopper's smart phone or on a communication display mounted to the shopping basket or cart) that can electronically record the goods or merchandise in the basket and provide mobile payment options (e.g., payment by credit or debit card). The mobile payment point 35 can be in wireless communication with APs, the CCU, the CVU, etc. so that the payment can be recorded and communicated to appropriate components of the system shown in FIG. 1C. For example, the CVU may detect (via computer vision image analysis described herein) that a loaded shopping basket is about to exit the store. The CVU may access payment information to determine whether or not the shopper associated with the exiting basket has paid for the goods in the basket. If the shopper has made payment (e.g., via the mobile payment point 35 or through a register 34), the system can permit the shopping basket to exit the store without triggering an anti-theft action. However, if the shopper has not made a payment, the system can trigger the anti-theft action (e.g., actuating an alarm or store surveillance system, sending a lock command to a cart wheel, notifying store personnel, etc.).

Access points may additionally or alternatively be mounted to various other fixed and/or mobile structures in the vicinity of the store. For example, as shown in FIG. 1C, access points may be mounted to a shopping cart storage structure 36 (two shown) in the store parking lot. These parking-structure-mounted access points may be used to detect and report the number of carts stored in their respective areas, and may also be used to enable the in-store access points, CVU, or CCU to communicate with carts that would otherwise be out of range.

The system illustrated in FIG. 1C can include other, optional, components. For example, a power-assisted (mechanized) cart retrieval unit or trolley 40, which may be either a cart pusher or cart puller, can be used to retrieve shopping carts and return them to a cart storage location 36. The store can include a pair of conventional EAS (Electronic Article Surveillance) towers at the store exit, or additionally or alternatively at the end of each checkout lane. Although EAS towers are not needed to implement the various functions described herein, the system may take advantage of their common presence in retail stores. For example, each cart transceiver (CT) may include an EAS receiver for detecting that it is passing between a pair of EAS towers, and may be configured to report EAS detection events on the wireless tracking network; this information may in turn be taken into consideration in assessing whether an exiting customer has paid.

The example store configuration in FIG. 1C is also shown as having a very low frequency (VLF, typically below 9 kHz) signal line 44 embedded in the pavement along an outer perimeter of the parking lot or near a store exit. Such signal lines can be used to define a boundary of the area in which shopping carts are permitted. The wheel 32 of a shopping cart can include a VLF receiver that detects the VLF signal, and engages the brake, when the cart is pushed over the signal line 44. Although not shown in FIG. 1C, a VLF line may also be provided at the store exit such that all carts that pass through the exit have to cross over this line, and/or at other locations of interest.

While the present system does not require the use of a VLF signal line 44, the system is preferably capable of using one or more VLF lines as a mechanism for monitoring cart location. Specifically, cart transceiver (CT) preferably includes a VLF receiver. The VLF receiver may be capable of detecting a code transmitted on a VLF line, so that different lines can be used to uniquely identify different areas or boundaries. When the VLF signal is detected, the cart transceiver may take various actions, depending on the circumstances. For example, the cart transceiver may attempt to report the VLF detection event on the wireless tracking network and then wait for a command indicating whether to engage the brake. If no command is received within a pre-programmed time period in this example (e.g., 2 seconds), the cart transceiver may automatically engage the brake. The VLF detection event can be reported on the wireless tracking network to the CVU, which may image the cart or shopping basket to determine its load status. If the cart or basket is determined to be unloaded, a theft situation is unlikely, and a braking command may not be sent (or the brake may be instructed not to engage). In contrast, if the cart or basket is determined to be at least partially loaded and the cart or basket is exiting the store, the CVU may send a braking or lock command to the cart or some other type of anti-theft command. For example, for a hand-carried basket (which does not have a locking wheel), the anti-theft command may include a warning command (e.g., a light or an alarm on the basket may be activated to warn the shopper), a command to activate a store video surveillance system (to obtain video of the potential theft event), a signal to alert store security personnel, and so forth. Such anti-theft commands may additionally or alternatively be used with wheeled carts.

With further reference to FIG. 1C, one or more magnetic markers or strips (MAG) may optionally be provided on or under the store flooring to provide an additional or alternative location-tracking mechanism. As illustrated, these magnetic markers may be provided in strategic locations, such as in each checkout lane and at the store exit. Although not shown in FIG. 1, one or more magnetic markers may also be provided in the parking lot and/or in shopping aisles. Each magnetic strip can have a unique magnetic pattern that can be sensed by an optional magnetic sensor included in a wheel 32 or attached to a shopping basket or cart 30. The magnetic markers thus serve as magnetic bar codes that identify specific locations. When a cart 30 crosses a magnetic marker in one implementation, the cart transceiver (CT) transmits the detected magnetic code, or information from which this code can be derived, on the wireless tracking network. Additional details of how magnetic markers may be sensed and used are described in U.S. Pat. No. 8,046,160, Navigation Systems and Methods for Wheeled Objects, which is hereby incorporated by reference herein in its entirety for all it discloses.

The system illustrated in FIG. 1C can include additional or alternative functionality or components. For example, the system can implement the techniques and functionality for low-energy consumption location of movable objects described in U.S. Pat. No. 9,606,238, which is hereby incorporated by reference herein in its entirety for all it discloses. These techniques can be used to track the location of shopping baskets as they move in the store environment. Movement of shopping baskets can be tracked using the techniques (e.g., dead reckoning) described in the above-incorporated U.S. Pat. No. 8,046,160, or in U.S. Pat. No. 9,731,744 or in U.S. Pat. No. 10,232,869, each of which is hereby incorporated by reference herein in its entirety for all it discloses.

As will be apparent from the foregoing discussion, many of the components shown in FIG. 1C are optional components that may or may not be included in a given system installation. For instance, the magnetic markers, the EAS towers, the checkout barriers, and/or the VLF signal line can be omitted in certain installations. In addition, either the access points or the CCU can be omitted. CTUs may be replaced by CVUs, and vice versa. Further, the illustrated components may be arranged differently than illustrated. For instance, VLF signal lines could be provided in the checkout lanes and/or in the store exit/entrance (e.g., in place of the magnetic markers and EAS towers shown) to enable the carts to detect checkout events and exit/entrance events, respectively. Further, other types of signal transmitters and detectors/receivers could be used to monitor cart locations. For example, ultrasound emitters/receivers can be used to track cart location, or the store may include radio frequency (RF) detectors (e.g., located in the ceiling) that detect RF signals from carts and use direction of arrival techniques to determine the location of the carts.

Example Techniques for Assessing Customer Payment

The system can support a variety of different methods for assessing whether a customer is exiting the store without paying. The particular method or methods used may vary widely based on the types and the locations of the system components included in a given installation. For example, if the store does not include any Electronic Article Surveillance (EAS) Towers, magnetic markers (MAG), or VLF lines, the determination may be made based solely or primarily on cart location/path information determined from CT-AP communications, with wheel speed history optionally taken into consideration as an additional factor. If EAS towers, magnetic markers, and/or VLF signal lines are provided, they may be used as additional or alternative sources of information from which the decision can be made. The system may include a computer vision unit (CVU) near checkout lanes 34, and the CVU can analyze imagery of the checkout lane to determine whether a shopper passed through the lane, interacted with a store checkout attendant or a store payment system, stayed in the lane for a sufficient period of time indicative of the checkout and payment process (e.g., longer than 1 minute, 2 minutes, 3 minutes, 5 minutes, or more), provided payment information, etc. The CVU may analyze imagery to determine whether the shopper is approaching the exit from the direction of the checkout lanes 34 or from another direction where payment may have been unlikely. As further described below with reference to FIG. 4A, additional secondary camera(s) 410a can be located through the facility to monitor movement of carts (e.g., through checkout lanes or pay points or from locations where high value items are stored). As carts move from the field of view of one secondary camera to another secondary camera (or to a CVU or CTU), the system can hand off tracking of the cart to the next camera to provide a substantially continuous path of the cart. The CVU (or CCU) may access payment information from the mobile payment point 35 to determine whether an exiting shopper has paid for the goods in the shopper's basket. Additional (or alternative) techniques for assessing whether an exiting customer has paid are described in U.S. Pat. No. 8,463,540, which is hereby incorporated by reference herein in its entirety for all it discloses. Many combinations or variations of the foregoing can be used to determine indicia of whether a shopper associated with a shopping basket (e.g., the shopper pushing a human-propelled shopping cart) has likely paid for goods in the shopper's basket.

Example Shopping Basket on a Shopping Cart

Figure 2A:
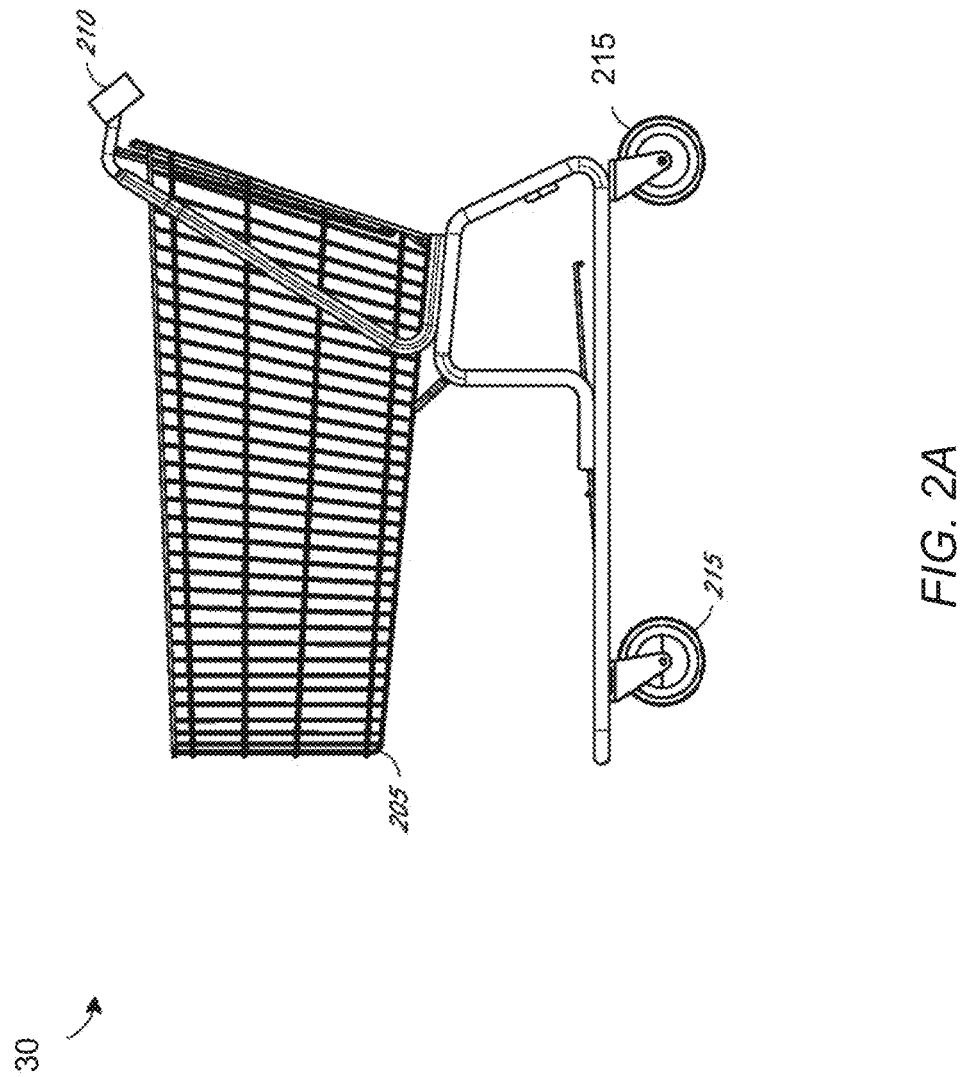
FIG. 2A illustrates an example of a shopping cart with a navigation system and one or more smart wheels.
Figure 2B:
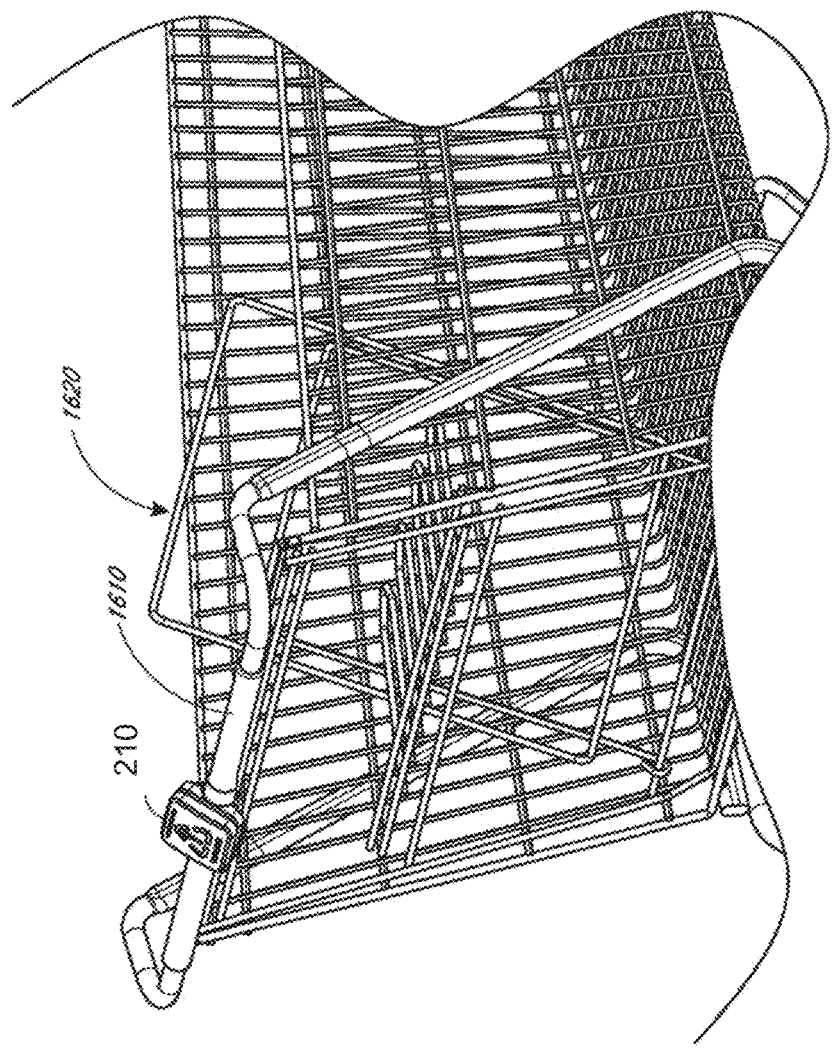
FIG. 2B shows an example of a shopping cart having a smart positioning system mounted to a handle of the cart. In this figure, the cart has a child seat that is in an open position (sometimes referred to as child seat down).
Figure 2D:
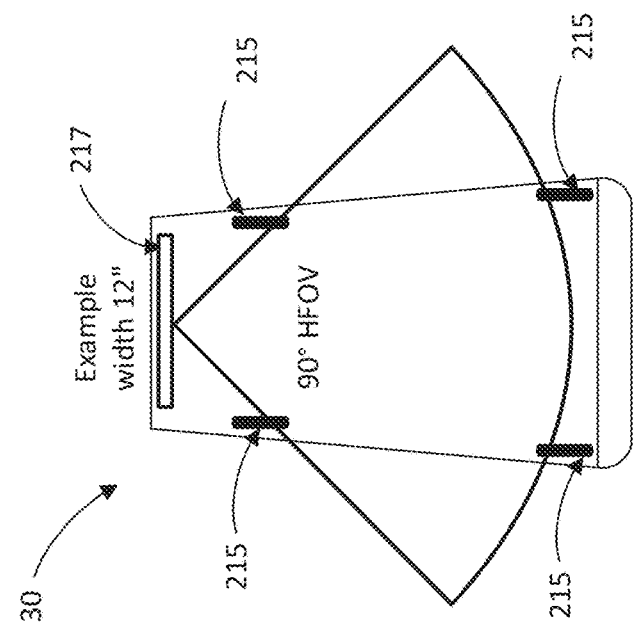
FIG. 2D is a top view of the shopping cart of FIG. 2C.
Figure 2C:
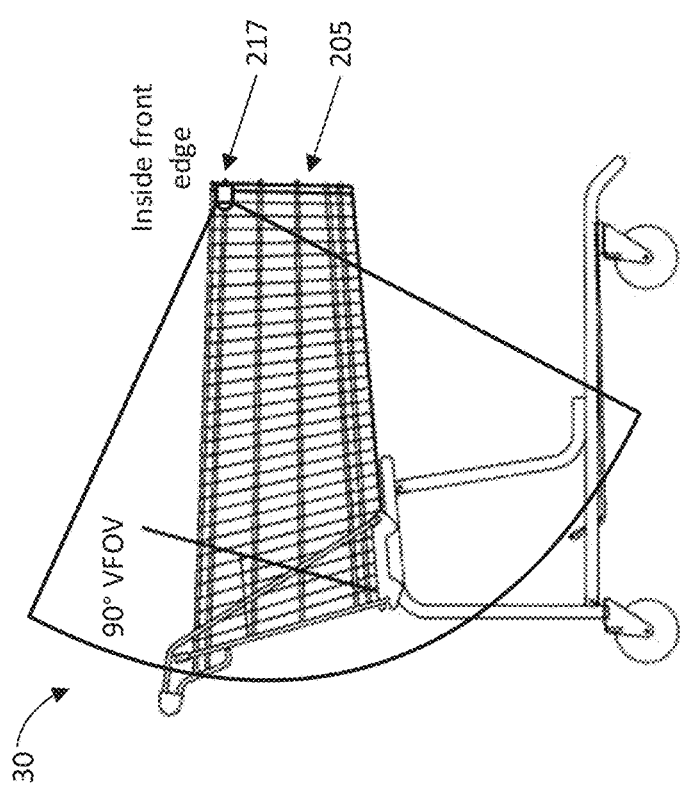
FIG. 2C is a side view of a shopping cart outfitted with a camera module.
Figure 2E:
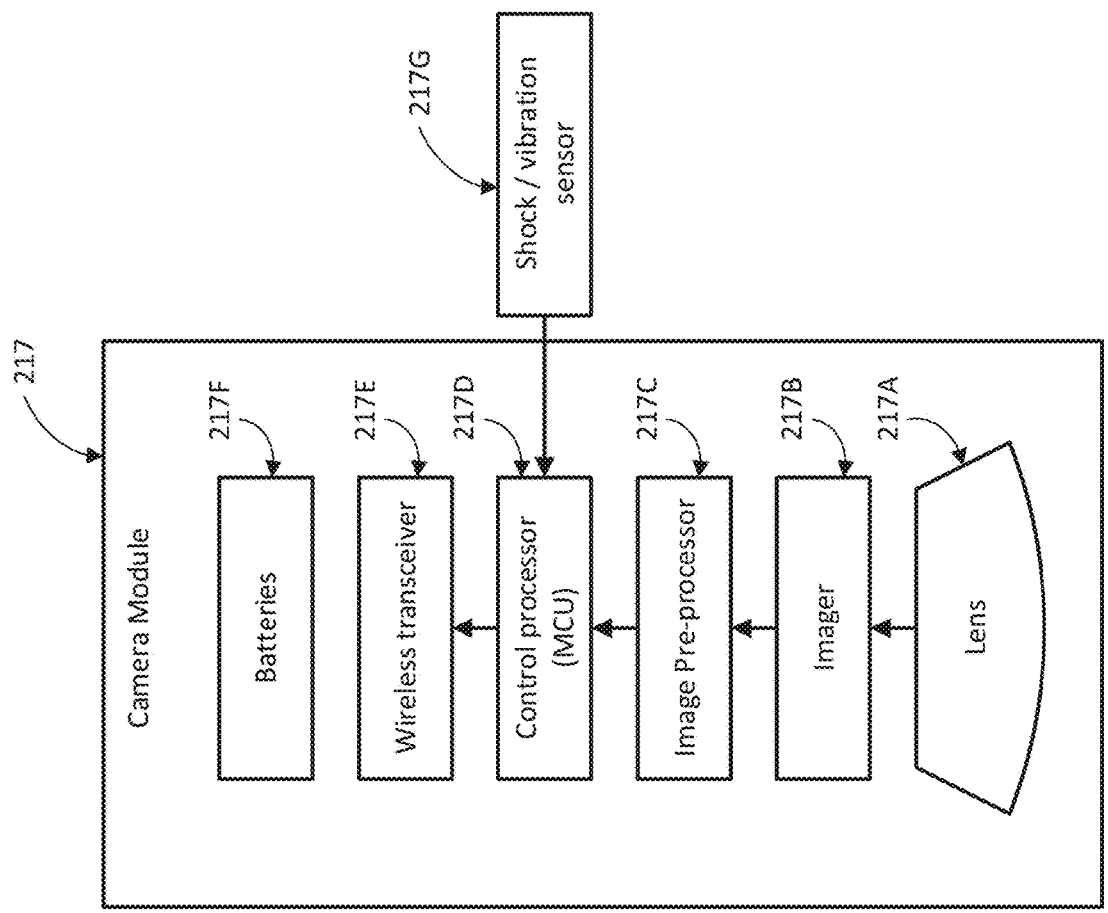
FIG. 2E shows the components of one embodiment of the camera module of FIGS. 2C and 2D.

FIG. 2A shows features of an example shopping cart 30 having a shopping basket 205. The shopping cart 30 is human-propelled and comprises a smart positioning system 210 and one or more anti-theft wheels or wheel assemblies 215 (which can brake, lock, or inhibit rotation of the wheel or movement of the cart). The smart positioning system 210 can be mounted on the handle of the cart 30 (e.g., as shown in FIGS. 2A and 2B) or can be mounted elsewhere in or on the cart (e.g., on the front of the basket 205). The anti-theft wheels 215 can be a smart locking wheel, e.g., a wheel with a sensor (e.g., to sense a VLF line), a wireless communication system (e.g. a cart transceiver CT), and/or a processor in addition to a locking or braking mechanism. Position of the shopping cart 30 can be tracked using the smart positioning system 210, which may utilize dead reckoning or vibration-detection techniques to estimate the position of the cart. For example, the smart positioning system 210 can include components or functionality described in U.S. Pat. Nos. 8,046,160, 9,731,744, or U.S. Pat. No. 10,232,869, each of which is hereby incorporated by reference herein in its entirety for all it discloses.

The functionalities of the navigation system and the anti-theft system can be distributed between the smart positioning system 210 and the smart locking wheel 215. For example, one or both of the smart positioning system 210 and the smart locking wheel 215 can have exit/entrance event detection capability; the anti-theft functionality of wheel locking can be located in the smart locking wheel 215 while the anti-theft functionality of user warning can be located in the smart positioning system 210. Further, although FIG. 2A shows the shopping basket 205 for a human-propelled shopping cart, similar techniques described herein apply for a shopping basket on a motorized shopping cart or mobility cart or for a handheld shopping basket that is hand-carried by a shopper. For example, the smart positioning system 210 can be attached (or integrated into) a motorized shopping cart or mobility cart or attached to a handheld shopping basket.

As illustrated in FIG. 2B, some shopping carts include a user-adjustable child seat that can be moved between a position where the child seat is closed and a position where the child seat is open. In the open position (shown in FIG. 2B), a shopper can place a child (or other items) on the seat portion. In many carts, the shopper can push a metal frame of the child seat 1620 away from a handle 1610 of the cart 30, which causes the seat portion to move to a horizontal position. The open position is thus sometimes referred to as child seat down. FIG. 2B shows the shopping cart 30 with the child seat 1620 in the open or child seat down position. As will be further described below, the computer vision unit (CVU) may image the shopping cart 30 to determine whether the load of the cart is (at least partially) attributable to a small child placed in the child seat 1620 or an object placed on the child seat (e.g., a handbag) rather than store merchandise.

In some embodiments, the shopping cart 30 may include a camera or camera module capable of imaging the contents of the basket 205. One example of such a cart 30 is shown in FIG. 2C (side view) and FIG. 2D (top view), which show a camera module 217 mounted on the inside front edge or wall of the basket 215, preferably on the front lip. In the illustrated example, both the horizontal field of view (HFOV) and the vertical field of view (VFOV) of the camera are 90 degrees. Preferably, the HFOV and VFOV of the camera are in the range of 45 degrees to 135 degrees, and more preferably 60 to 120 degrees or 75 to 105 degrees, with the optimum values depending upon the dimensions of the basket 205 and the camera's mounting location. As discussed above, images (which may include video) captured by the camera module 217 may be used by the system to identify or classify products or other items placed in the basket 205. The camera module 217 may include a processor that receives and analyzes the images, and/or may include a transceiver that transmits the images to a CVU, CCU or other node for analysis.

As further discussed below, one or more types of sensors (e.g., a vibration sensor, a scale, or a motion sensor that senses motion inside the basket) on the cart may be used to detect an event in which an item is potentially added by the customer to the cart 30. This event may trigger the capture by the camera module 217 of an image of the cart contents just after the event. The use of a triggering event to initiate image capture enables the camera or camera module 217 to be maintained in an "off" or low-power state when items are not being added to the cart (thereby conserving battery power), and also reduces the quantity of images that are stored and analyzed. A further reduction in power consumption and image generation may be achieved by activating the camera module 217 or its camera only when the shopping cart 30 is in particular areas, such as a merchandise area or a high-theft-risk merchandise area; for example, the camera module 217 may refrain from generating images when the cart is in a store parking lot.

The item-addition event may also serve as a trigger for the system to capture one or more additional types of event metadata, such the cart's location, an event timestamp, wheel rotation speed, recent wheel speed history, and/or a basket weight measurement (if the cart includes a scale, as discussed below). In addition, the event may trigger the upload and/or analysis of a captured image or set of images (as discussed below). Another event that may be used to trigger image capture is the transition of a cart from a stationary state to a moving state while the cart is in a merchandise area; for example, if wheel rotation is initiated while the cart is in a merchandise area (or particular type of merchandise area), the wheel assembly may generate a signal that causes the camera module 217 to generate a cart image.

FIG. 2E illustrates one embodiment of the camera module 217 of FIGS. 2C and 2D. In the illustrated embodiment, the camera module 217 includes a lens 217A (which may, e.g., be a fisheye lens or Fresnel lens), an imager 217B, an image pre-processor 217C, a control processor or MCU 217D, a wireless transceiver 217E, a battery 217F, and memory (not shown). Although a single camera (imager) is shown, the camera module 217 may, in some embodiments, include multiple cameras (e.g., two, three of four) that are spaced apart horizontally and/or vertically, allowing the cart contents to be imaged from multiple perspectives. As illustrated, the camera module 217 may also include, or be connected to, a shock/vibration sensor 217G, such as an accelerometer, capable of sensing cart vibration caused by the addition of an item to the basket 205. In this embodiment of FIG. 2E, the control processor 217D is configured to analyze the vibration profile of a detected shock or vibration event to determine whether the event is likely the result of cart movement versus the addition of an item to the basket 205. Examples of components and processes for detecting and analyzing cart vibration are described in U.S. Pat. No. 10,232,869, the disclosure of which is hereby incorporated by reference. The shock/vibration sensor 217G may, in some embodiments, be physically separate from the camera module 217 (e.g., it may be mounted on the bottom of the basket or in a wheel assembly), in which case its output, or results of the analysis of its output, may be communicated wirelessly to the camera module 217.

When a likely item-add event is detected, the control processor 217D may initiate the capture and initial processing of an image (or a set of two or more images if the camera module includes multiple spaced-apart cameras). In some cases, the task of analyzing the newly captured image is divided between the camera module 217 and an external node such as a CVU. For example, the camera module's control processor 217D or image pre-processor 217C may compare the image to a most recently captured image to determine whether the cart contents have likely changed. If a likely change in the cart contents is detected, the control processor may mark the region of the image that has changed (such as by drawing a boundary around the changed portion or newly detected item), and then transmit the marked image (together with a cart ID and any captured event metadata, including an image capture timestamp) to a CVU or other remote node for further analysis.

The CVU or other remote node may thereafter use one or more trained machine learning models, or other types of software components (e.g., a rules-based classifier) to classify the newly added item, such as by assigning the item to one or more categories such as "merchandise," "non-merchandise," "high theft risk item," "electronics product," etc. In some cases, the task of analyzing the images may also involve the use of OCR (optical character recognition) to identify text on product packaging, in which case any identified text may be used or considered in classifying or identifying items. The images captured by a cart's camera module 217 during a shopping session, together with the results of the associated image analyses, may be maintained by the CCU (or another processing node) in association with the cart's ID. This data, and any other data collected for the cart during the shopping session, may ultimately be used to determine whether to authorize the cart to exit the store.

In some embodiments, the shopping cart 30 may include a built-in scale (not shown) configured to weigh the contents of the items placed in the basket 205. The scale may, for example, be part of a structure that mechanically couples the basket 205 to the cart frame, or to a portion of the cart frame that supports the basket. One example of a cart with a built-in scale is disclosed in U.S. Patent Pub. 2015/0206121 A1, the disclosure of which is hereby incorporated by reference. The scale may alternatively be incorporated into one or more of the cart's wheel assemblies. The scale may be electrically or wirelessly coupled to a processor on the cart, such as the camera module's control processor 217D or a processor of a smart wheel assembly, such that the scale's output is communicated to the processor. As discussed below, the item weight measurements can be used by the system, in combination with other collected data such as cart images and/or cart locations, to identify or classify the items added to the cart. Example processes for classifying items in a shopping cart basket, and for making exit authorization determinations based on such classifications, are described below.

In some system implementations, the shopping carts 30 in a store may be outfitted solely with camera modules 217, and thus may lack smart wheel assemblies or other navigation components. In such implementations, the camera modules 217 may include location tracking electronics capable of communicating with access points (APs), fixed transmitters, or transponders in the store to monitor cart location. For example, a camera module 217 may be capable of receiving signals from a smart shelving or smart labeling system included in some stores to enable the identification of nearby merchandise items. As another example, a camera module 217 may include the electronics normally included in a cart transceiver (CT), in which case the camera module may use RSSI measurements to determine proximity to store access points as described in patents referenced above. As discussed below, Bluetooth and other wireless standards may alternatively be used monitor cart location.

Example Smart Positioning System/Smart Braking Wheel Implementation

Figure 3:
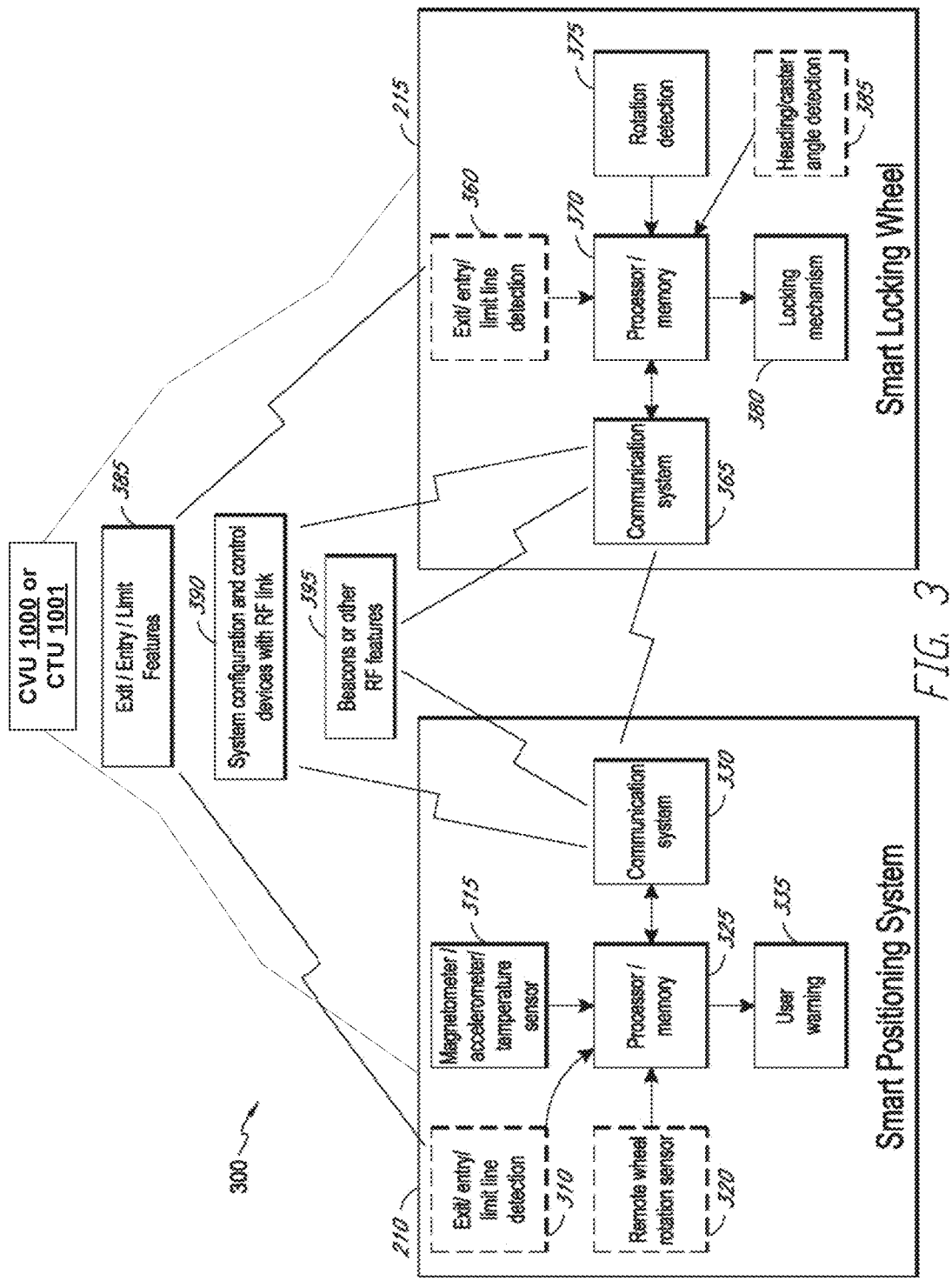
FIG. 3 illustrates components of an example of a containment system for shopping baskets.

FIG. 3 shows a component set 300 of an example tracking system for a shopping basket (e.g., a basket on a shopping cart or a mobility cart or a handheld shopping basket). The example component set 300 includes the following components: (1) a smart positioning system 210; (2) a smart locking wheel 215; (3) fixed features 385 associated with exits and/or entrances to the store, checkout lanes, high-value areas, positions where location of the wheel 215 can be reset or updated, etc.; (4) system configuration and control devices 390; (5) RF beacons or other RF features 395; and (6) a computer vision unit (CVU) 1000 or a camera transceiver unit (CTU) 1001. The CVU and the CTU will be further described with reference to FIGS. 4A and 4B.

The smart positioning system 210 comprises (1) sensor elements 315 to determine the cart's heading and speed (e.g., a magnetometer and/or accelerometer) and, optionally, the temperature of the system (e.g., a temperature sensor); (2) an optional sensor 320 providing data from which wheel rotation rate can be inferred (e.g., without the sensor being in proximity to the wheel); for example, a vibration sensor; (3) a processor and memory 325; (4) a communication system 330 to communicate (e.g., via an RF link) with a smart locking wheel 315, system configuration and control devices 390, RF beacons or other RF features 395, and/or the CVU 1000; (5) an optional detector 310 configured to determine that the cart is passing through an exit/entrance of a store (an exit/entrance event), and, in some implementations, whether the motion is exiting the store or entering the store. In some systems, circuitry in a wheel performs the actual function of detection; the smart positioning system communicates with the detection circuitry in the wheel to obtain exit/entrance information. Certain systems may have detector 360 as a primary detector and detector 310 as a secondary detector; (6) an indicator 335 (e.g., visual and/or audible) to provide a notification to the user to show that the cart is in a warning zone and/or about to lock. The indicator may include a display configured to output text or images (e.g., a warning to the user that a containment boundary is nearby and the wheel will lock if the wheeled object is moved beyond the containment boundary). The indicator may include a light (e.g., a light emitting diode (LED)) that illuminates or flashes as a notification to the user. The indicator may include audible alerts or notifications. In some implementations, the indicator comprises a voice synthesizer that can output a human-understandable message such as "cart is approaching a limit and is about to lock." The indicator can include a speaker to output the audible notification. The smart positioning system 210 may also include a light detector 333 for detecting ambient light signatures for use in navigation or a vertical position detector 337 (e.g., a pressure sensor) used for determining on which level of a multi-level structure the smart positioning system is located. The functionalities of these components are further described in the above-incorporated U.S. Pat. No. 9,731, 744, or U.S. Pat. No. 10,232,869.

FIG. 3 illustrates an example in which the smart positioning system 210 is used with a wheeled cart that includes the smart locking wheel 215 (although this is not a requirement, the system 210 can be used on a handheld basket). The wheel 215 comprises (1) a locking mechanism (e.g., a brake) 380 configured to inhibit rotation of the wheel when the locking mechanism is actuated (or translation of the cart itself); (2) a wheel rotation detector 375, e.g. a tuning fork and a striker (e.g., the part which hits the tuning fork as the wheel rotates); (3) a processor and memory 370; (4) a communication system 365 configured to communicate with the smart positioning system 210, system configuration and control devices 390, an RF beacon or other RF features 395, and/or the CVU 1000 or the CTU 1001; (5) an optional detector 360 configured to detect an exit/entrance event, and, in some implementations, whether the motion is exiting the store or entering the store; and (6) an optional heading/caster angle detector 383 configured to detect the heading of a (castered) wheel.

The fixed features 385 can be associated with exits and entrances to the store, checkout lanes, areas where high-value goods are located, positions where the location of the cart can be reset or updated, and so forth. The proximity of these features can be detected by the detector in either the smart positioning system or in the smart locking wheel. The fixed features can be used to provide an accurate reference position to the smart positioning system (e.g., for resetting any accumulated dead reckoning position errors). The fixed features 385 can include VLF lines, access points, RF fields generated for warning or locking, checkout barriers, EAS towers, magnetic or electromagnetic markers, etc. The CVU 1000 or the CTU 1001 can communicate with the fixed features 385 to provide an appropriate signal when a shopping cart approaches the vicinity of the fixed features (e.g., to provide a locking or unlocking signal to a checkout barrier or cart transceiver or a location signal to reset or update the location of the cart).

The system configuration and control devices 390 can perform housekeeping tasks such as configuration and control. The devices 390 can communicate with the communication system 330 in the smart positioning system and/or the communication system 365 in the smart locking wheel. The system configuration and control devices 390 can comprise the CCU (e.g., described with reference to FIG. 1C) or in some cases, the CVU 1000.

The RF beacons or other RF features 395 can transmit RF signals for entrance/exit detection and/or precision position fix.

The CVU 1000 or the CTU 1001 can communicate wirelessly with the smart locking wheel 215, the smart positioning system 210, the RF beacons or other RF features 395, and/or the system configuration and control 390 or the central control unit (CCU) described, e.g., with reference to FIG. 1C. The CVU or the CTU can, additionally or alternatively, communicate with the CCU or the control 390 using a wired LAN connection such as, e.g., Ethernet.

A system as described herein may be implemented with more or fewer than the features/components described herein. Furthermore, a system may be implemented with a different configuration than that described above, e.g., a rotation detector may be implemented in one of the smart positioning system and the smart locking wheel, RF beacon may communicate with one rather than both of the communication systems 330 and 365. Additionally, the functionality of the components in FIG. 3 can be combined, rearranged, separated, or configured differently than shown.

The smart positioning system 210 can be disposed in one or more places in the wheeled object. For example, some or all of the smart positioning system can be disposed in a cart's handle, frame, caster, wheel, etc. For motorized shopping carts or mobility carts, the smart positioning system 210 can be attached to the frame or body of the cart or integrated with other electronic circuitry for operating the cart. The smart positioning system described herein can be used for applications other than cart containment. For example, the systems can be used for estimating the position, path, or speed of a wheeled object. Further, in cart containment applications, the cart can include one or more wheels configured to inhibit cart movement when activated, for example, by including a wheel brake. For example, the wheel can lock or resist rotation when the brake is actuated. Examples of cart wheels that can inhibit cart movement are described in U.S. Pat. Nos. 8,046,160, 8,558,698, and 8,820, 447, all of which are hereby incorporated by reference herein in their entireties for all they disclose.

Further description of functionalities of the system 300 can be found in U.S. Pat. No. 9,731,744, or U.S. Pat. No. 10,232,869, each of which is hereby incorporated by reference herein in its entirety for all it discloses.

Example Anti-Theft System Using Computer Vision

Figure 4A:
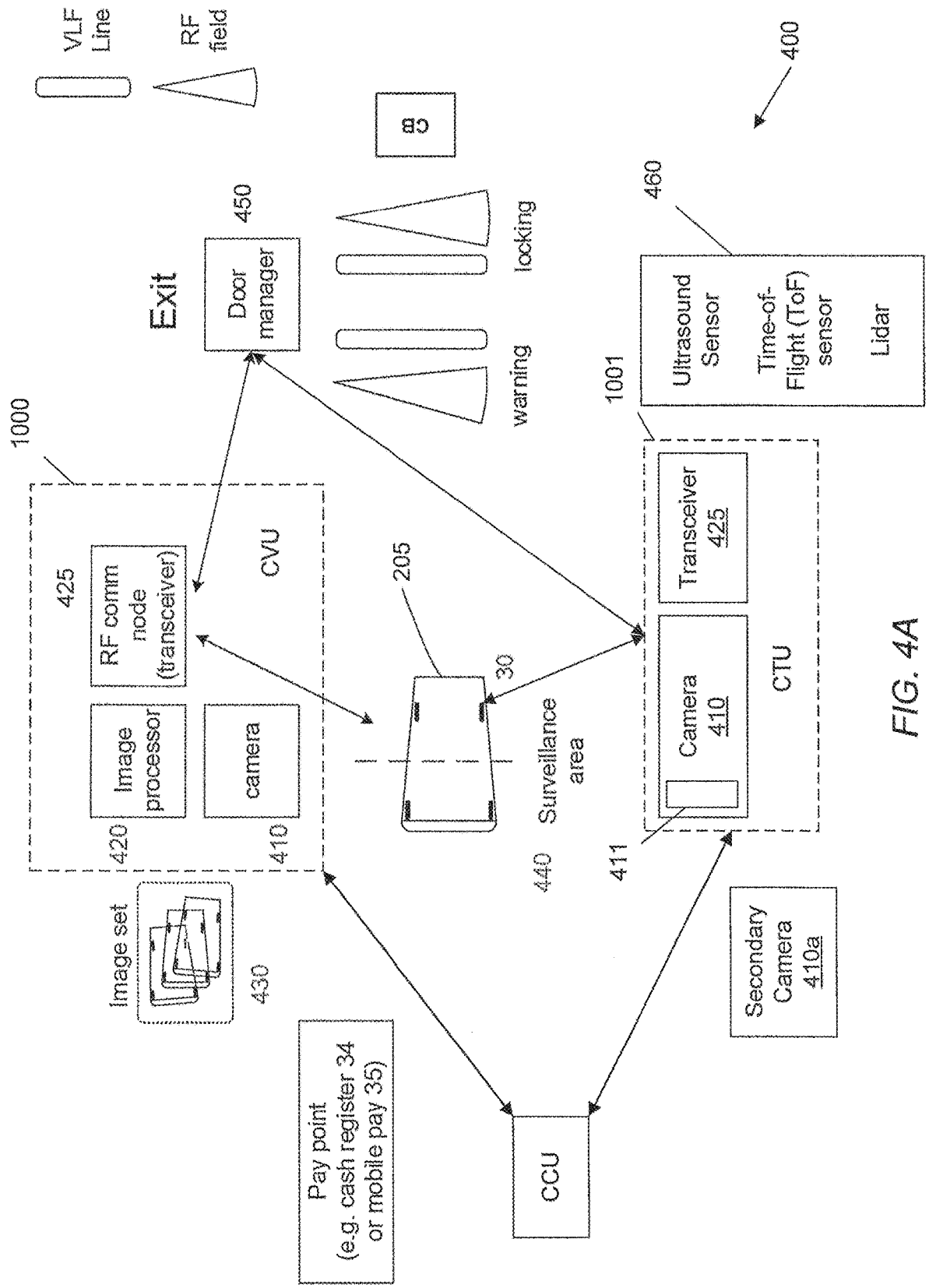
FIG. 4A schematically illustrates an anti-theft system that uses computer vision techniques to identify whether a shopping basket is at least partially loaded with merchandise and exiting a store. The shopping basket can be attached to a human-propelled shopping cart, a motorized mobility cart, or the shopping basket can be hand-carried by a shopper.

FIG. 4A schematically illustrates an anti-theft system 400 that uses computer vision techniques to identify whether at least partially loaded shopping baskets are exiting a store. The system 400 includes a computer vision unit (CVU) 1000, which may be generally similar to the CVUs described with reference to FIG. 1C. The CVU 1000 can be located near a surveillance area 440, for example, near an entrance/exit, a checkout lane 34, an area of the store with high value merchandise (e.g., liquor, health care products, pharmaceuticals), etc.

In the implementation shown in FIG. 4A, the CVU 100 communicates with a door manager 450, which may, in some such implementations, perform the functionality of the system configuration and control devices 390 described with reference to FIG. 3. For example, the door manager 450 can communicate with the communication system 330 in the smart positioning system 210 and/or the communication system 365 in the smart locking wheel 215 and issue an anti-theft command (e.g., to lock or brake a wheel, actuate an alarm or a warning, etc.). The door manager 450 can comprise the central control unit (CCU) (e.g., described with reference to FIG. 1C) or in some cases, can be a component of the CVU 1000 or in some cases can communicate with the CCU. The door manager 450 can control the fixed features 385 used at store exits, for example, one or more VLF lines or RF fields that can define a warning zone or a locking zone (e.g., such VLF or RF signals are detectable by cart transceivers near the exit). The fixed features 385 can include a checkout barrier (CB) located, e.g., at an exit or checkout lane. The door manager (or the CVU) may have an autonomous WAN link that uses a cellular data service such as, e.g., general packet radio service (GPRS), Long-Term Evolution (LTE), or 5G New Radio (5G NR), to convey collected data about store exit events to the CCU or a remote node (e.g., the cloud platform 470 described with reference to FIG. 4B) for analysis and reporting. For example, the remote node may be accessible (e.g., via a web browser) by authorized store personnel who can view statistics about exit events (e.g., theft situations) or images or video of exit events (e.g., video of shoppers attempting pushout theft).

In the system 400 shown in FIG. 4A, an RF field and a VLF line are used to provide a warning zone and a lock zone. A shopping basket that is not authorized to exit the store may first receive a warning (e.g., audible or visual and, for example, displayed by the smart positioning system 210) when the basket crosses the warning zone and then receive a lock signal (e.g., a command to actuate a wheel brake) if the basket crosses the locking zone. In other implementations, both an RF field and a VLF line are not used, and only one of the RF field or the VLF line are used. Also, in other implementations, only one of the warning and locking zones is utilized. Additionally or alternatively, a checkout barrier (CB) can be used.

The CVU 1000 can be in communication with a pay point, such as a checkout register 34 or a mobile pay point 35, in order to access payment information related to a shopping basket in the surveillance area. As described herein, a theft situation is likely when a shopping basket holding goods is attempting to exit the store without any indicia that the customer has paid for the goods. Thus, the CVU 1000 can use information from the pay point to, at least in part, determine whether goods in a loaded shopping basket have been paid for.

The CVU 1000 can include a camera 410 that is oriented to image the surveillance area 440. The camera 410 can comprise a video camera that can generate an image set 430 that is used by an image processor 420 to analyze shopping basket activity in the surveillance area 440. The image set 430 can include a video, one or more frames of video, or a selection of images acquired by the camera. The camera can include a grayscale camera, a color camera (e.g., RGB), or a camera that can image in a non-visible portion of the electromagnetic spectrum. For example, the non-visible portion may comprise the infrared (IR) region (which may be advantageous for dark entrances or imaging at nighttime, where (optionally) an IR light source can be used to illuminate the entrance) or the ultraviolet (UV) region (which may be advantageous for imaging through glass entry/exit doors or windows). The use of camera(s) 410 that provide imaging in the visible and the non-visible portions of the electromagnetic spectrum can permit the CVU or the CCU to perform multi-spectral or hyper-spectral image analysis, which may enable better tracking or classification of carts or merchandise based on the unique spectral reflection signature of the carts or merchandise. For example, multi-spectral imaging can be used to detect highly theft-prone items based on specific colors of their packaging. Such detection can occur under a wide variety of store lighting conditions using a relatively small number of spectral bands (e.g., 7 to 9) and can be implemented by a CMOS imager and a Bayer mask or a set of filters for each of the spectral bands. The camera 410 can include a depth camera that acquires images as well as depth data (e.g., distance from the camera) for objects in the images and can advantageously be used for depth sensing and motion tracking of the baskets. The depth camera can include a stereo camera comprising two or more image sensors spaced apart to determine depth information via stereoscopic techniques.

In some implementations, the CVU (or components) can be powered by Power Over Ethernet (POE). In some implementations, the camera 410 comprises a video camera that operates at 20 or more frames per second, provides 4 megapixel or greater image resolution (e.g., 1920×1080 or greater), and streams the video using Real Time Streaming Protocol (RTSP). The video can be compressed using the H.264 protocol for efficient bandwidth communication. In some implementations, such cameras are available from Hikvision Digital Technology Co., Ltd. (City of Industry, Calif.).

The camera 410 may include a plurality of cameras. For example, the CVU 1000 or the CTU 1001 can include an imaging camera 410 and the system 400 may include one or more secondary cameras 410a spaced apart from the cameras 410 in the CVU or the CTU. The secondary camera 410a can be included in the same housing as the CVU or the CTU or may be physically separated from the CVU or the CTU. The secondary camera 410a may be configured to have an at least partially overlapping field of view with the camera 410 (e.g. which may be used for the image processing and shopping basket load classification). The use of one or more secondary cameras 410a may permit the system 400 to track the shopping basket 205 in regions outside the field of view of the camera 410. For example, secondary camera(s) 410a may be placed near pay points or store regions containing high value items so that the system 400 can track movement of the shopping basket 205 in these regions, before or after, the basket 205 enters the field of view of the camera 410 of the CVU or CTU (e.g., for load classification). The secondary camera(s) 410*a* may be placed near the store exit to enable tracking of the basket near or past the exit. The distance between the camera 410 and the secondary camera 410*a* can depend on the field of view of these cameras, lens sizes, height above the floor of the retail facility, etc. In various implementations, the secondary camera 410*a* may be spaced from the camera 410 by a distance in a range from about 10 cm to about 1 m or more.

Some or all of the CVUs 1000, the CTUs 1001, or the secondary cameras 410*a* are installed near a store exit, since that is the location where thieves will attempt to leave with unpurchased merchandise. In many retail facilities, store exits have substantial amounts of glass, for example, glass doors, glass windows, etc. The use of glass lets sunlight into the retail facility (during the day) and can provide for a bright and pleasant shopping experience for shoppers. However, the sunlight can cause glare, glints, or reflections from the floor, from metallic surfaces, and from metal shopping carts. Such glare, glints, or reflections can create artefacts in the images used for motion tracking or computer vision analysis. Accordingly, in some implementations, some or all of the cameras 410, 410*a* can include a polarized lens or filter 411 to reduce glare, glints, or reflections in the acquired images. For example, the direction of polarization in the lens or filter 411 can be orthogonal to the path of a reflection of the sun from the floor of the facility.

The image processor 420 can comprise a hardware processor (e.g., a CPU or graphics processing unit (GPU)) to perform the image analysis and object recognition tasks described herein. In some implementations, the image processor 420 can comprise an Edge tensor processing unit (TPU) available from Google, Inc. (Mountain View, Calif.), which supports the TensorFlow Lite machine learning and computer vision models.

The CVU 1000 can include an RF communication node 425 (e.g., a transceiver) to communicate with other components of the system 400 (e.g., the door manager 450, the pay point, or the shopping basket (e.g., the smart positioning system 210 or the locking wheel 215)). The RF communication node 425 can communicate with any of the components of the system described with reference to FIG. 1C. Additionally or alternatively to the RF node 425, the CVU can include a wired LAN connection such as, e.g., Ethernet. For example, the CVU 1000 may link to the CCU via Ethernet.

In some implementations, the functionality of the CVU 1000 (or the CTU 1001) can be provided as a system-on-module (SoM) board configured to perform machine learning inferencing or image classification models and to provide wireless connectivity. An example of an SoM board is the Coral Dev Board available from Google, Inc. (Mountain View, Calif.). The Coral Dev Board includes a CPU, a GPU, an Edge TPU coprocessor for machine learning models, on-board memory, and wireless connectivity (e.g., Bluetooth 4.2, IEEE 802.11b/g/n/ac 2.4/5 GHz). In some such implementations, the camera 410 can be connected to the SoM board for a compact setup.

FIG. 4A also shows an example of a camera transceiver unit (CTU) 1001. The CTU 1001 can be thought of as a type of CVU 1000, without the image processor 420, but with the other components being generally similar as described herein. Use of CTUs 1001 may provide a more cost-effective installation, because the image processing capability can be off-loaded to the CCU or to a CVU. Thus, an installation may include a CCU or one or a small number of CVUs for image processing, with additional CTUs placed throughout the facility to capture images of entrances, exits, pay points, high value areas, and so forth. Generally, a CTU 1001 and a CVU 1000 can be used inter-changeably in an installation. Accordingly, it is to be understood that reference to a CVU includes reference to a CTU and that reference to a CTU includes a reference to a CVU. Thus, the functionality of the system 400 can be distributed among CCU(s), CVU(s), CTU(s), or door manager(s) in order to provide a suitable and cost-effective anti-theft installation for any particular facility. Additionally or alternatively, some or all of the image processing (or other programmatic functionality) can be performed by a remote hardware processor (e.g., in the cloud). These components can communicate via wired or wireless LAN or WAN. Many variations are contemplated, and the specific examples described herein and the figures are intended to be illustrative and not limiting.

In some examples, the CVU 1000 or the CTU 1001 can include an inertial measurement unit (IMU, e.g., an accelerometer) that can be used to determine whether the CVU or CTU is installed in a level orientation. Review of images streamed from the CVU or CTU can determine the location, orientation, and focus of the camera 410 are correct. Changes in IMU readings can indicate the CVU or CTU has tilted or rotated post-installation and corrective action can be taken. For example, the CVU or CTU can be physically leveled. Additionally or alternatively, the change in orientation of the device can be corrected for by compensating the images for the change in angle (or rotation) using computer-vision techniques.

The anti-theft system 400 can include additional sensors 460 to provide additional or different functionality. For example, the additional sensors 460 can include ultrasound sensors, time-of-flight (ToF) sensors, radar sensors (e.g., millimeter wave radar), or lidar sensors (scanning or non-scanning). In some cases, such sensors are provided as part of a depth camera that performs both imaging and proximity or ranging functionality. The camera 410 of the CVU or CTU can include a depth camera or a pair of stereo cameras for depth functionality. The sensors 460 can be used to provide distance data from the sensor to the cart (or merchandise) in the cart. A further description of use of such additional sensors 460 to provide three-dimensional (3D) imaging of the shopping basket 205 or merchandise is provided below.

Figure 4B:
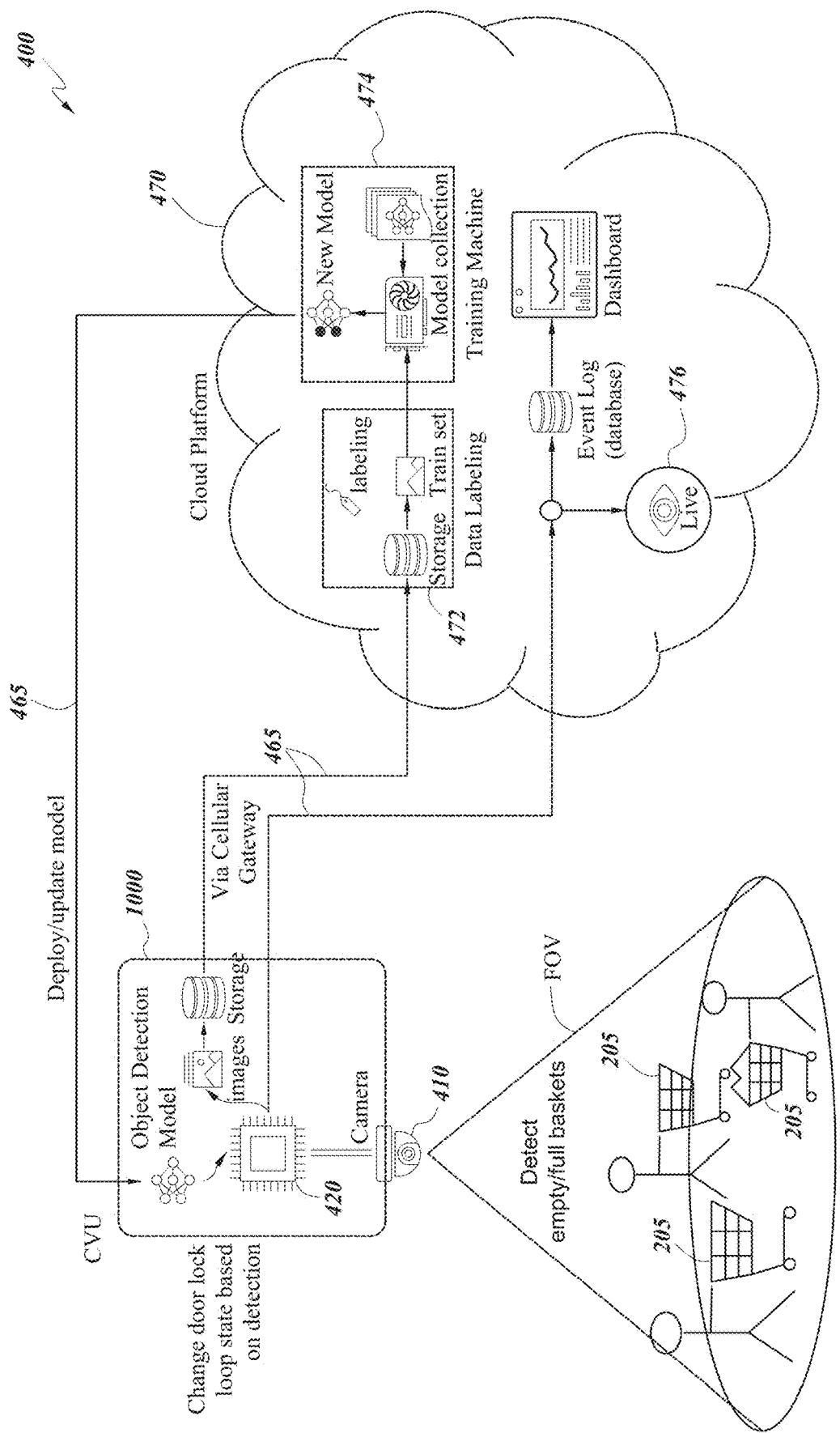
FIG. 4B schematically illustrates another implementation of the anti-theft system.

FIG. 4B schematically illustrates another implementation of the anti-theft system 400. Many of the components of this implementation of the system 400 have been described with reference to FIG. 4A. This implementation uses a wireless cellular gateway to communicate bi-directionally between a CVU 1000 and a cloud platform 470. The cloud platform 470 can be located remotely from the facility where the CVU 1000 is located. The cloud platform 470 may process imagery obtained from CVUs at multiple retail facilities.

As previously described, the CVU obtains images of shopping baskets 205 within the field of view of its camera 410. The processor 420 of the CVU can execute a machine learning or computer vision object detection model to determine a load status (e.g., empty, at least partially loaded, or full) of a shopping basket attempting to exit the store and can change the door lock state based on detection that an at least partially loaded cart is attempting to exit the retail facility without paying. For example, the door lock state can be changed to activate a wheel locking mechanism 380 of a smart locking wheel 215 of a shopping cart detected to have unpaid-for merchandise.

The CVU can locally collect and store images of the shopping baskets and communicate the images for storing and analysis by the cloud platform 470. The CVU and the cloud platform 470 can communicate by an autonomous WAN gateway 465 that uses, for example, a cellular data service such as, e.g., general packet radio service (GPRS), Long-Term Evolution (LTE), or 5G New Radio (5G NR). The gateway 465 can provide wired or wireless network access to the cloud platform 470 and may be a virtual private network (VPN) over a municipal wireless (e.g., WiFi) network.

The cloud platform 470 can include processor and storage for storing and analyzing the images collected by the CVU. For example, the image set can be labeled at block 472 to provide training data for updating the machine learning or computer vision object detection models used by the CVU. The labeled image data can be used to update or generate new object detection models at block 474. The updated or new models can be communicated back to the CVU by the WAN link 465.

In some implementations, the cloud platform 470 can provide real-time event detection or live streaming 476 in which an event log (e.g., a database of images of successfully or unsuccessfully identified theft events) can be reviewed and analyzed for troubleshooting or to improve the performance of the system 400. The cloud platform 470 may provide a dashboard (e.g., accessible via the Internet) in which authorized retail facility managers or system administrators can view the event log, access the data labeling or training modules 472, 474, perform system maintenance or upgrades, and so forth.

Additional workflows and processing pipelines that can be performed (at least partly) by the cloud platform 470 are described with reference to FIGS. 8 to 11.

Example Image Processing Techniques for an Anti-Theft System

As described with reference to FIGS. 4A and 4B, the CVU 1000 of the anti-theft system 400 can image the surveillance area 440 and acquire an image set 430 of exit events. The exit events can include shopping baskets 205 leaving the store through the exit. In many retail stores, an exit is also an entrance where shoppers can enter the store with a shopping basket, and in such implementations, exit events can include both shopping baskets entering or exiting the store (because the camera 410 may typically image the entire exit/entrance area and capture shoppers entering or exiting).

The image set 430 is communicated to the image processor 420, which can apply computer vision, machine learning, or object recognition techniques (described herein) to the image set 430 to perform some or all of the following image recognition tasks in various implementations.

The image processor 420 can classify an object in the image set as one of the following (any of which may be referred to as a load status of the basket): (a) a shopping basket containing merchandise; (b) a shopping basket not containing merchandise (e.g., the basket is not necessarily empty, e.g., a shopping cart with an open child seat 1620 may still contain a child, a handbag, etc.); or (c) an object other than a shopping basket (e.g., a shopper). The load status may represent a range of values associated with an amount of the load of the shopping basket. For example, the range may be a number (e.g., 1 to 5, with 1 empty and 5 fully loaded), a grade (e.g., A to E, where A represents fully loaded and E represents empty), or some other type of score, discriminative or semantic classifier, or probability scaling for a plurality of load levels (e.g., full, ¾ full, ½ full, ¼ full, or empty). The load status can include a weighted score or value that accounts for the amount of the load as well as an estimate of the value of the load (e.g., whether the load includes high value items). For example, a basket partially loaded with high value items (e.g., liquor bottles) may have a load status that is higher than a basket fully loaded with bulky, inexpensive items (e.g., paper towels), because the partially loaded basket represents a greater monetary loss to the store.

The load status can be determined by computer vision or machine learning techniques as described herein. In some implementations, the load status may be weighted to reflect presence of high value items in the shopping basket (which tends to increase the load status) or absence of high value items in the shopping basket (which tends to reduce the load status). As an example, computer vision techniques or machine learning techniques can be trained to identify presence of high value items (e.g., liquor bottles) in the shopping basket, and, if present, the load status increased, since the value of the basket's merchandise will tend to be higher if high value items are present. As another example, the load status may represent presence of high value merchandise versus presence of other types of merchandise (e.g., low value merchandise), since it may be advantageous to identify theft situations where the monetary value of the merchandise is the greatest.

The image processor 420 can distinguish different types or sizes of shopping carts 30, whether a cart is human-propelled or motorized (e.g., a mobility cart with a shopping basket 205), whether the object is a shopper carrying a handheld shopping basket 205. In some implementations, the image processor 420 may not perform facial recognition (or attempt to identify personally recognizable features or information) for individuals in the images to preserve privacy of these individuals. The image analysis by the processor 420 (or by the cloud platform 470) can be set up to be fully compliant with data privacy regulations and laws (e.g., the California Consumer Privacy Act or the General Data Protection Regulation (GDPR) of the European Union).

The image processor 420 can distinguish a shopping cart that is being pushed (or carried) by a store employee rather than a shopper (e.g., by recognizing that the person is wearing a store uniform). This can play a role in the anti-theft logic, because there is a much lower likelihood of pushout theft if the store employee is pushing (or carrying) a loaded basket out the exit.

The image processor 420 can determine a path (e.g., position versus time) of the object over the period of time covered by the image set. For example, as will be described further with reference to FIG. 5, the CVU 1000 can determine coordinates of the object (e.g., Cartesian x, y coordinates) as a function of time and calculate a path for the object (see, e.g., FIG. 6). The image processor 420 may analyze images collected by the secondary cameras 410a when the shopping basket 205 is outside the FOV of the camera 410 of the CVU.

If the determined path of a shopping basket containing merchandise indicates that the basket is heading toward or through the exit, the anti-theft system 400 can communicate an anti-theft signal to the shopping basket. As described above, the anti-theft signal can comprise an instruction to lock a smart wheel, actuate an alarm (audible or visible), notify store personnel, actuate a store video surveillance systems, etc.

In some implementations, after an object in the image set 430 has been classified as an object of interest (e.g., a shopping basket containing merchandise), the action of the anti-theft system 400 (e.g., how to communicate an anti-theft command) can depend on the type of communication between the CVU 1000 (or the door manager 450) and the shopping basket (e.g., the smart positioning system 210 or the smart locking wheel 215 shown in FIG. 3). For example, the action can depend on whether the system 400 is trying to use unicast or multicast addressing to the shopping baskets. Examples of unicast and multicast command transmission techniques to smart wheels 215 or smart positioning systems 210 are described in, e.g., U.S. Pat. No. 9,963,162, Cart Monitoring System Supporting Unicast and Multicast Command Transmissions to Wheel Assemblies, which is hereby incorporated by reference herein in its entirety for all it disclose.

Unicast Addressing

In unicast addressing, a command from the anti-theft system 400 can be addressed to a particular shopping basket, which has a specific unicast address on the store's tracking network. The CVU 1000 can associate the shopping basket 205 with the specific unicast address using a variety of techniques.

For example, each shopping basket can be encoded with its unicast address via an optically-readable marker disposed on the basket (or cart) such as, e.g., a bar code, an Aruco marker, etc. The optically-readable marker can encode the unicast address so that it is detectable to the camera 410 in the visual or infrared (IR) optical spectrum (e.g., IR markers may be less obtrusive to shoppers and less likely to be defaced by potential thieves as they may not be visible to human eyes). The image processor 420 can detect and decode the basket's unicast address from an image containing the optically-readable marker.

Additional or alternative techniques can be used to associate an identified shopping basket with its specific unicast address. For example, a retail facility may include radiolocation infrastructure that can identify an RF transmission as originating from a particular unicast address (e.g., because the RF transmission itself includes the unicast address). The radiolocation infrastructure can detect an RF transmission from the basket (identified as an object of interest by the CVU), and the system 400 can thereby make the association between the basket and its unicast address.

The radiolocation infrastructure can include a triangulation system that gives a position of the basket (e.g., x, y coordinates) at a given time. The triangulation system can include a system with an RF receiver that measures angle of arrival of an RF signal emitted from an RF tag on the basket to estimate position (e.g., the Intelligent Locating System available from Quuppa LLC, Arlington, Va.). The CVU can detect the position or path of the basket and using knowledge of the position of the RF receiver (which need not be co-located with the CVU) in the angle of arrival system, the system 400 can correlate the angle of arrival estimated position or path with the CVU estimated position or path to infer the unicast address of the basket. Thus, the system 400 can integrate with a facility's existing location based services or real-time tracking systems.

The radiolocation infrastructure can include a system that measures radial distance to the basket, for example, via time of flight or phase unwrapping followed by a phase slope or impulse response method. The system 400 can correlate an optical path or position measured by the CVU with radial distance versus time (from the radial distance measuring node) and thereby infer the unicast address of the basket.

In some installations, the shopping basket has an internal mechanism of measuring its own motion (e.g., a dead-reckoning navigation system such as the smart navigation system 210 described in the above-incorporated U.S. Pat. No. 9,731,744), and the self-detected motion of the basket can be correlated with the path of the basket detected by the CVU 1000. This correlation can be used to associate the basket's unicast address with the basket identified via image processing.

For example, in some implementations, there is a common time base between the anti-theft system 400 and the shopping baskets, which can be updated using RF synchronization between clocks on the baskets and a clock of the anti-theft system 400. For a human-propelled cart, rotation counting of the wheel provides an approximate velocity versus time for the cart. The system 400 can correlate the velocity versus time data against the optical path determined by the CVU to provide the association used to infer the cart's unicast address. As another example, a basket including the smart positioning system 210 can determine a quasi-heading of the basket versus time (e.g., the indoor geomagnetic field is distorted), and this quasi-heading can, additionally or alternatively, be correlated with the optical path determined by the CVU 1000 to infer the unicast address.

As another technique for associating an optically tracked shopping basket with its unicast address, the basket may be configured to measure an environmental signature that varies along the path of the basket. The variation of that signature with spatial location may be known and can be used to correlate the path of the basket (based on the environmental signature) with the path of the basket (determined optically by the CVU) to infer the unicast address of the basket. For example, the environmental signature may comprise a magnetic field in the store. The magnetic field near the level of the wheel can be mapped. The magnetic field map can be used to infer the unicast address of a wheel of cart, since the wheel can include a magnetometer to measure its local magnetic field, which can be compared to the map. The magnetic field map can be determined and the system 400 can be trained using carts with known unicast addresses. Subsequent machine learning techniques can be applied to update the magnetic field map, which changes over time due to changes within the store (e.g., movements of ferromagnetic shelving).

The process of associating a unicast address with a shopping basket can begin when the basket enters the surveillance area 440, which may be before the basket has been classified regarding load status (e.g., empty or loaded) or identified as an object of interest by the anti-theft system 400.

Regardless of which technique is used, once the suspicious basket's unicast address is known, the anti-theft system 400 (e.g., the CVU 1000 or the door manager 450) can send a potential theft message to the communication system (e.g., system 330 or 365). In the following illustrative example, the suspicious basket is associated with a shopping cart (e.g., "Cart 2345") having a smart locking wheel 215. The anti-theft system 400 can send a message to the communication system 330 or 365 such as "Cart 2345, you appear to contain merchandise: if you detect a warning zone or exit signal and you do NOT have an exit permission, warn then lock." In this example, the message is directed to a specific, suspicious shopping basket (that is associated with Cart 2345) and if the cart attempts to exit the store (e.g., by entering the warning zone or the locking zone), the smart locking wheel 215 (or the smart positioning system 210) is instructed to provide a warning (e.g., at the warning zone) and then to lock (if Cart 2345 enters the locking zone) unless Cart 2345 has an exit permission. Cart 2345 may have previously obtained an exit permission from the anti-theft system 400, if the cart passed through an active checkout lane 34 of the store or if the merchandise was paid for at a mobile pay point 35. In such case, Cart 2345 is permitted to exit the store (without warning or locking), because the merchandise in the basket of the cart has (likely) been paid for.

In some implementations, the suspicious shopping basket is not associated with a wheeled cart and may, for example, be hand carried by the shopper. Similar considerations apply, but the potential theft message may be an alert to store security, activation of a store surveillance system, etc. (since the hand-carried basket does not have a locking wheel).

Multicast Addressing

In some implementations, the retail store may not have implemented unicast addressing, or the unicast address of a particular object of interest is not known (e.g., the unicast association techniques described above fail to provide the unicast address of the object of interest). In such implementations or situations, the anti-theft system 400 can use non-unicast techniques to communicate an anti-theft signal. For example, multicast addressing of the shopping baskets in the vicinity of the surveillance area 440 can be used. Multicast addressing can be state-based, in which a multicast message is addressed to all shopping baskets in a particular state. For example, the state of a shopping cart wheel may be whether it is locked or unlocked; the state of a shopping basket may be whether it is moving, and so forth. Thus a multicast command can be addressed to all transceivers in which the state is moving or unlocked, etc.

As an example, if a shopping basket containing merchandise is approaching an exit, where that basket is not known (to the anti-theft system) to be authorized for exit (e.g., to have an exit permission), then the anti-theft system 400 can infer that a pushout theft situation is likely occurring. In some implementations, the exit configuration of the system 400 is by default in a "surveillance" mode in which images of the exit are obtained by the CVU 1000 and smart wheels 215 are not locked if they cross the exit. In this example, because a possible pushout theft situation has been identified, the anti-theft system 400 (e.g., the CVU 1000 or the door manager 450) can switch the exit configuration from the surveillance mode to a "lock if no permission" mode just before the suspicious shopping basket would be leaving through the exit. The "lock if no permission" command can be multicast to all transceivers near the surveillance area, and if the suspicious shopping cart does not have an exit permission, its smart wheel 215 will be locked to prevent theft. After the wheel is locked, the system 400 may switch the exit configuration back to the surveillance mode.

Tracking Paths of Shopping Baskets

Figure 5:
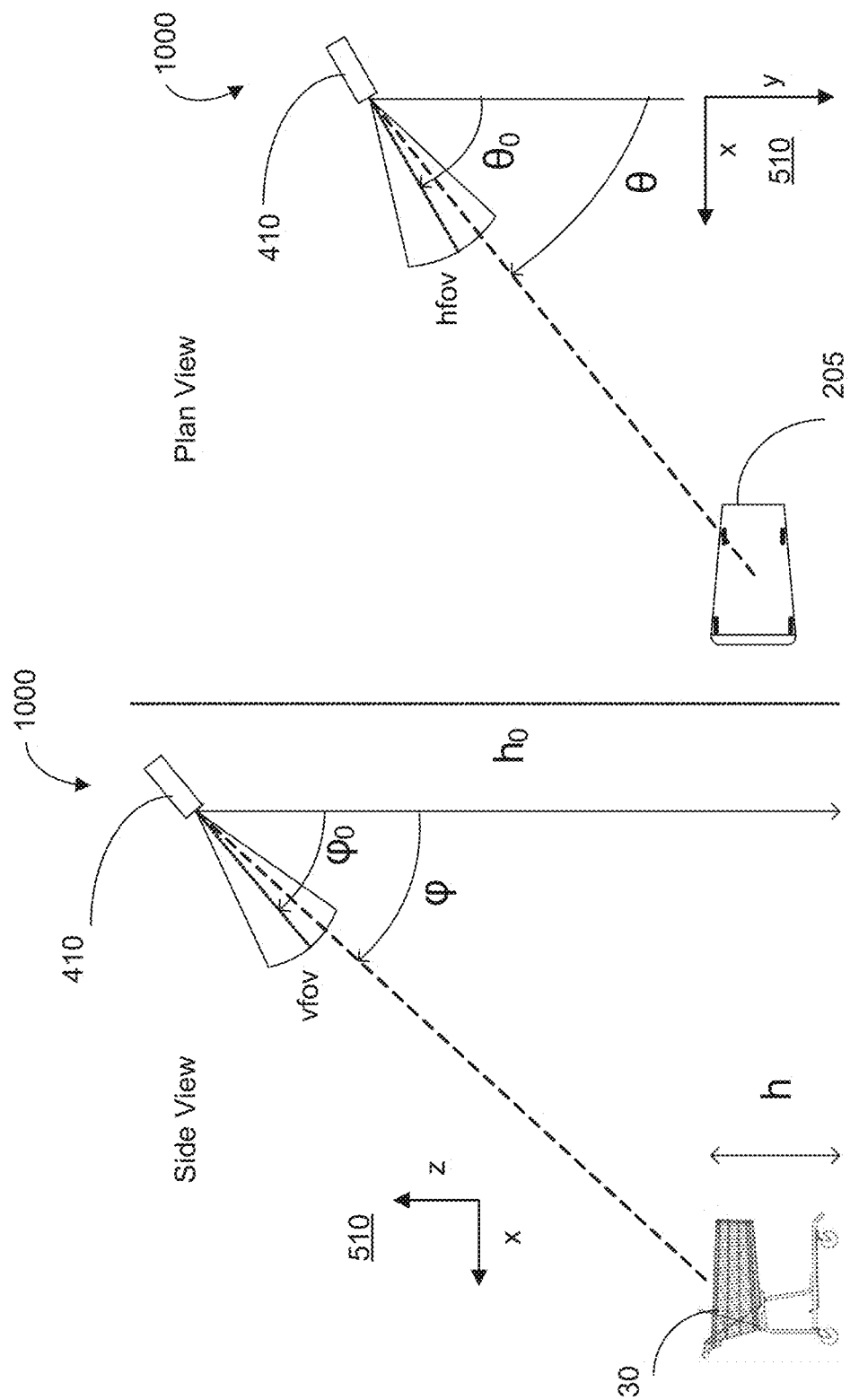
FIG. 5 schematically illustrates a side view (on the left) and a plan view (on the right) of a camera of a computer vision unit located so as to determine a position of a shopping basket.

FIG. 5 schematically illustrates a side view (on the left) and a plan view (on the right) of a camera 410 of a computer vision unit 1000 located so as to determine a position of a shopping basket 205. In this example, the shopping basket 205 is part of the shopping cart 30, but this is for illustration and is not a limitation on the tracking capability. The position or path (e.g., position versus time) of the basket 205 can be determined in a coordinate system such as, e.g., a Cartesian x, y, z coordinate system 510 shown in FIG. 5. In some implementations, only two horizontal coordinates (e.g., x and y) are tracked (e.g., horizontal motion), since cart motion generally occurs on a level plane (e.g., at constant height z).

The position of the basket 205 can be represented as the center of the basket, measured in image coordinates. In brief, some implementations project from a known location and optical field of view (FOV) of the camera 410 to a plane whose height, h, is determined by the class of the basket being tracked (e.g., different heights, h, for a full cart versus an empty cart, potentially different heights for different sizes/models of shopping cart if a given installation contains multiple types); different height for a motorized cart; different height for hand-carried baskets).

FIG. 5 illustrates geometry of the imaging environment. The camera 410 is a height ho above the floor (in some cases, the camera is installed on the ceiling of the facility). The camera has a vertical FOV (vfov) centered at angle $\varphi_0$ from the vertical, and a horizontal FOV (hfov) centered at angle $\theta_0$ from the y-direction. The center pixel of the image of the basket 205 can be measured by the image processor 420 to be at angles $\varphi$ and $\theta$. The center pixel of the basket 205 need not be at the center of the camera image (even if the camera 410 is steerable). By measuring the angles $\varphi$ and $\theta$, using the geometry shown in FIG. 5, the system 400 (e.g., the CVU 1000) can convert the angle measurements to position coordinates (e.g., x, y, and (optionally) z).

Figure 6A:
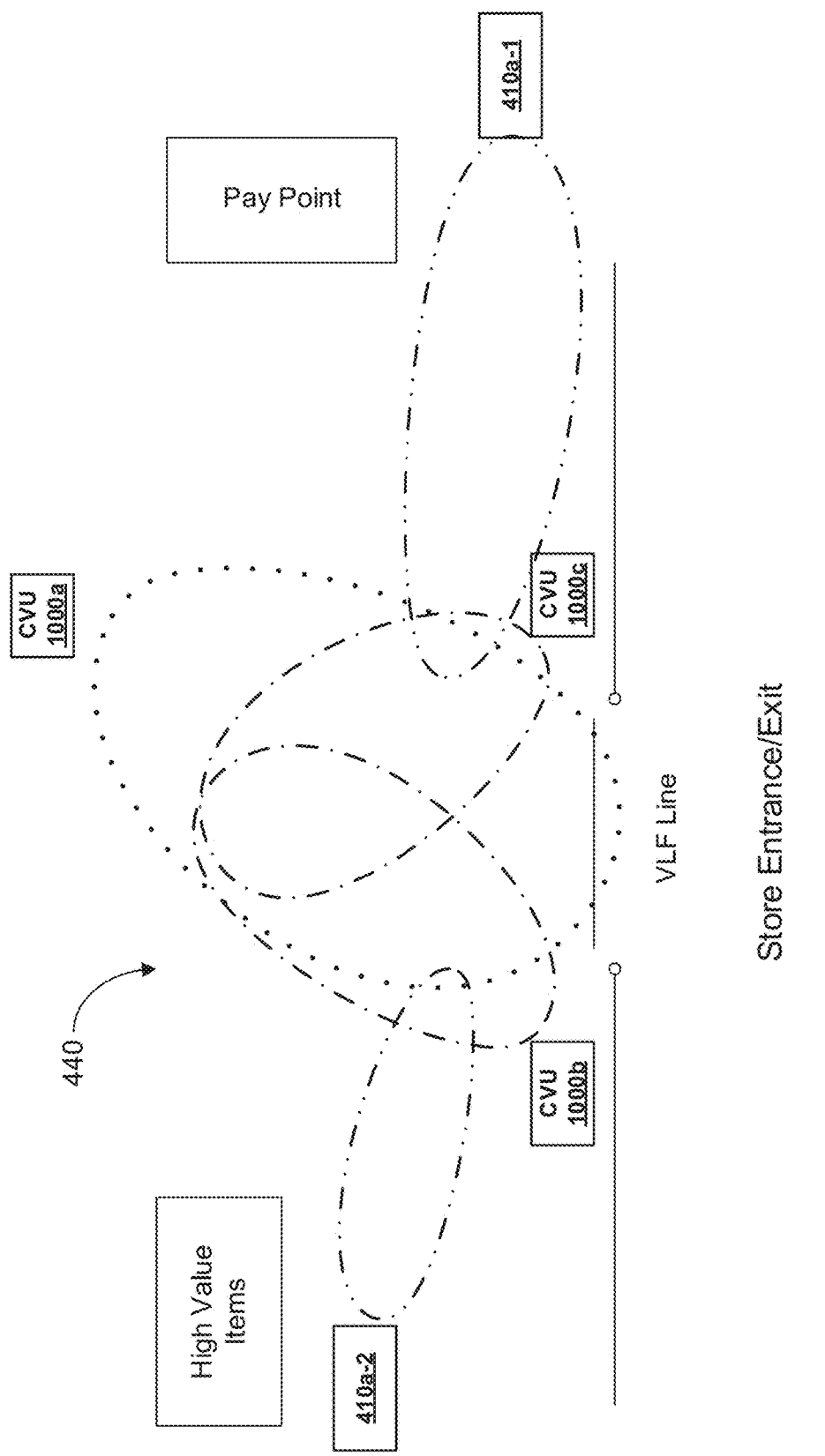
FIGS. 6A, 6B, and 6C schematically illustrate examples of placement and orientation of computer vision units (CVUs) and secondary cameras near an entrance/exit to a retail store. The number and arrangement of the CVUs and secondary cameras as well as the shapes and sizes of their respective fields of view (FOVs, shown by dotted or dot-dashed lines) are intended to be illustrative and not limiting. In other implementations, the layout could be different to meet the security objectives of the retail facility.
Figure 6B:
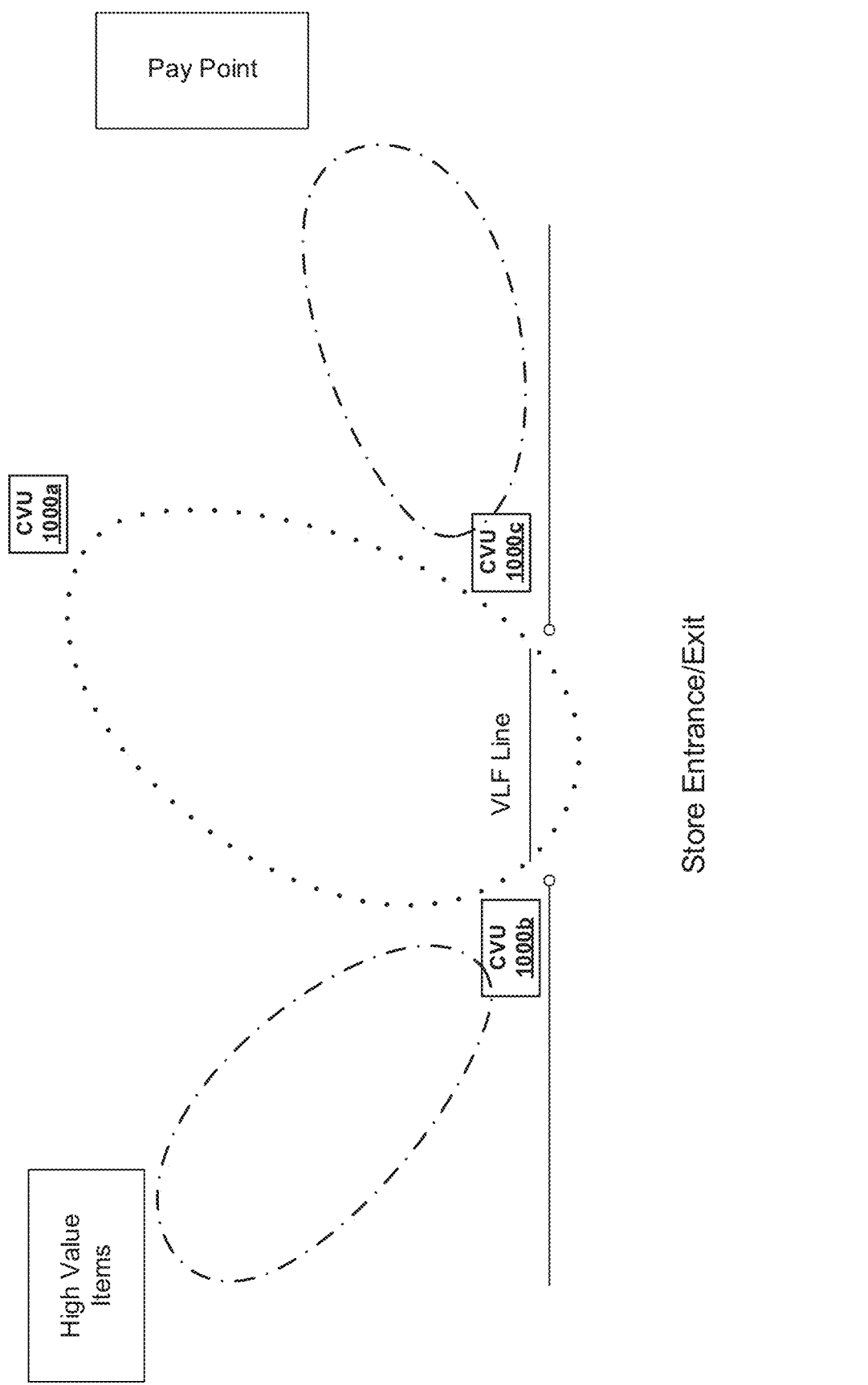
Figure 6C:
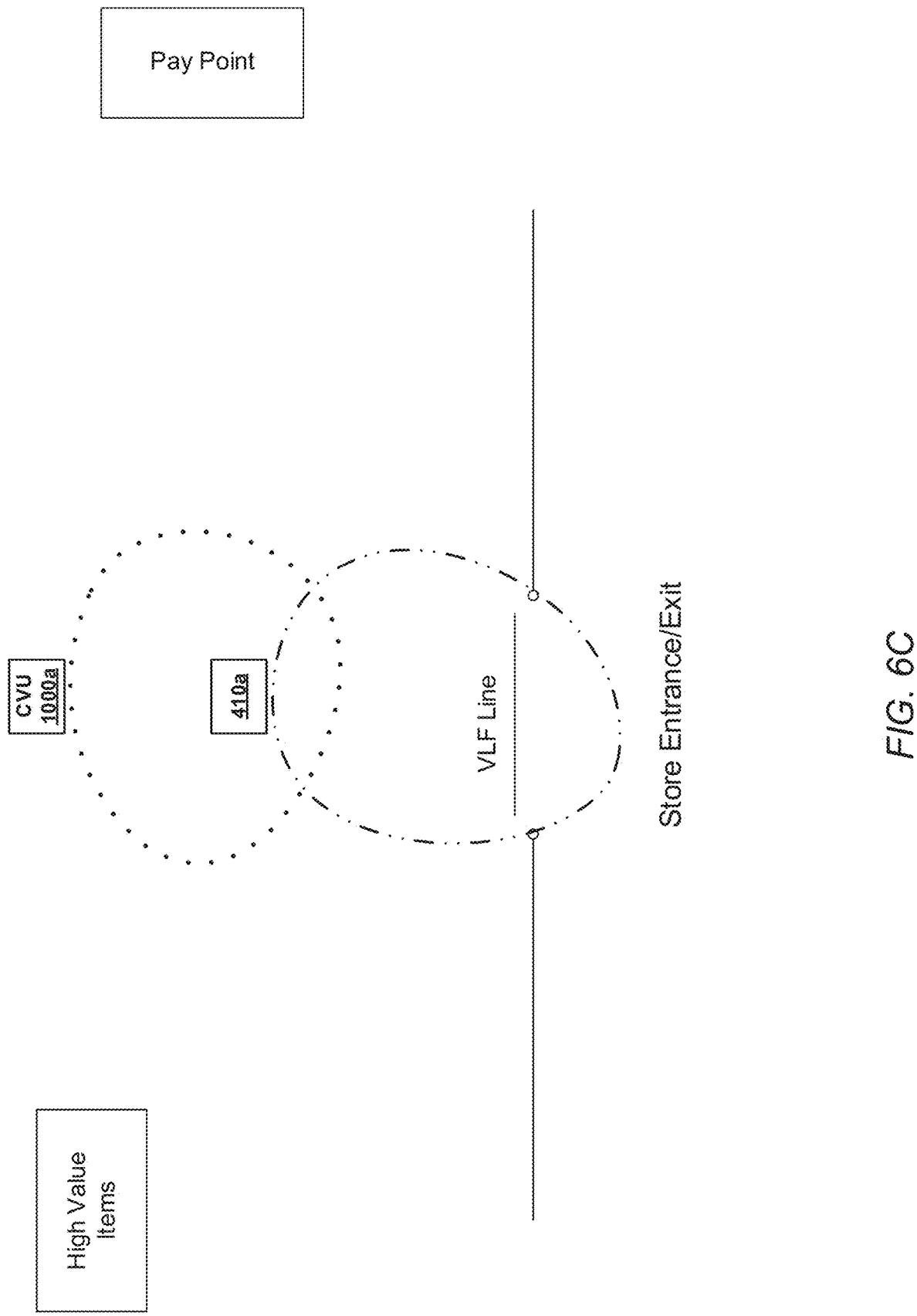

FIG. 5 shows an example scenario with one camera 410. In other implementations, multiple cameras 410, 410a (e.g., 2, 3, 4, 5, 6, or more) can be used to image the surveillance area 440. FIGS. 6A, 6B, and 6C illustrate some example arrangements of CVUs. As noted above, CTUs can be generally used interchangeably with CVUs to capture images of a surveillance area, and one, some, or all of the CVUs shown in the figures can be substituted with CTUs in other implementations.

In FIG. 6A, three CVUs 1000a, 1000b, and 1000c are located to image a surveillance region 440 at an entrance/exit to the store. In this example, an (optional) VLF line is placed at the store entrance/exit. In other installations, additionally or alternatively, RF warning or locking fields can be generated by RF antennas located near the store entrance/exit or checkout barriers, EAS towers, or other anti-shop-lifting devices can be located near the exit. The CVU 1000a is located away from and oriented toward the entrance/exit to obtain images of entering or exiting shopping baskets. The CVUs 1000b, 1000c are located on either side of the entrance/exit and oriented inward to obtain images, in particular, of shopping baskets moving toward the entrance/exit. The three CVUs 1000a, 1000b, 1000c provide overlapping coverage of the surveillance region (e.g., the FOVs of their cameras overlap, with the FOVs schematically illustrated with dotted and dot-dashed lines). In this configuration, use of multiple CVUs can reduce the likelihood that a single CVU does not obtain images of a suspicious shopping basket attempting to leave through the entrance/exit. Also, a shopper pushing a cart may block the view of the shopping basket from a particular CVU. For example, an exiting shopper may block the view of the basket by the CVU 1000a (because the shopper is between the basket and the CVU), but the CVUs 1000b, 1000c should have a good view of the basket (because the basket is between the shopper and these CVUs).

As described above, some implementations may use secondary camera(s) to image other regions of the store. FIG. 6A shows an example of a secondary camera 410a-1 located near a pay point with a FOV pointing toward (and partially overlapping with) the FOV of the CVUs 1000a and 1000c. FIG. 6A also shows an example of a secondary camera 410a-2 located near a region with high value items and with an FOV pointing toward (and partially overlapping with) the FOV of the CVUs 1000a and 1000b. Images from the camera 410a-1 can be used by the anti-theft system 400 to track a path of a shopping basket leaving the pay point and moving toward the exit, and images from the camera 410a-2 can be used to track a path of a shopping basket leaving the high value items area and moving toward the exit. The system 400 can use information from the camera 410*a*-1 as an indicator that the customer has paid for merchandise in the shopping basket, since the basket is coming from the pay point region. The system 400 can use information from the camera 410*a*-2 as an indicator that the customer has high value merchandise in the shopping basket, since the basket is coming from the high value items region. In this example, because the FOVs of the cameras 410*a*-1, 410*a*-2 at least partially overlap with the FOVs of at least some of the other CVUs, the system 400 can maintain continuity of the tracking of the shopping basket as it leaves the FOV of one of the secondary cameras 410*a*-1, 410*a*-2 and enters the FOV of one or more of the CVUs. Such a handoff can advantageously provide continuity of tracking of the shopping basket and reduce or eliminate misidentification of shopping baskets as they move from the FOV of one camera to the next. As will be further described with reference to FIG. 6C, such handoff can increase the efficiency of the system 400, because path tracking is typically less intensive than load status determination, and the CVUs can be primarily used for load status determination rather than tracking.

FIG. 6B shows an alternate arrangement of the CVUs 1000*a*, 1000*b*, 1000*c*. In this example, the CVU 1000*a* is oriented similarly as shown in FIG. 6A. However, the CVUs 1000*b* and 1000*c* are oriented away from the entrance exit and toward other regions of the store. For example, the CVU 1000*b* is oriented toward a region where high value items (e.g., liquor, pharmaceuticals, health care products, etc.) are located, and the CVU 1000*c* is located toward a pay point (e.g., a checkout lane 34). The FOVs of the respective cameras of the CVUs 1000*a*, 1000*b*, 1000*c* do not overlap, in this example. In this configuration, the CVU 1000*a* can be used to identify whether shopping baskets approaching the entrance/exit are loaded or not. The CVU 1000*b* can be used to identify shopping baskets that have been in the high value area, and the CVU 1000*c* can be used to identify shopping baskets that are approaching the exit from the pay point (which may indicate that the goods in the basket have been paid for).

The CVUs 1000*a*, 1000*b*, 1000*c* and the secondary camera(s) 410*a* can be in communication with each other and can share information that may assist in the determination of whether an at least partially loaded shopping basket is approaching the exit in a pushout theft situation. As a shopping basket moves from the FOV of one of the CVUs to the FOV of another CVU or from secondary camera to secondary camera or CVU, this exchanged information can assist the anti-theft system to continue tracking the basket as it moves from one FOV to another FOV.

In this example, the CVU 1000*b* can identify whether the basket contains high value items as it leaves the high value item area, and the CVU 1000*c* can determine if that basket is coming from the pay point region of the store. In such a situation, it may be less likely that the items in the cart have not been paid for, and the system 400 may issue an exit permission to the basket. If the basket attempts to exit the store and the CVU 1000*c* has not identified the basket as coming from (or passing through) a pay point, it is more likely the shopper is attempting to steal the high value items, and the system 400 may not issue an exit permission to the basket and instead take an anti-theft action (e.g., locking a cart wheel, etc.).

FIG. 6C shows another example arrangement of a CVU 1000*a* and a secondary camera 410*a* near the exit to the store. In this example, images from the CVU 1000*a* are analyzed to determine a load status of a shopping basket nearing the store exit. Images from the secondary camera 410*a* are used to determine the path of the shopping basket as it leaves the FOV of the CVU 1000*a* (shown as a dotted line) and moves through the FOV of the camera 410*a* (shown as a double-dot-dashed line). Because the FOVs at least partially overlap, the anti-theft system 400 can have substantial confidence that the shopping basket identified by the CVU 1000*a* is the same basket tracked by the camera 410*a*. Arrangements of the type shown in FIG. 6C can be advantageous, because the image processing by the CVU 1000*a* to determine the load status of the cart is more computationally complex and processor-heavy than that performed on images from the secondary camera 410*a* to determine the path of the basket toward the exit. Accordingly, the CVU 1000*a* is used primarily for load status determination (e.g., fully loaded, partially loaded, or empty) and the secondary camera imagery is used for path determination, which is a less computationally demanding task.

Note that although three CVUs are shown in FIGS. 6A and 6B and one CVU is shown in FIG. 6C, this is for illustration and other numbers of CVUs can be used (e.g., 2, 4, 5, 6, or more). Further, in some implementations, there is only a single CVU (e.g., with image processor and RF communication node) and one or more of the other illustrated CVUs can be replaced with secondary camera(s). The CVU(s) can be placed at one, some, or all of the store exits, or additionally or alternatively, at other store locations (e.g., in the high value item area, near pay points, etc.). CTUs can be substituted for some or all of the CVUs. Many variations of placement and orientation of CVUs, CTUs, or secondary cameras are contemplated. Also, these configurations of CVUs (and cameras) are shown as examples to illustrate the wide range of anti-theft situations and store-specific requirements that can be beneficially addressed by various implementations of the anti-theft system 400 but are not intended to be limiting.

Various factors can influence the choice for the number and placement of CVUs, CTUs, or secondary cameras in an installation at a retail store. These factors can include the FOV of the cameras and CVUs and CTUs, the height of the ceiling of the store (where the CVUs, CTUs, and cameras are typically installed), the typical speed at which shopping baskets move through regions imaged by these components, the distance between pay points or high value items and the store exit, the need to maintain substantially continuous tracking of shopping baskets, and the timescale (e.g., about 100 ms) it takes for the system 400 to identify a shopping basket as a theft risk and to activate an anti-theft measure (e.g., locking a shopping cart wheel).

Three-Dimensional (3D) Imaging

A 3D image of a shopping basket may provide more information for the machine learning or computer vision classifier to analyze and may enable the anti-theft system to more accurately or more robustly classify the load status of the shopping basket. The 3D image may include a two-dimensional (2D) image plus distance or depth information in a direction perpendicular to the plane of the 2D image.

An empty shopping basket has a flat bottom, whereas an at least partially loaded basket will have items that extend above the flat bottom. Non-empty shopping baskets accordingly have a 3D topography that is substantially different from empty shopping baskets. This topography can be used, at least in part, to determine that the basket is non-empty but also may provide information on the type of items that are in the basket (e.g., the topography due to a roughly cubical package of baby diapers is different than the topography due to bottles of liquor). Accordingly, in some implementations, the anti-theft system 400 includes sensors that provide depth information. As described with reference to FIG. 4A, such sensors 460 can include depth cameras, stereo pairs of cameras, ultrasonic sensors, time-of-flight sensors, lidar (scanning or non-scanning), millimeter wave radar, etc.

For example, two cameras can be used to form a stereo image of the shopping basket and depth information can be derived using stereoscopic imaging techniques. Since cameras, CVUs, and the like are often installed on ceilings of retail installations and the height of ceilings above the bottom of a shopping basket is in a range from about 3 m to 5 m, it is estimated that the pair of stereo cameras may be placed a distance about 20 cm to 50 cm apart to provide sufficient stereo separation. The pair of stereo cameras can be disposed within a housing of a CVU or CTU or the camera 410 of a CVU or CTU can be paired with a nearby secondary camera 410a to provide the stereoscopic depth-sensing functionality.

A time-of-flight (ToF) sensor (sometimes referred to as a time-of-flight array or non-scanning lidar) can be used with an imaging camera to provide a 3D image of the shopping basket. A ToF sensor may include a laser to emit optical pulses and timing circuitry to measure the time between emission and an optical signal reflected back from an object. The measured time (and the speed of light) provide a distance to the object. Integrated ToF camera modules that incorporate a ToF sensor and an imaging camera are available from Analog Devices, Inc. (Norwood, Mass.). Analog Devices also provides an ADDI9036 CCD ToF signal processor and the AD-96TOF1-EBZ 3D ToF development platform.

In some implementations, additionally or alternatively to an optical ToF sensor, an acoustic ultrasound sensor can be used to provide distance/depth information. For example, a high frequency (e.g., greater than 100 kHz) ultrasonic ranging sensor can be boresighted with an imaging camera. The ultrasonic sensor can have a relatively narrow field of view (to provide sufficient resolution for objects in the basket) and a sufficiently high pulse repetition rate (to provide sufficient temporal resolution since shopping baskets move). The high frequency structure of a reflected ultrasonic pulse is different when scattered off the bottom of the shopping basket (typically a metal or plastic mesh) than when scattered off surfaces of merchandise in a non-empty basket. The ultrasonic signal can be used for simply detecting whether there are items in the shopping basket or (with a sufficiently narrow FOV) identifying the depth contours of items in the basket.

In some implementations, a radar sensor can be used to provide depth sensing capabilities. An example of a radar sensor is a RETINA 4D Image Radar available from Smart Radar System (Gyeonggi-do, Korea), which provides 3D position information plus velocity. The RETINA radar can generate a 4D point cloud, which can be analyzed by, for example, a neural network to identify objects within the point cloud.

3D images can be used to train the machine learning or computer vision model, and the additional depth information (as compared to 2D imagery) can aid in providing more accurate or robust estimates of the load status of a shopping basket. Further, since different types of merchandise will have different depth signatures, the machine learning or computer vision model can learn to distinguish different types of merchandise and may be configured to factor that type of information into the load status (e.g., a higher load status for baskets containing liquor bottles than for baskets containing produce).

Identifying Children in a Shopping Cart

As described with reference to FIG. 2B, a shopping cart 30 can include a child seat 1620 in which a shopper can place a small child. A small child may be placed in the shopping basket 205 itself. Thieves may use a small child to hide goods, to provide a distraction, or to disguise their intentions (e.g., a parent with a small child may be less likely to be perceived as a thief). Accordingly, some implementations of the anti-theft system 400 may be configured to determine the presence of a small child (including a baby) in the shopping cart.

Images (2D or 3D) obtained by the system 400 (e.g., from a CVU, CTU, or secondary camera) can be analyzed to make this determination. Items placed in the cart (either in the shopping basket 205 or in the child seat 1620) tend not to move relative to the cart whereas small children do tend to move relative to the cart (e.g., moving head, arms, or legs, swaying body, etc.). Thus, a discriminant of whether an object in the cart is a child is whether the object is moving relative to the cart. A time series of images (2D or 3D) can be analyzed to determine which objects, if any, are moving relative to the translational or rotational motion of the cart itself. For example, positions of objects relative to fixed positions in the cart (e.g., relative to the handle 1610, to the sidewalls of the basket, etc.) can be compared over the duration of the time series to classify whether the object is moving relative to the cart and therefore whether the object is likely to be a child. In the case of 3D images, the depth information can provide a discriminant for a child, because the depth signature of a child (with head, arms, torso, legs) is different than typical retail store merchandise.

Example Paths of Shopping Baskets and Potentials for Theft

Figure 7:
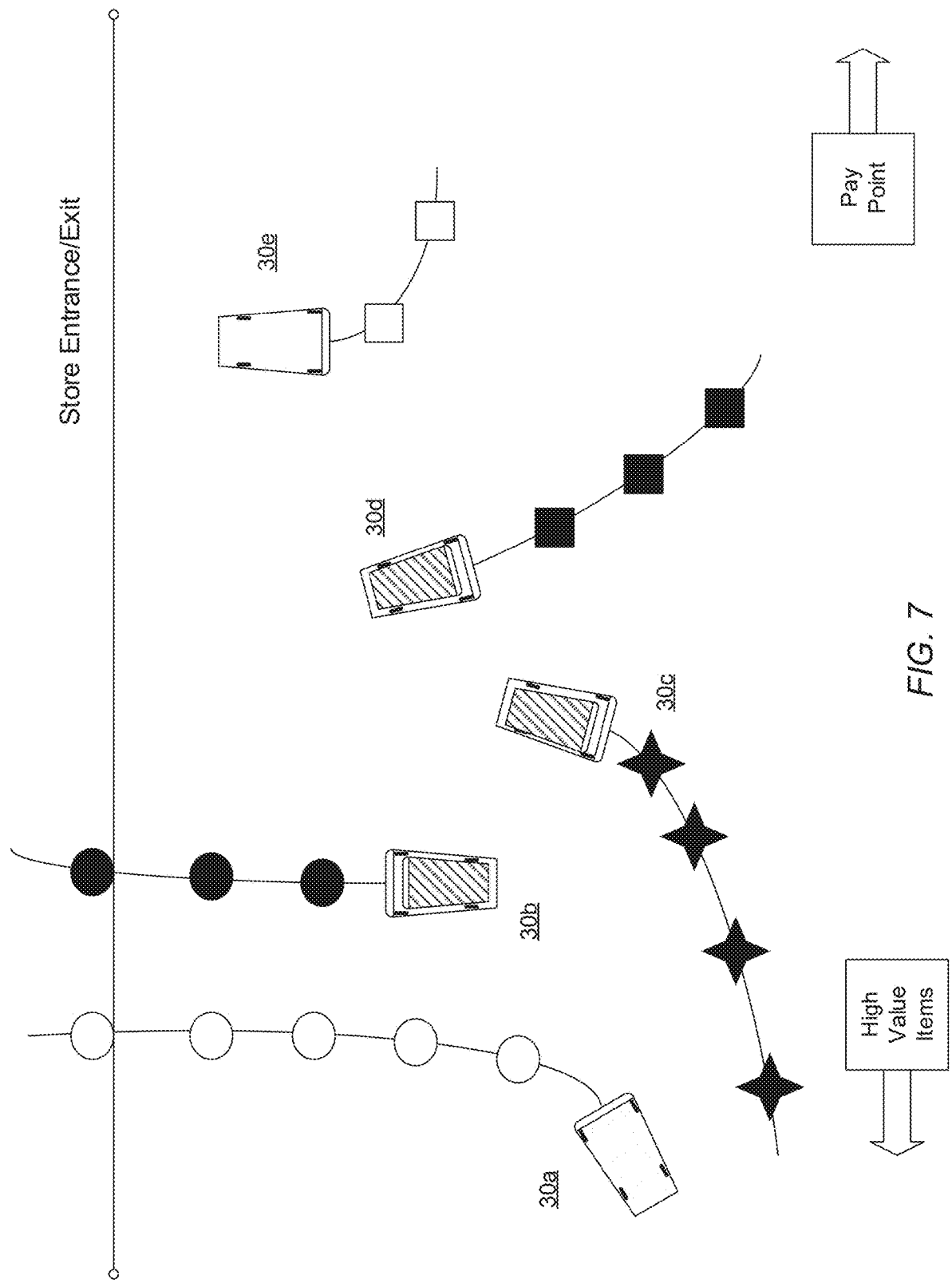
FIG. 7 schematically illustrates an example of paths taken by shopping baskets near an entrance/exit to a retail store. Empty baskets are shown without cross-hatching and at least partially loaded baskets are shown with cross-hatching. Symbols on the paths taken by the shopping baskets (in this example, shopping carts) indicate likelihood of pushout theft.

FIG. 7 schematically illustrates an example of paths taken by shopping baskets near an entrance/exit to a retail store. Empty shopping baskets are shown without cross-hatching and at least partially loaded baskets are shown with cross-hatching. In this illustrative example the shopping baskets are part of shopping carts 30a-30e, but this is for illustration and is not a limitation. Symbols on the paths taken by the shopping baskets (in this example, shopping carts) indicate likelihood of pushout theft, as will be further described below. The paths taken by the shopping carts 30a-30e can be determined by CVU(s) as described above. For example, the configuration of CVUs shown in FIGS. 6A-6C may be suitable to image the store entrance/exit as well as the region where high value items are located and the region where pay points are located.

The paths of the carts 30a-30e in FIG. 7 are annotated with symbols that graphically display properties and theft potential. Circles are used for entering carts, with an open circle indicating an empty cart, and a filled circle indicating an at least partially loaded cart. Squares are used to indicate exiting carts, with an open square indicating an empty cart, and a filled square indicating an at least partially loaded cart. An exiting cart with a high potential of theft is illustrated with a solid four-pointed star.

Cart 30a is entering the store and is determined to be unloaded. The path of the cart 30a is annotated with open circles. Cart 30b is also entering the store and the CVU determines that the cart is at least partially loaded. This may be due to the presence of a child or handbag in an open child seat or to the presence of items that are stored outside the store and which the shopper has placed into the basket. Carts 30*d* and 30*e* are exiting the store. Cart 30*e* is unloaded and does not present a theft potential.

Cart 30*d* is loaded, however, because it is approaching the exit from the direction of a pay point, the cart 30*d* may not present a theft potential. To further confirm the payment status of the cart 30*d*, the anti-theft system 400 may query the pay point (e.g., a register 34 or a mobile pay point 35) to determine if the cart 30*d* actually passed through an active checkout lane (e.g., spending sufficient time in the lane to indicate payment) or paid for the items in the cart's basket using a mobile payment application. If so, the system 400 can issue an exit permission to the cart 30*d*. In implementations using checkout barriers (CBs), the command may be to unlock the CB to permit exit. If there is no further indicia of payment, the cart 30*d* may be attempting to mimic payment by coming from the direction of the pay point, or rapidly passing through the pay point without spending sufficient time to indicate payment has occurred, and the system 400 may issue an anti-theft command to the transceiver of the cart 30*d*. This command may be a warning command (rather than a lock command) given that the cart 30*d* is coming from the direction of the pay point. In implementations using checkout barriers (CBs), the command may be to keep the CB locked to prevent exit of the cart 30*d*. The anti-theft system 40 may issue a command to store personnel to come to the associated CB or exit to determine whether the shopper has actually paid for the goods.

Cart 30*c* is determined to be loaded and is approaching the exit from the direction of where high value items are located rather than the direction of a pay point. Cart 30*c* represents an increased potential for theft and is annotated with a filled star. The anti-theft system 400 can query the pay point to determine if the cart 30*c* previously passed through a pay point. If so, the cart 30*c* may have subsequently entered the high value item area and placed high value items into the shopping cart basket without paying. The system 400 may refuse to issue an exit permission to the cart 30*c* (or refuse to open a checkout barrier) and instead issue a lock command to the cart 30*d* or an alert to store personnel to attempt to prevent possible theft of merchandise from the store.

The foregoing examples are intended to be illustrative, but not limiting, of the logic that can be performed by implementations of the anti-theft system 400, using the image processing capabilities of the CVU(s).

Although the symbols shown in FIG. 7 are intended to generally be descriptive, in some implementations, the images (e.g., often video) acquired by the CVU(s) can be overlaid (or annotated) with markings similarly as shown in FIG. 7. For example, video acquired by a CVU can be processed (e.g., by the image processor 420 or a remote processing node) to show the cart paths. Different colors or symbols can be used to distinguish paths of entering or exiting carts or carts with different theft potential (e.g., like the symbols shown in FIG. 7). Authorized store personnel can access the annotated images to view exit events in which a pushout situation occurred.

Example Machine Learning Techniques for an Anti-Theft System

In some implementations, the CVU 1000 (e.g., the image processor 420) implements one or more object recognizers that can crawl through the received data (e.g., the collection of images) and recognize or map points, tag images, attach semantic information to objects (e.g., shopping cart, motorized mobility cart, shopping basket, empty, loaded, etc.), and so forth.

The object recognizers can recognize shopping baskets, shopping carts, motorized shopping or mobility carts, goods and merchandise within a shopping basket (which can include an under-basket at the bottom of a shopping cart), presence of an object (e.g., a child or a handbag) located in a child seat of a cart, indicia associated with a user who is pushing or operating a cart (e.g., a particular style of shirt (e.g., plaid or striped), a particular pair of pants or a skirt or a jacket or a hat), characteristics of the user (e.g., facial features, body features), etc. The object recognizers may identify store personnel, for example, by identifying the person is wearing a store uniform, identification tag, etc. In some implementations, the object recognizers do not identify facial or body characteristics, for privacy purposes.

The object recognizers can recognize an entrance/exit, a checkout lane, or other objects in the store. One or more of the object recognizers may be specialized to recognize an object with certain characteristics. For example, one object recognizer may be used to recognize shopping baskets, while another object recognizer may be used recognize goods or merchandise in a shopping basket, while another object recognizer may be used to recognize characteristics of a user associated with the shopping basket, and so forth.

By analyzing multiple sequential images (e.g., frames from a video), the object recognizers can determine a path of a shopping basket as the basket enters or leaves the store. In some cases, the object recognizers may classify the shopping cart behavior, for example, entering or exiting, instead of (or in addition to) determining a path.

The object recognitions may be performed using a variety of computer vision techniques. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, relevance vector machine, k-nearest neighbors algorithm, Naive Bayes, a neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the CVU 1000 (e.g., the image processor 420). Some examples of machine learning algorithms can include supervised or non-supervised machine learning algorithms, including regression algorithms (such as, for example, Ordinary Least Squares Regression, logistic regression (e.g., logit model)), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms.

The machine learning models can include neural networks such as, for example, convolutional neural networks, recursive or recurrent neural networks, stacked auto encoders, etc. The neural networks can include deep neural networks with many layers (e.g., greater than 3, 5, 10, or more layers). The neural networks can include convolution layers, pooling layers, fully connected layers, classifier layers (e.g., softmax), activating functions (e.g., rectified linear units), loss layers, and so forth. Weights in the neural network can be learned using supervised or unsupervised learning techniques.

Individual machine learning models may be customized for individual applications or installations. For example, CVU 1000 can store a default model for analyzing images of shopping baskets. The default model may be used as a starting point to generate an additional model specific to the conditions where the CVU is installed. For example, when installed in a particular store having a particular exit, the object recognizers can learn the specific characteristics of the exit the CVU is monitoring and learn the specific characteristics of the shopping baskets, shopping carts, etc. used by that particular retail store. For example, the CVU can use supervised or unsupervised training techniques applied to images acquired post-installation to update the computer vision, machine learning, or object recognition algorithms. Thus, the default computer vision, machine learning, or object recognizer can be particularized to the specific environment whose images it analyzes. The computer vision, machine learning, or object recognizer can continue to learn over time and can become more efficient and accurate at its object recognition tasks.

In some implementations, the machine learning techniques can be implemented using TensorFlow™ or TensorFLow Lite (available at www.tensorflow.org) or using Torch™ (available at torch.ch or a Python-implementation, PyTorch™, available at pytorch.org), each of which provides an open source software library for programming machine learning applications such as, e.g., image recognition using a neural network. The neural network can include a convolutional neural network (CNN) and may be a deep network (e.g., including 3 or more layers of artificial neural networks where each layer is trained to extract one or more features of the image). In some implementations, convolutional layers can be followed by one or more fully connected (layers), a support vector machine (SVM), a softmax layer, or other type of classification layer. For example, the output of a neural network may be a classifier such as a load status for the shopping basket. As described herein, the load status may indicate that a shopping basket is loaded or unloaded, or empty, partially loaded, or fully loaded, a score, a numerical range, etc. As another example, the output of a neural network may be a classifier that a shopping basket is entering the store (e.g., which is not indicative of a potential theft event) or exiting the store (e.g., which is indicative of a potential theft event).

The machine learning technique can be trained via supervised or unsupervised learning methods. For example, training images of shopping baskets entering or leaving a store exit can be obtained (e.g., from a CVU, CTU, or store surveillance system) and classified with a load status such as, for example, empty, partially loaded, or fully loaded with merchandise. In some cases, the training images are segmented to include the front of the shopping basket but not to include the area of the child seat 1620 (see FIG. 2B). This advantageously may reduce training or classification problems, because the machine learning technique does not need to process images that might include a child (or handbag or other non-merchandise item) in the child seat 1620.

Semantic information such as, e.g., the type of the shopping basket (e.g., human-propelled cart, motorized cart, hand basket), whether the basket is entering or exiting the store, presence or absence of high value items in the basket, etc. can also be classified in the training images. In some implementations, the training images are annotated/classified manually. This training data can be used by the machine learning technique (e.g., a convolutional neural network with a fully connected layer classifier) to learn how to analyze and classify new images. The training may be performed by the cloud platform 470 described with reference to FIG. 4B.

During use of the anti-theft system 400, images of shopping baskets can continue to be obtained and classified/annotated, and these images can be used to further train or update the machine learning techniques. Images of shopping cart paths (see, e.g., FIG. 7) can be reviewed or analyzed to improve ambiguous classifications or identifications of loaded or unloaded carts. Data obtained for the position or path of the cart using, e.g., RF techniques, can be compared with position or path determined from image processing techniques to improve the system's position or path determination (e.g., using machine learning training methods).

Accordingly, the machine learning techniques can be particularized over time for the actual retail store environment in which the anti-theft system 400 is installed, which advantageously can lead to increased accuracy, efficiency, or improved performance in recognizing potential theft situations.

Example Processing Pipelines and Workflows for an Anti-Theft System

Figure 8:
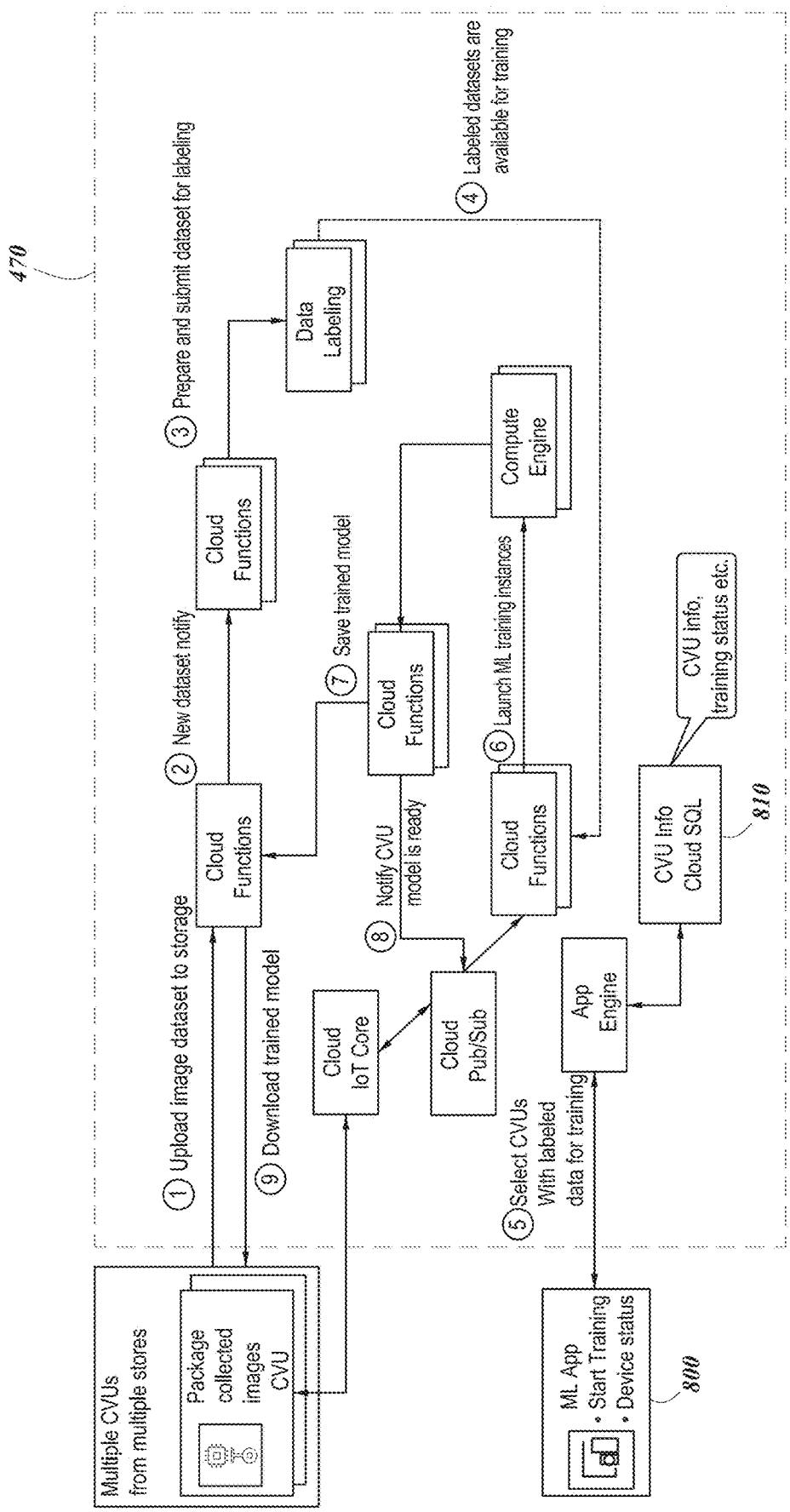
FIG. 8 schematically shows an example of a processing pipeline for training a machine learning (ML) model.

FIG. 8 shows an example of a processing pipeline for training a machine learning (ML) model. The pipeline can be performed by the cloud platform 470 of the anti-theft system 400 described, for example, with reference to FIGS. 1, 4A, and 4B. The pipeline receives image data that is collected from multiple CVUs, CTUs, secondary cameras, store surveillance systems, etc. The image data can come from a single retail facility or multiple retail facilities. The pipeline can be accessed or controlled via a ML training application (app) 800, which may be a web-based interface to the cloud platform 470. For example, a system administrator may use the ML training app to start training an ML model, find information about the status of a CVU (e.g., from a database 810 of CVU information), communicate an updated ML model to a particular CVU or CVUs. Because the received image data may be from a particular store (or stores), the trained ML model may be customized for that particular store (or stores). For example, certain stores may utilize shopping baskets with a plastic mesh (rather than a metal wire mesh), and the ML model can be trained on imagery from those stores to not only better recognize baskets with the plastic mesh structure but also to better recognize store merchandise placed into such baskets.

At point 1 of the pipeline illustrated in FIG. 8, an image dataset is uploaded to the cloud platform 470 from one or more CVUs via the WAN gateway 465. At point 2, the platform is notified of the receipt of the new image dataset, and at point 3, the image dataset is prepared and submitted for data labeling (which may be performed by human classifiers). For example, the shopping baskets can be identified in the images and the baskets can be classified with reference to a load status. At point 4, the labeled imaging dataset is available for training an ML model. The training can be to generate a new ML model or to update an existing ML model.

At point 5 of the pipeline, the ML app 800 can be used to select CVUs with labeled data for training or to provide other control instructions to the cloud platform 470. At point 6, instances of the ML training can be launched and executed by a compute engine in the cloud platform 470. The compute engine can train a new or updated ML model, and at point 7, the trained model can be saved. At point 8, a CVU can be notified that a new or updated ML model is available, and at point 9 of the pipeline, the trained model can be downloaded by the CVU.

Figure 9:
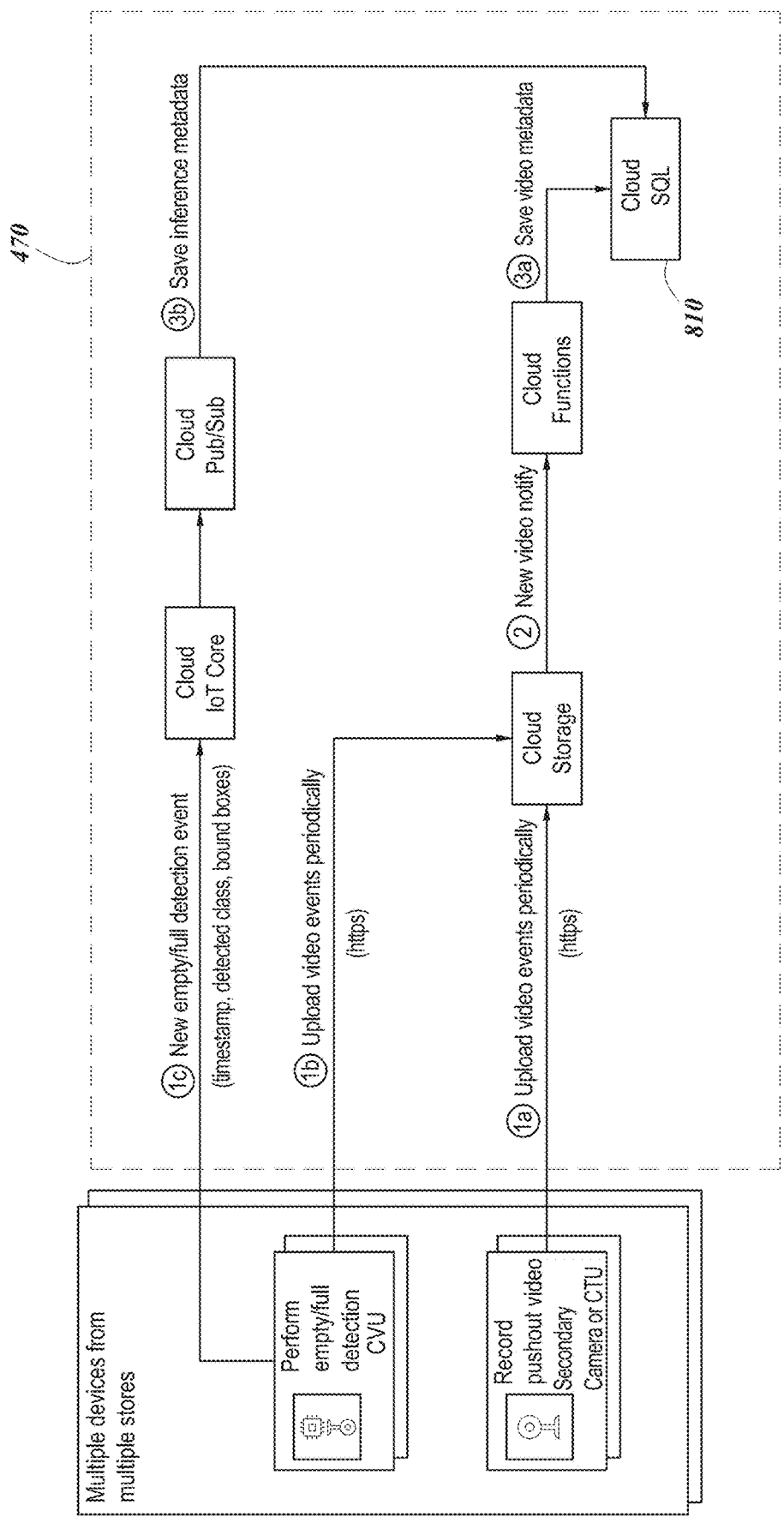
FIG. 9 schematically shows an example of a processing pipeline for analyzing images obtained from an anti-theft system.

FIG. 9 schematically shows an example of a processing pipeline for analyzing images obtained from an anti-theft system. The pipeline can be performed by the cloud platform 470 described with reference to FIG. 4B. The pipeline receives image data that is collected from multiple CVUs, CTUs, secondary cameras, store surveillance systems, etc. The image data can come from a single retail facility or multiple retail facilities. As described above, the image data commonly includes videos of possible pushout theft events at retail stores. At points 1a and 1b of the pipeline, image data from CVUs, CTUs, secondary cameras, or other store surveillance systems are uploaded periodically to the cloud platform 470, e.g., via the WAN gateway 465, and stored in cloud storage. At point 1c, load status detection events determined by CVUs can additionally or alternatively be uploaded to the cloud platform 470. The load status detection events can include a timestamp for the event and the determined load status of the shopping basket involved in the event (e.g., empty, partially loaded, fully loaded, etc.). The image data can include annotations such as bounding boxes around the shopping basket or cart involved in the event, around merchandise in the cart, around the customer using the shopping basket, and so forth. At point 2, the cloud platform 470 can be notified of the new upload.

At points 3a and 3b of the pipeline, the cloud platform 470 can analyze the image data to determine, e.g., image metadata and store the metadata in a cloud database 810 (e.g., a structured query language (SQL) database). The metadata can include inference metadata determined from the CVU detection events. Inference metadata can include, for example, where a shopping basket is located in an image frame, a time of the event, how much time was needed to perform the load status determination, a confidence value associated with how confident the ML model is that the load status was correctly inferred from the image data, ML model weights and parameters used in the image analysis, and so forth. The metadata can also include image metadata that correlates image data of a pushout theft event obtained from CTUs, secondary cameras, or store surveillance video (which may not be associated with a load status determination) with image data for the event obtained from a CVU (which will be associated with a load status determination). The image metadata may include information on the correlation between the image data from CTUs, secondary cameras, or store surveillance video and the image data from the CVU.

Figure 10:
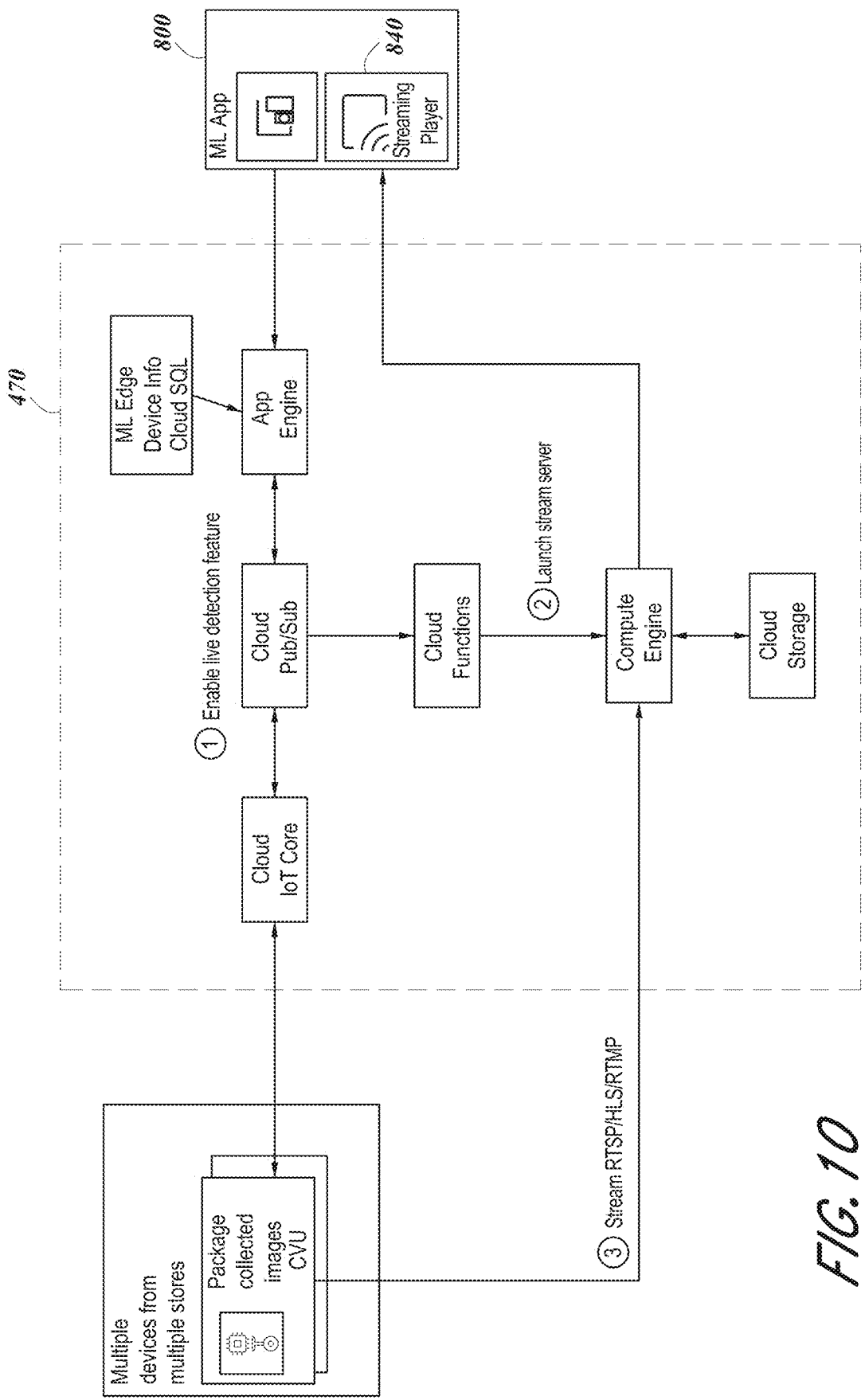
FIG. 10 schematically shows an example of a processing pipeline for real-time event detection or live streaming from an anti-theft system.

FIG. 10 schematically shows an example of a processing pipeline for real-time event detection or live streaming from an anti-theft system. The processing pipeline can be used to provide the real-time event detection or live streaming 476 described with reference to FIG. 4B. The processing pipeline can be managed using the ML app 800 described with reference to FIG. 8. Because live streaming of image data may utilize substantial bandwidth of the WAN gateway 465, the live streaming functionality may only be activated when needed, for example, by a system administrator or authorized field service or retail store personnel to perform diagnostics, testing, installation, or service of the anti-theft system 400.

At point 1 of the pipeline, live detection is enabled and at point 2, a live stream server is launched. At point 3, image data from CVUs, CTUs, secondary cameras, or store surveillance systems is streamed via the WAN gateway 465 to the cloud platform 470. The ML app 800 can include a streaming player 840 that can display the streamed image data. In various implementations, the WAN gateway 465 can implement one or more streaming protocols such as, e.g., real time streaming protocol (RTSP), HTTP live streaming (HLS), or real-time messaging protocol (RTMP).

Figure 11:
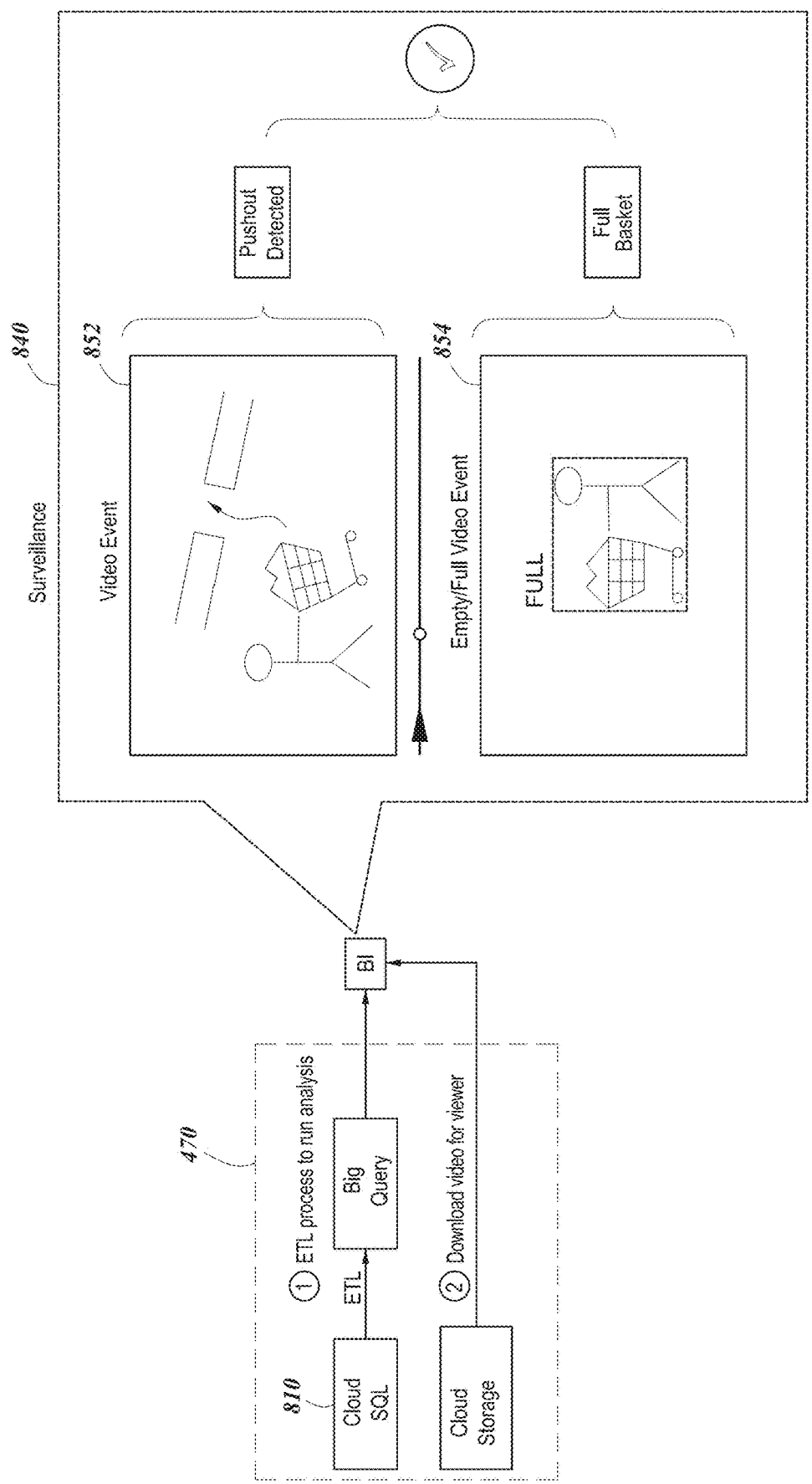
FIG. 11 schematically shows an example of a pipeline for business intelligence (BI) analysis of image data from an anti-theft system.

FIG. 11 schematically shows an example of a pipeline for business intelligence (BI) analysis of image data from the anti-theft system 400. At point 1 of the pipeline, an ETL (extract, transform, load) process can be used to access the database 810 and run desired BI queries on the image data and metadata stored by the cloud platform 470. At point 2 of the pipeline, the image data can be downloaded from the cloud platform to the streaming viewer 840, which may be a component of the ML app 800 used to interface with the cloud platform 470. As described above, the cloud platform 470 can store image data (e.g., videos) of possible pushout theft events at retail stores. The image data can include pushout theft event video 852 obtained from CTUs, secondary cameras, or store surveillance video (which may not be associated with a load status determination) as well as video 854 for the pushout theft event obtained from a CVU (which will be associated with a load status determination such as whether the shopping basket is empty, partially loaded, or full). Authorized store personnel or a system administrator can view the pushout theft video, run analytics on the image data and the metadata, and so forth. For example, as shown in the example of FIG. 11, the surveillance video 852 shows a pushout theft occurring and the associated CVU video of the event identified the shopping basket as full. This example represents a successful pushout theft detection by the anti-theft system (indicated by the checkmark in FIG. 11). The BI queries can include information about false positives (e.g., an innocent event mistakenly identified as a theft) or false negatives (e.g., a pushout theft that was mistakenly identified as innocent) generated by the system, statistics about the frequency, time of occurrence, or estimated loss amount for pushout thefts, and so forth.

The example pipelines described with reference to FIGS. 8 to 11 are intended to be illustrative and not exclusive. The cloud platform 470 may be configured to perform the functionality of one, some, or all of these pipelines in various implementations.

Figure 12:
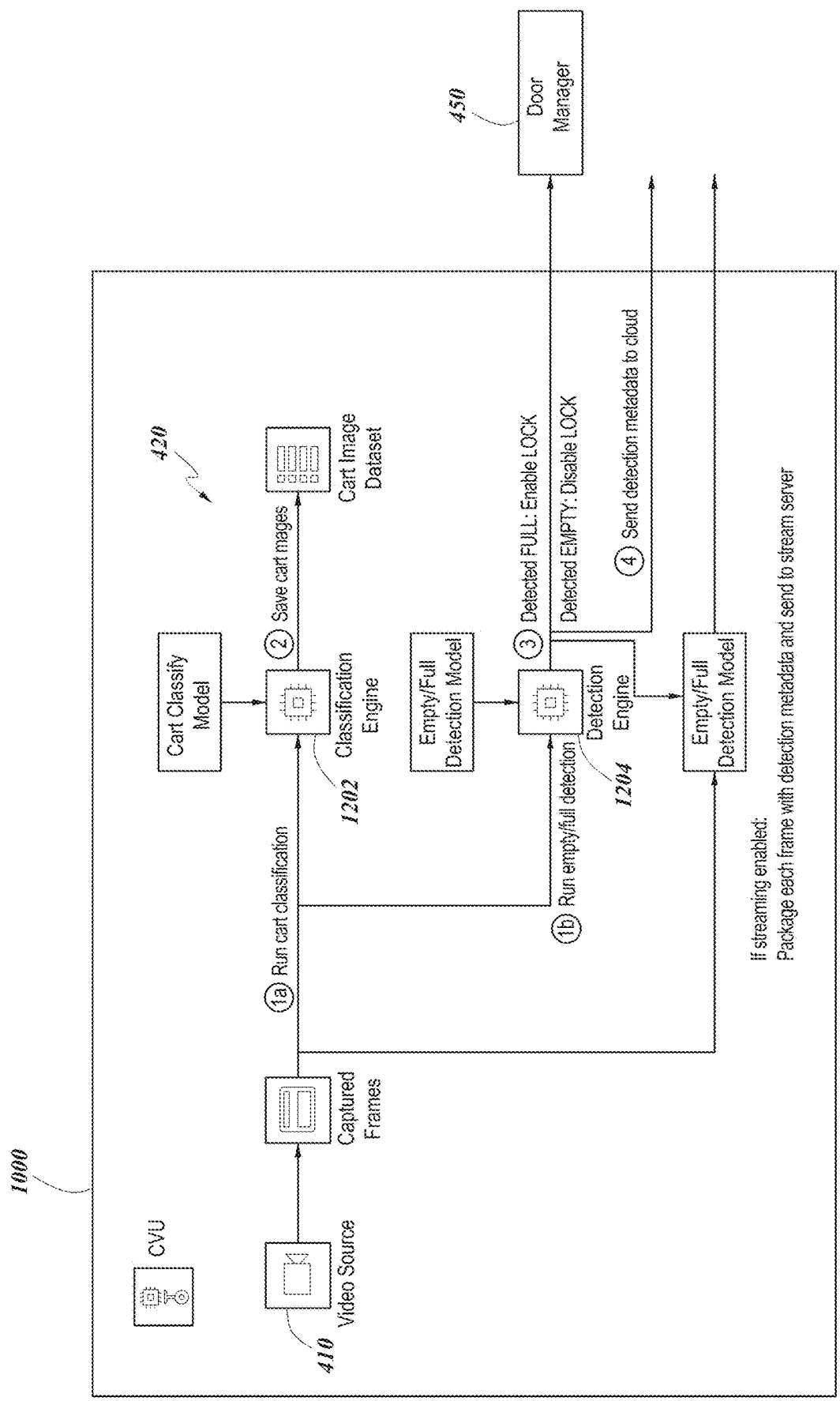
FIG. 12 schematically shows an example of a processing pipeline in a CVU.

FIG. 12 schematically shows an example of a processing pipeline in an example of a CVU 1000. The processing pipeline can be performed, at least in part, by the processor 420 of the CVU. Much of the functionality of the CVU 1000 has been described above and will not be further repeated here. In this example pipeline, the CVU is configured to provide a load status for a shopping cart 30, which comprises a shopping basket 205 for storing merchandise. In this example, the load status is empty or full, for illustrative purposes, but as described herein a more general load status can be provided. The processor 420 is programmed to execute a classification engine 1202 and a detection engine 1204.

At point 1*a* of the pipeline, image data (e.g., videos of the surveillance region of the store) is sent to the classification engine 1202, which executes an ML cart classification model. The classification model can be trained to identify presence (or absence) of a cart in the image and location of the cart in the image. The cart classification model may segment the image to identify the shopping basket portion of the cart. Since images typically contain things other than carts, the classification model can also classify the image regarding whether the image contains a person (e.g., a shopper or store personnel pushing the cart or a small child in the cart) or other animate object (e.g., a service animal). At point 2 of the pipeline, the classified images (and classification metadata determined by the classification engine) can be stored in a cart image dataset. The classified images may be annotated with bounding boxes around objects classified in the image (e.g., the cart, the basket, a shopper, etc.). In some cases, images that do not contain a cart are not stored, which advantageously reduces memory usage.

At point 1*b* of the pipeline, the images data are communicated to the detection engine 1204, which executes an ML detection model to determine a load status of the cart (or basket). The ML classification model can be different from the ML detection model, which may advantageously permit each of these ML models to be trained for their respective tasks. In other implementations, the ML classification model and the ML detection model are part of the same ML model, which may advantageously permit the ML model to be trained in an integrated fashion, since there is overlap between the classification and the detection tasks. In some implementations, the classification engine 1202 is executed prior to execution of the detection engine 1204. If the classification engine 1202 determines that no cart is in the image, then the detection engine 1204 may not be executed, which advantageously conserves power and processing cycles and improves efficiency. In other implementations, the classification engine 1202 acts as a preprocessor and only upon detection of a cart in the image is the detection engine 1204 executed. This also advantageously conserves power and processing cycles and improves efficiency.

At point 3 of the pipeline, the load status (e.g., FULL or EMPTY in this example) is communicated to the door manager 450 (e.g., described with reference to FIGS. 1A, 1B, and 4A) for taking an appropriate anti-theft action for the cart. For example, if the detection engine determines the cart is FULL, then an Enable Lock status can be communicated to the door manager 450, which communicates a lock command to a smart locking wheel 215 of the cart. If the detection engine determines the cart is EMPTY, then a Disable Lock status can be communicated to the door manager 450, which may take no action to actuate a wheel lock or may communicate an unlock command to a smart locking wheel 215 of the cart.

At point 4 of the pipeline, detection metadata (e.g., load status) can be communicated to the cloud platform 470.

The processing pipeline schematically shown in FIG. 12 can be utilized in various implementations of the CVU 1000, which can intercommunicate with the cloud platform 470 as described in the pipelines schematically shown in FIGS. 8 to 11. As explained below, the pipeline shown in FIG. 12 may be augmented to additionally consider classifications of items detected in the cart.

Image Capture Using Onboard Camera Module

Figure 13:
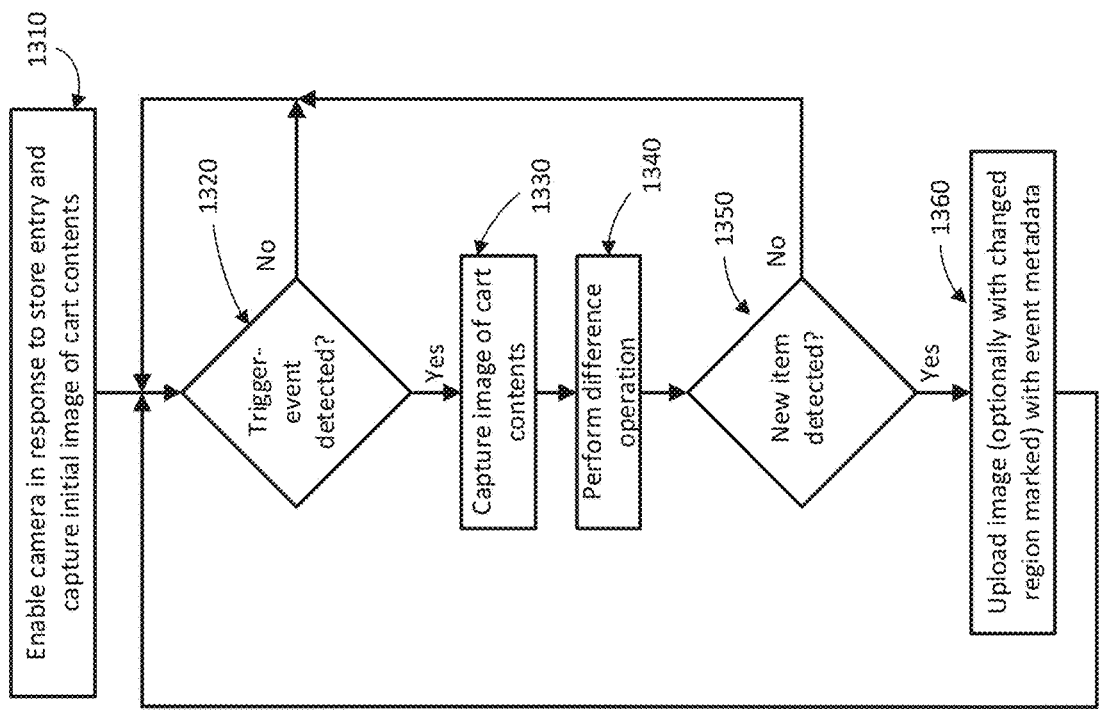
FIG. 13 illustrates a process that may be implemented by a cart-mounted camera or camera module to capture and process images of cart contents.

FIG. 13 illustrates a process that may be implemented by a camera module 217 to capture, pre-process, and upload images of cart contents. The process may, for example, be controlled by the camera module's control processor 217D (FIG. 2E) under control of firmware. In some embodiments, the camera module may communicate wirelessly with the cart's wheel assembly and use information obtained from the wheel assembly to implement the process. This information may include, for example, wheel rotation data, cart location data, etc. The process may alternatively be implemented without communicating with a wheel assembly.

As depicted by block 1310, the camera module 217 may enable its camera/imager 217B in response to the shopping cart entering the store, and may then capture an initial image. Any items in the cart at this point will ordinarily be non-merchandise items, such as purse, reusable shopping bag, backpack, or child. In block 1320, the camera module waits for a triggering event representing the possible addition of a merchandise item to the cart's basket. As explained above, examples of such triggering events include: (1) the detection of a shock/vibration event having a vibration profile corresponding to the signature of an item-add event, (2) the initiation of cart movement in a merchandise area, (3) if the cart includes a scale, and change in basket weight that exceeds a threshold, and (4) if the cart includes a motion detector, the detection of motion inside the basket.

In response to a triggering event, the camera module 217 captures an image of the basket contents (block 1330) and compares this image to the most recently captured image (block 1340). Based on this comparison or difference operation, the process determines whether a new item has likely been added to the basket (block 1350). If a new item is detected, the image—optionally marked to show the region of the newly added item—is uploaded to a CVU or other node for further analysis, preferably together with event metadata for the capture event. (If no new item is detected, the camera module may discard the image.) To reduce wireless bandwidth consumption, a reduced representation of the image, such as a compressed version of the image, may alternatively be uploaded. The event metadata may include, for example, one or more of the following: (1) the cart location (e.g., store department), (2) a classification of the shock/vibration event, or other triggering event, that triggered the image capture, (3) if the shopping cart includes a scale, a weight measurement, or a weight difference relative to the preceding weight measurement, (4) wheel rotation data. Because the receiving entity knows the unique RF ID (which may also serve as a cart ID) of the transmitting camera module, the receiving entity can store the image and metadata in association with the particular cart.

The process may then wait for the next trigger event. The process shown in FIG. 13 may continue until, e.g., the shopping cart passes through an active checkout area or exits the store. In embodiments in which the camera module 217 includes multiple cameras, each such camera may be used to capture a respective image when a triggering event occurs, and one set of images may be compared to another set in block 1340.

Classification of Cart Contents

Figure 14:
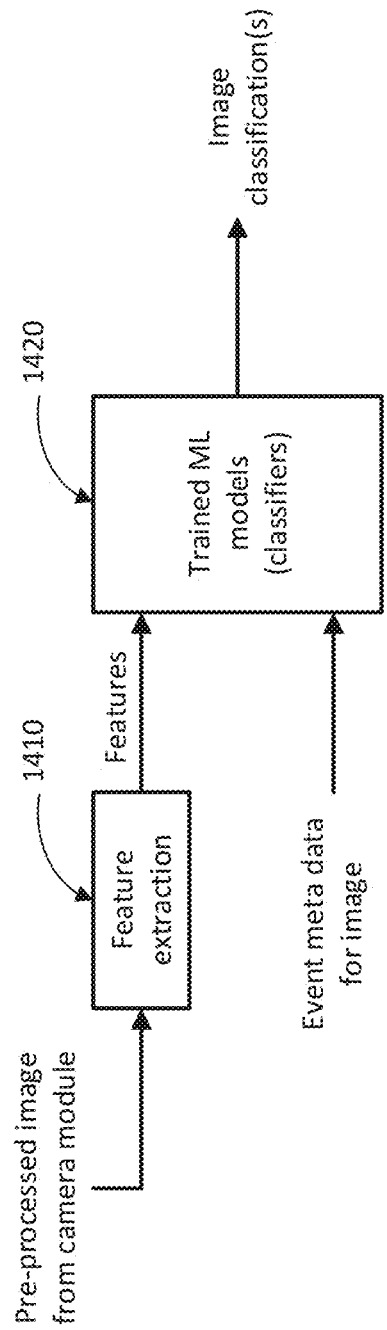
FIG. 14 illustrates how item classifications may be generated for captured images.

FIG. 14 illustrates a process that may be used by a CVU or other processing node to analyze an image captured by a cart's camera module 217 (or a set of two or more images if the camera module has multiple cameras). As explained above, this image may be a pre-processed image that is marked (e.g., with a boundary box) to identify the pixels or pixel region representing the newly detected item. As shown in FIG. 14, a feature extraction module initially processes the image to extract features that are useful for item classification or identification. Examples of such features include, for example, one or more of the following: item color(s), item shape, item size, text extracted via OCR, and item texture. For at least some features, the feature extraction may be applied only to the marked image region corresponding to the newly added item.

The extracted features are then passed to one or more trained machine learning models or classifiers 1420, preferably together with the associated event metadata. The trained machine learning models 1420 use this data determine one or more item classifications of the newly added item. These classifications may correspond to the above-mentioned labels or tags used for model training (e.g., "electronic item," "merchandise item," "non-merchandise item," "high theft risk item," etc.). In some cases, the classifications may include a unique product identifier of an item.

The event metadata may be used in various ways to inform the item classification process. For example, if the metadata specifies a store department in which the item was added to the cart, the ML models 1420 may inhibit classifications that do not correspond to that department; for example a classification of "electronics item" may be inhibited if the cart was in a clothing department when the item was added.

Although the item classification task is shown in FIG. 14 as being performed by one or more trained machine learning models, the classifications may additionally or alternatively be performed without using a machine learning model. For example, a rules-based system or decision tree may be used to determine the item classification(s). In some implementations, store location may be used to assign a default classification to the newly added item. For example, a rule may specify that if an item is added to the cart while in a high theft risk area (e.g., a liquor department), the item should be classified by default as a high theft risk item, or should be classified as such unless it can be identified from its image as a non-high-theft-risk item.

This method may also be used where the shopping cart has no camera module, or where the camera module's view is obstructed. For example, in implementations in which the carts lack cameras, the likely addition of an item to the cart can be detected via a vibration sensor in the wheel assembly (or if the cart includes a scale, by detecting a change in basket weight). In response to this event, a processor in the wheel assembly or elsewhere can determine whether the cart is (or was) in a high theft risk area at the time the item was added. If the item was added while in a high theft risk area, the cart's session record can be updated to reflect the likelihood that the cart contains a high theft risk item.

The task of classifying a newly added item may also take into consideration the classification(s) of other items already detected in the cart. For example, information about items or item types frequently purchased together (e.g., a printer and ink cartridges) may be used to increase the probabilities of certain classifications.

In some embodiments, the images captured by CVUs and/or CTUs may also be analyzed for purposes of classifying the items in the cart. The process may be similar to that shown in FIG. 14, except that multiple items shown in a single image of a cart may be classified. Also, because these images are taken from a greater distance, less fine-grained classifications (e.g., merchandise versus non-merchandise) may be used. Further, in some cases, the classifications generated from cart-mounted or non-cart-mounted cameras may be of aggregate (multi-item) cart contents rather than of a single item; for example, an aggregate classification of "merchandise," "clothing," or "beverages" may be assigned to the aggregate cart contents.

If the cart eventually approaches a store exit without any indication of a payment event, the item classifications collected over the course of the shopping session may be used in various ways to determine whether to perform an anti-theft action and/or to select one or more particular anti-theft actions to perform (e.g., wheel lock, activation of store alarm, activation of exit barrier, etc.). As one simple example, if the item(s) added to the cart are all classified as non-merchandise items, no anti-theft action would be performed. As another example, an anti-theft action (or a particular type of anti-theft action such as a wheel lock) may be performed only if at least one "high theft risk" item has been detected in the cart.

A more sophisticated method may involve scoring the cart in terms of overall theft risk. For example, a score can be generated by summing the item prices of any detected high theft risk items, or by counting the number of detected high theft risk items. Further, an anti-theft action may automatically be taken if a large number of units (e.g., ten or more) of the same item are detected in the cart, especially if the item is not an item commonly purchased in such quantities. The score generation algorithm may also consider amounts of time spent by the cart in specific store areas; for example, if a cart spends a relatively long time stopped in a high theft risk merchandise area, the algorithm may boost the score to reflect an increased theft risk, even if the system does not detect the addition of any items to the cart while in the high theft risk area.

In some embodiments, multiple scores may be maintained for a cart during a shopping session. For example, one score may represent a probability that the cart contains merchandise that has not yet been paid for (referred to herein as "unpaid" merchandise), and another score may represent a probability that the cart contains a high theft risk item. The score(s) may be updated substantially in real time as events occur during a session. For example, if a cart visits an active checkout station, the probability that it contains unpaid merchandise may be reduced to a low value; but if the cart then returns to a merchandise area without leaving the store, the probability may be increased.

A separate score may also be maintained representing the likelihood that the cart contains one or more non-merchandise items such as a purse, backpack or reusable shopping bag. A cart determined to likely contain only a non-merchandise item may be treated as having a slightly higher theft risk than a truly empty cart (e.g., due to the possibility that the non-merchandise classification of the detected item is erroneous).

Comparing Imaged Cart Contents to Transaction Records

In embodiments in which the system builds a record of data describing the imaged items detected in the cart basket (e.g., number of items detected, product categories of these items, product IDs where products are identifiable, etc.), the system can compare this record to associated payment/checkout transaction to assess whether the customer has paid for all of the items. If no corresponding payment transaction is found, or if a significant discrepancy is detected (e.g., one or more high price items were detected in the cart but are not included in the partially-matching transaction record), an appropriate anti-theft action can be initiated.

Figure 17:
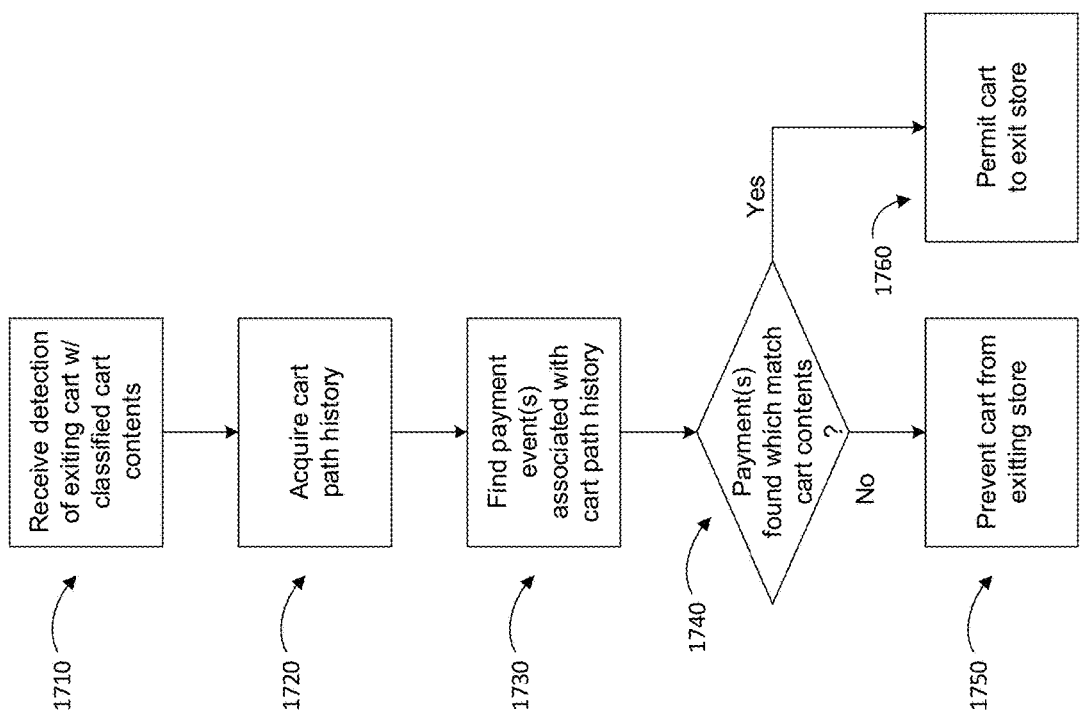
FIG. 17 illustrates a process for determining whether imaged cart contents of cart existing a store match a payment transaction record.

FIG. 17 illustrates on embodiment of such a process. This process may be implemented by a CCU, CVU, CTU, and/or other processing nodes of the system, as a shopping cart approaches a store exit. In block 1710, the process receives a notification that a cart containing system-classified items is approaching a store exit. In blocks 1720 and 1730, the system acquires the cart's path history, compares it checkout point locations to identify a payment point passed by the cart, and looks up the most recent payment transaction(s) processed by the payment point. In some cases, the payment transactions may be anonymized and/or summarized to protect customer privacy. In block 1740, the process determines whether any of these payment transactions "match" the record of cart contents. Minor discrepancies may be disregarded for purposes of determining whether a match is found. If no match is found (indicating that the customer likely did not pay for items in the cart), the cart may be prevented from exiting the store (block 1750). If a match is found, the cart may be permitted to exit the store. Various other types of anti-theft actions may additionally or alternatively be performed. For example, if a transaction record is found that nearly matches the record of cart contents, but one or more high priced (or high theft risk) items imaged in the cart are missing from the transaction record, the system may prompt store personnel to check the customer's cart and receipt for the high priced item(s).

Figure 18:
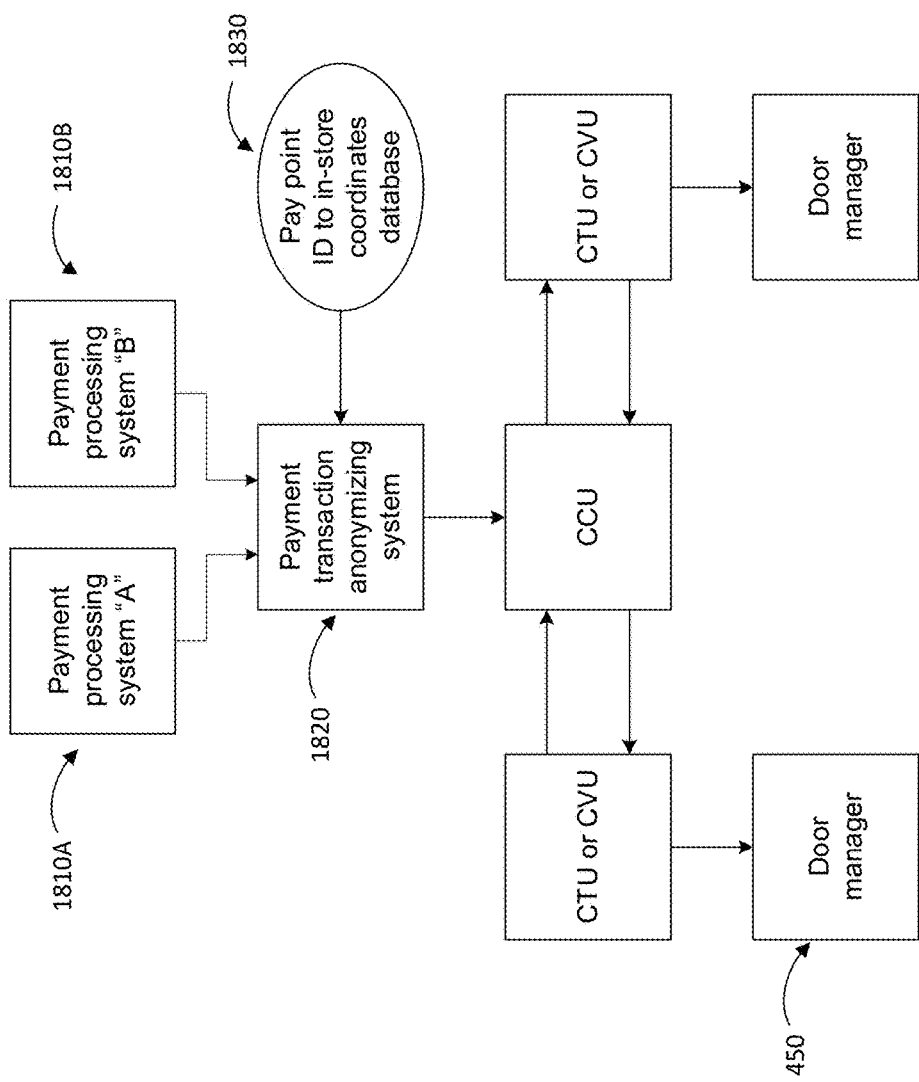
FIG. 18 illustrates a set of components that may be used to implement the process of FIG. 17.

FIG. 18 illustrates a set of system components that may be used to implement the process of FIG. 17. The illustrated door managers 450 may operate as described above with reference to FIG. 1A. Two illustrative payment processing systems, 1810A and 1810B, communicate their respective transaction records to a payment transaction anonymizing system or node 1820. One payment processing system may, for example, handle self-checkout transactions, while the other may handle register/cashier-based transactions. Another payment processing system might handle payments made through a customer smartphone. A database 1830 stores in-store coordinates of the pay points that may be used by customers. In addition to anonymizing the transaction records by removing any personally identifying information (including retail store loyalty number, etc.), the anonymizing system preferably (1) associates each transaction record with the in-store coordinates of the payment point used, and (2) generates payment transaction metadata that facilitates the matching process. This enables the CCU (or a CTU or CVU) to identify the recent transaction records that match the cart path followed by a cart in the store's checkout area and perform the comparison described above. In the illustrated example of FIG. 18, the door managers are instructed by a CTU or CVU on any anti-theft actions to perform.

Figure 19:
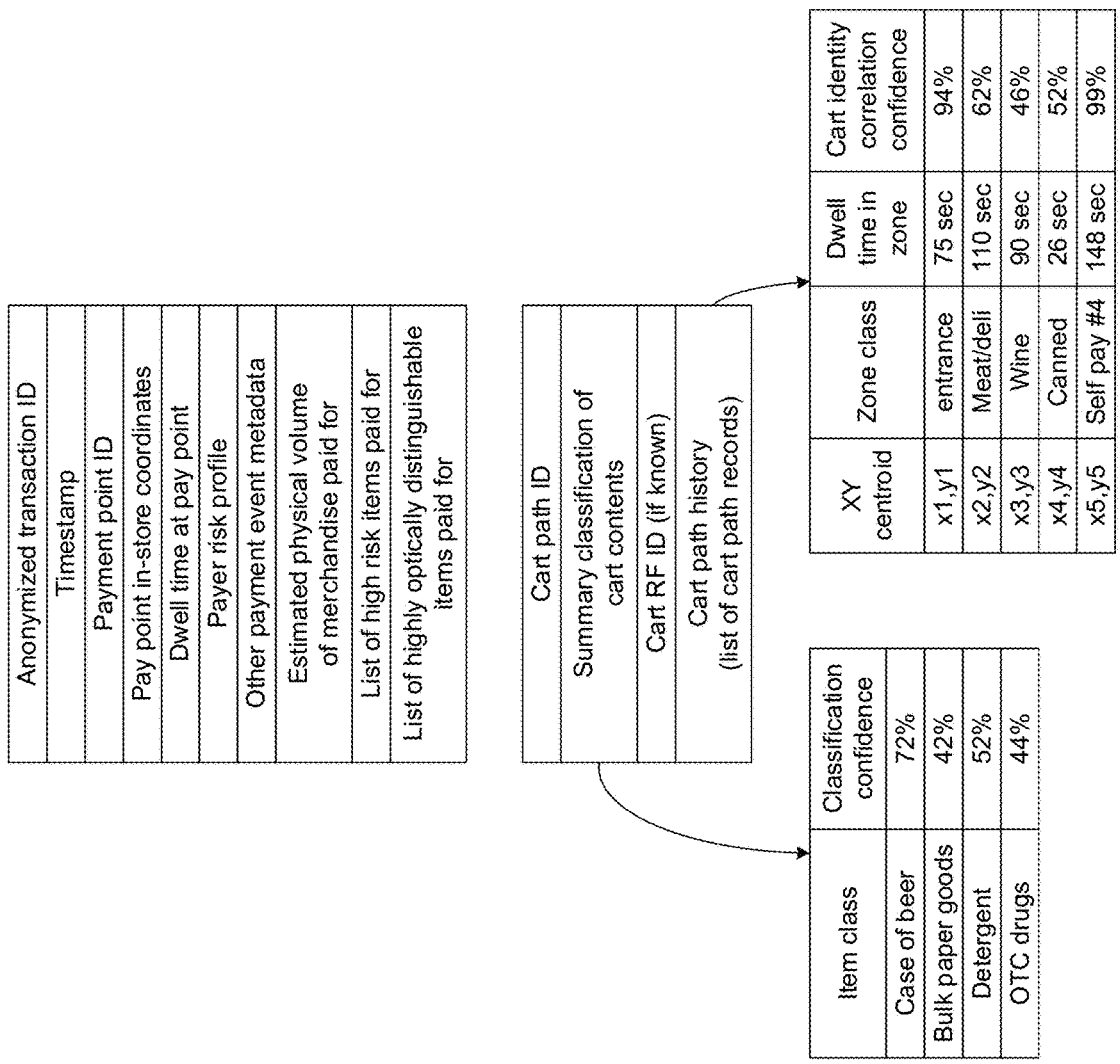
FIG. 19 illustrates the types of data records that may be generated and used in the system of FIG. 18 and the process of FIG. 17.

FIG. 19 illustrates the types of data records that may be generated and used in the process of FIG. 17. The top block in FIG. 19 shows an example of an anonymized and augmented transaction record generated by the payment transaction anonymizing system 1820 for a given transaction. This anonymized transaction record includes an anonymized transaction ID, a transaction timestamp, a payment point ID and the associated in-store coordinates, an indication of dwell time at the payment point, a payer risk profile (described below), other payment event metadata, the estimated physical volume of the merchandise paid for, a list of high theft risk items paid for, and a list of highly optically distinguishable items paid for. The payer risk profile may, for example, be a risk score that is based on the payment instrument used by the customer and/or other information about the customer (e.g., whether they used a loyalty number). The foregoing are merely examples of types of information that may be included in an anonymized transaction record. Further, in some embodiments, the comparisons may be performed using actual transaction records rather than anonymized records.

The lower half of FIG. 19 shows data collected by the cart monitoring system (e.g., by a CVU or CTU) for a given shopping cart session. In this example, the data includes a cart path ID, a summary of the cart contents classifications (shown in example form in the lower left block), the cart's RF ID, and the cart's path history (shown in example form in the lower right block). In this example, the cart spent 148 seconds at self-pay station #4. Thus, the summary of classifications of contents of this cart may be compared to recent anonymized transaction records corresponding to this self-pay station. The confidence scores for particular merchandise categories may be used determine how much weight to give to each such merchandise category in determining whether a match exists.

Emergency Exit Usage

In some implementations, a CVU or CTU may be mounted to capture images of a store emergency exit, including the approach to the emergency exit. These images may be used to detect push-out theft attempts through the emergency exit. The CVU or CTU may be mounted on the wall above the emergency exit or hanging from the ceiling. Images captured by this CTU or CVU may be used to classify cart contents as described above, and may also be used to associate the imaged carts or cart tracks with cart IDs using the correlation methods described above.

The captured images from this CVU or CTU may also be analyzed to detect an event in which a cart containing merchandise (or a particular classification of merchandise) goes through, or begins to go through, the emergency exit. When such an event is detected, an associated door manager may lock the cart's wheel and/or perform another anti-theft action. If a cart with merchandise is merely parked or moved close to the emergency exit, typically no anti-theft action will be taken.

Further Imaging Features

The performance of the imaging subsystem (see discussion above) can include one or more of the following features. This can, for example, improve the speed, performance, and/or accuracy of the system's ability to identify, map, and/or classify the contents of the cart basket.

Image Correction to a Reference Geometry

Given that the focal plane of any given camera is centered at a known xyz location (the coordinate system is arbitrary as long as it is consistent: herein positive x is assumed to be a consistent direction that is meaningful to shopping cart tracks, e.g., the alignment of checkout aisle, y is in the horizontal plane and orthogonal to x, and z is local vertical), and given that the boresight of the camera is at known angles theta and phi to the xyz coordinate system, and given that the floor of a shopping cart basket is close to horizontal (<<5 degrees difference), we can take the raw pixel region corresponding to all pixels included within the shopping cart basket's outline in pixel xy coordinate space and transform those pixels to the projection of the pixels onto a constant radius sphere. In some implementations, a good value for the radius of the sphere is the distance from the center of the cart basket outline to the camera focal plane when the boresight line of the camera intersects the center of the cart basket outline.

If for some reason the focal plane is rotated about the boresight such that neither the pixel x nor pixel y coordinates are horizontal, then an additional rotation of the pixel region may be needed. This correction can take into account, for example, not only the camera to cart basket geometry but also any refractive nonidealities in the camera lens.

The specific transformation and resampling to be used depends, among other things, on the availability of compute power, the effective size in pixels of the area of interest, the accuracy to which the specific camera orientation is known, etc. In some implementations, a bilinear (trapezoidal) transformation calculated at the 25% and 75% of each edge is used. Certain variants use other algorithms (e.g., bicubic, Lanczos).

An advantage of performing the correction is that both the shopping cart basket itself and more importantly the basket's contents appear approximately the same regardless of the camera to shopping cart geometry, which in turn can result in higher fidelity models in the featurespace on which the ML (machine learning) inferencing applies (e.g., an RCNN).

Frame to Frame Differencing

Differencing between image frames, where each frame is segmented to extract the pixels corresponding to the shopping cart basket area, can detect relative motion of objects in the basket (e.g., children), which can be used to affect the higher level behavior of the system. For example, if a child is provisionally detected as being in the shopping cart, the heuristics used to infer a probable theft event might be adjusted. In some embodiments, color changes of corresponding pixels in successive frames, without changes in edge location, might be indicative of illumination changes that can be corrected in colorspace transformation (see below).

Multiframe Image Combining

Since the shopping cart is generally moving relative to the non-cart-mounted camera(s), multi-frame image combining followed by super-resolution processing can be applied to the sequence of still images to improve the quality of the image being applied to the next stage in the image processing pipeline. Additional information may be collected and used to improve the accuracy of this process; for example, data regarding the cart's incremental motion over a set of frames may be used to improve the super-resolution processing.

Colorspace Transformation

In certain implementations, the conventional RGB or YUV colorspace produced by most cameras may not be optimal for distinguishing different sorts of shopping cart basket contents, particularly given the potentially highly variable lighting conditions (such when part of the shopping cart basket is in direct sunlight and the other part is in artificial light or reflected sunlight). As such, a colorspace transformation may be performed.

An example colorspace transformation is infer the time-dependent local illuminant at the basket surface (e.g., by the color of background pixels in the vicinity of the shopping cart such as floor pixels in previous frames) and extract a two or three element colorspace vector per basket pixel where the color vector is a reradiating surface in, e.g., S-V colorspace that would give the observed pixel given the inferred illuminant.

As a subset of the more general approach in the previous paragraph, adjusting based on some sort of average illuminant may capture much of the difference between day/night, sunny/cloudy, etc.

Another example colorspace transformation can be contrast expansion, which could be performed, for example, in RGB colorspace or in a 1:1 linearly transformed colorspace with brightness in a single component. Two illustrative such colorspaces are YUV or Y'UV and HSL.

Extended Colorspace

The colorspace of the cameras used in the system (which typically have a CMOS CCD as the underlying focal plane array) can be extended into the near IR or near UV. This may be achieved in some embodiments by replacing the lens in an off-the-shelf camera with a lens that lacks the color filters typically included in such cameras, such that non-visible wavelengths pass through. Because the imagers and other integrated circuits included in off-the-shelf cameras are typically capable of processing near IR and near UV, no other changes to the cameras are needed to achieve colorspace extension. Colorspace extension can also be achieved using nonstandard Bayer masks or beamsplitters followed by band-specific filters. Such non-standard Bayer masks are available, for example, from ON Semiconductor (Phoenix, Ariz.) for their other commodity imaging chips. The extension of the camera colorspace can improve the accuracy of the image analysis tasks described herein.

Three Dimensional Image of Shopping Cart Basket Content

Some embodiments are configured to produce a 3-D image of the basket and/or the basket's contents. A three dimensional image of the shopping cart basket and/or its contents can improve the system's ability to infer the presence or absence of merchandise which has not been paid for. In various embodiments, the 3D image will not be a volume, but rather a surface, where the color (possibly in an extended colorspace as described above) is derived from the camera's or cameras' 2D image and the relative height of the surface along the vector from camera to shopping cart basket is determined by one of the methods described below, or by another method.

There are multiple practical ways of producing such an image. In some embodiments, the sensors 460 can be used to produce the image. In some embodiments, one or more of the following are used to produce the image:

Stereo Cameras: Given a known camera to shopping cart basket geometry as described above, along with a known separation between the two focal planes of the stereo array, a stereo image can be calculated.

Time Of Flight Array: A laser diode time of flight array, such as the ADDI9036 from Analog Devices (Norwood, Mass.), collocated with the camera can provide a 3-D surface map.

Millimeter wave (MMW) radar: A millimeter wave radar, such as the RM68-01 from Smart Radar System (Gyeonggi-do, Korea), can provide a one dimensional (distance versus angle) surface map. The surface map can be combined over multiple frames of a moving shopping cart to produce the desired 3-D surface map (this could be considered a special case of an Inverse Synthetic Aperture Radar or ISAR). In certain variants, a 2D MMW radar array, such as the "Retina" radar also from Smart Radar System, can provide a full 3D surface map in a single scan.

Ultrasonic: A single source, line element receiver ultrasonic array can provide the same sort of line cut of the shopping cart basket contents as a linear MMW radar, such as the RM68-01 mentioned previously.

Combination of imaging effects: Any subset of the various image-processing techniques listed above could be combined.

Enhanced Training Set/Model Space

Training Set Special Elements

In various implementations, the training set (of images) can be populated not only with images of normal carts that are loaded with merchandise and other carts which do not contain merchandise (e.g., empty carts), but also of carts containing objects known to be easily confused with merchandise in a naïve classification algorithm. Examples of such objects are: purses, backpacks, and empty shopping bags (e.g., reusable shopping bags).

Shopping Cart Geometry Inferencing

Shopping carts are three-dimensional objects. Under typical geometric constraints of where cameras can be mounted, camera to cart distance will usually be less than ten meters.

Image segmentation to extract only the shopping cart basket can be made much more efficient if the shopping cart's 3D geometry is known.

In certain cases, a given facility (e.g., a store) will at a given time contain only a limited number (e.g., one, two, or three) of different models of shopping cart. A library of shopping cart geometry models can be initially populated by importing the mechanical CAD models from shopping cart manufacturers, and then learning the population of a given store over time. In some implementations, the library can be grown over time by capturing image sequences of carts whose basket geometry is unrecognized. In certain embodiments, the 3D cart geometry can be determined and/or inferred from the image stream via offline image processing techniques.

Improved Transfer Learning for Different Lighting Conditions

As an alternative to or in conjunction with the colorspace transformation described above and/or extended colorspace described above, images captured for training set purposes can be synthetically manipulated to expand the training set to include what those images would have looked like under different lighting conditions.

Association of Cart Images with RF Addresses

In some cases, a shopping cart is told to stop via wireless command where the command addresses a single shopping cart, such as by a unique MAC address (sometimes a multicast address as described above). The shopping cart can be identified as one that should be stopped (e.g., because the cart has high likelihood of containing unpaid merchandise) based at least partly on analysis of imagery. Thus, a cart known by its location in the field of view of a camera (e.g., pixel coordinates of the center of the cart) can be correlated to a known RF address.

Certain methods of performing this correlation are described above, such as in the Unicast Addressing discussion. In some embodiments, the radiolocation system discussed above can include RSSI information. While RSSI is generally notably less accurate then certain other technologies mentioned, in some cases, a series of short range RSSI nodes (e.g., distributed in the vicinity of the camera(s)' field of view) may provide sufficient accuracy to disambiguate which cart in the field of view has which RF address. In some implementations, as an alternative or addition to the phase slope method, a series of phase difference versus frequency measurements can be processed with the impulse response method. In certain variants, an alternative or addition to a magnetic signature is an optical signature as the cart passes under or near various elements of store lighting or other structures. For a RF location antenna array physically collocated with or close to a camera that hangs from the ceiling looking down, Angle of Arrival (AoA) processing on the RF tends to provide better correlation with the image-based cart tracking data than phase based ranging.

One method that may be used to identify the shopping carts shown in images captured by the CTUs and/or CVUs involves correlating cart motion as detected in a sequence of images with cart speed as detected by a cart's wheel assembly. (No such correlation is needed for images captured by any cart-mounted camera modules 217, as these camera modules transmit the images they capture together with corresponding unique cart identifiers.) For example, a CVU or set of adjacent CVUs may capture a sequence of images showing multiple carts moving in an area of the store, and may analyze the image sequence to estimate the position and heading of each such cart at multiple times during the period in which the cart is within the field of view of the camera(s).

Note that for shopping carts on which all (normally four) wheels are castered, the heading is not in general the same as the direction of the cart's velocity vector. For such carts, the cart velocity vector associated with the image sequence can be approximated by applying a filter, such as a low pass finite impulse response filter or a Kalman filter, to the successive differences in a particular reference point on the cart in each image. Concurrently with the capture of these images, the wheel assembly of each such cart may measure, and report on the network (together with the cart/wheel's unique ID), the rotation rate of its respective wheel. (Because the wheel diameters are known—typically 5 inches— the wheel rotation rate can be converted into cart speed.) By performing the best fit between the motion history from the images and the wheel-based cart speed versus time, the system (e.g., a CVU or CCU) can map a specific cart shown in a specific image to the cart's ID.

In one embodiment, a cart's wheel assembly monitors wheel rotation by using a magnet-activated switch such as the RR122-1B52-511 Tunneling Magneto-Resistive (TMR) switch from Coto Technology (North Kingstown, R.I.) on the non-rotating part of the wheel assembly to detect the passage of a magnet that rotates with the wheel, and by recording rotation detection timestamps. To improve the resolution of wheel rotation detection, multiple magnets (rather than a single magnet) can be mounted around the inner circumference of a wheel with equal spacing, such that rotation events are detected more frequently. If N equally spaced magnets are used within a wheel, incremental rotation can be detected every $\pi D/N$ inches. For example, for a wheel diameter of 5 inches and N=3 magnets, velocity can be measured every six inches of travel. As an alternative to using magnets, eddy currents induced in one or more conductive targets that rotate with the wheel can be detected, such as by using the LDC0851 Differential Inductive Switch from Texas Instruments (Dallas, Tex.) and a suitable inductor in the non-rotating part of the wheel assembly.

If a given cart includes rotation sensors in both a front wheel and a back wheel, the sensed rotation rates of these two wheels can be compared to determine whether the cart is likely turning. A turn detected through this process can be matched to a turning event detected in the image sequence during the correlation process.

In some cases, the wheel assemblies may also track and report cart heading, in which case the correlation process may also compare the cart headings reported by the carts to cart headings determined from the image sequences.

Figure 15:
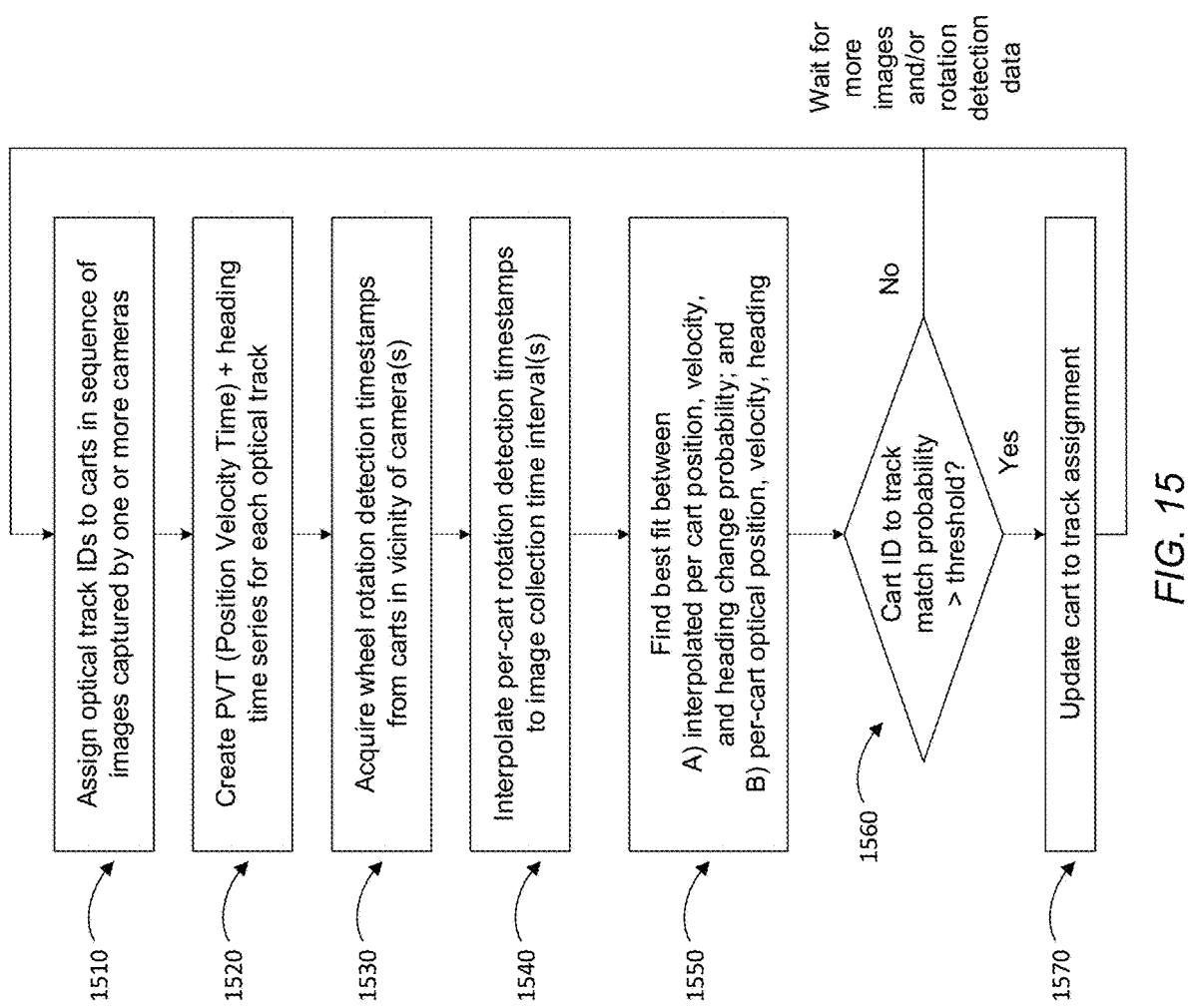
FIG. 15 illustrates a process for associating an imaged cart path with a unique cart ID using data collected by wheel assemblies of the carts.

The above-described process is illustrated in FIG. 15. This process may, for example, be implemented by a CVU, CCU, CTU, other processing node, or a combination of nodes. In block 1510, the process analyzes a sequence of images captured by one or more non-cart-mounted cameras (such as the cameras of one or more CVUs or CTUs), and assigns optical track IDs to the carts detected in these images. At this point the unique IDs (e.g., wheel assembly IDs or RF IDs) of these carts are not yet known. The term "track" in this description refers generally to a detected cart path together with the associated data, such as image timestamps, associated with the path. In block 1520, the process generates a PVT (Position, Velocity Time) and heading time series for each optical track. In block 1530, the process acquires wheel rotation detection timestamps from the carts in the vicinity of the camera(s). The cart wheel assemblies may report these timestamps on the network automatically/periodically or upon receiving a query for such data. For example, an access point (AP) near the camera(s) may send a command that instructs all wheel assemblies that are within a certain RSSI based range of the access point to report their last N seconds of wheel rotation data.

In block 1540, the process uses interpolation to transform each sequence of rotation detection timestamps into a sequence corresponding to the image collection time interval(s). In block 1550, the process searches for a best fit between (A) interpolated per-cart position, velocity, and heading change probability, and (B) per-cart optical position, velocity and heading. In block 1560, if one or more matches are found with a sufficient degree of confidence, a cart-to-track assignment table is updated. The process may be repeated continuously as image sequences and wheel rotation data become available. As mentioned above, the process may also be implemented without considering cart headings.

FIG. 16 illustrates example data tables that may be maintained by the process of FIG. 15. The three tables labeled Cart RF ID #1, Cart RF ID #2 and Cart RF ID #3 contain the wheel rotation timestamp data of three respective carts. In this example, each such cart reports such data for both a front wheel and a back wheel, although the process may be implemented with data from only one wheel. Each table contains the rotation timestamps of the front wheel and back wheel. Because Cart RF ID #2 has reported more front wheel rotations than back wheel rotations over the same time period, the cart has presumably made a turn (and thus will be more likely to match with a track that contains a change of heading at about the same time as when the excess of front wheel rotations occurred). The three tables labeled "cart image track" contain the respective data sets for three carts/paths, A, B and C, detected in an image sequence. For example, the table for "Cart image track A" contains five entries that each contain location data, heading data, and a timestamp, for a particular cart track. The lower-most table in FIG. 16 shows the results of the "best fit" search in FIG. 15, with the percentage values representing match probabilities. In this example, Cart RF ID #1 most likely matches image track B, and Cart RF ID #2 most likely matches image track A. The lower match confidence or probability for Cart RF ID #2 may serve as a basis for allowing this cart to exit the store even if it likely contains unpaid merchandise. The available data is insufficient to match Cart RF ID #3 to any of the three image tracks, for example, because Cart RF ID #3 is not within the FOV of any of the cameras.

In embodiments in which the shopping carts 30 include camera modules 217, another method that may be used to identify imaged carts involves comparing an image captured by the onboard camera to cart images captured by a CTU or CVU. For example, when a cart is imaged by a CTU or CVU as it approaches a store exit, the image can be compared with the most recent images captured by camera modules 217 of active shopping carts in the same vicinity. If a matching image from an onboard camera module is found (indicating similar shopping cart contents), the cart ID or address associated with this matching image can be associated with the image from the CTU or CVU. The task of comparing two images from different respective cameras preferably involves warping the images to a common reference plane based on the known geometries involved (e.g., camera location and vector to cart basket, lens transfer function to pixel address, etc.). A neural network based comparison engine may then compare the two warped images based, e.g., on features extracted from the images.

In some embodiments, the carts may be marked or labeled with bar codes or other readable IDs that can be detected in the images captured by a CTU or CVU. In such embodiments, the above-described correlation processes can be avoided, or can be used only when a readable ID cannot be read.

In some embodiments, an RF address is identified, correlated, and/or associated with another temporarily collocated device. For example, a person pushing a shopping cart may have a smartphone or other electronic device of some sort, and the system or other store infrastructure can be configured to track the smartphone within the store to some level of accuracy. By associating a given shopping cart RF address with a given smartphone ID, the tracked motion of the smartphone can be correlated to the motion of the cart. The specific tracked ID of the smartphone may depend on which protocol the tracking infrastructure uses. For example, the ID might be the IMEI if tracked via cellular, IEEE 802.11 MAC ID if tracked via an 802.11 access point, a BLE advertising UUID, etc.

In some embodiments, the shopping cart can be equipped with hardware and software to enable the retail store tracking infrastructure to track the cart. This additional hardware might be, for example, an IEEE 802.11n or 802.11ac transceiver to make use of tracking capability in an in-store IEEE 802.11 infrastructure. (The technical characteristics of 802.11ac facilitate the localization of an emitter in comparison to 802.11n.) Location tracking can also be achieved using Bluetooth. For example, version 5.1 of the Bluetooth standard includes angle-of-arrival radiolocation, and a proposed version 5.3 adds a standard ranging capability. As another example, cart location can be tracked using the UWB (Ultra Wideband) standard. As described above, the hardware for tracking cart location using these and other technologies may be incorporated into a cart's wheel assembly, a cart's camera module, and/or some other component that mounts to the cart.

ADDITIONAL INFORMATION

The various illustrative logical blocks, modules, and processes described herein may be implemented or performed by a machine, such as a computer or computer system, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, graphics processor, tensor processor, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration. The various processors and other computing devices of the system described herein operate collectively as a computing system, preferably under the control of executable program instructions stored on non-volatile memory devices and/or other types of non-transitory storage devices.

Further, certain implementations of the object location systems of the present disclosure are sufficiently mathematically, computationally, or technically complex that application-specific hardware (e.g., FPGAs or ASICs) or one or more physical computing devices (utilizing appropriate executable instructions) may be necessary to perform the functionality, for example, due to the volume or complexity of the calculations involved (e.g., analyzing the image data using computer vision or machine learning techniques) or to provide results (e.g., determining whether a shopping basket nearing a store exit is at least partially loaded) substantially in real-time (e.g., so that an anti-theft action can be performed before or while the shopping basket is near the store exit).

The blocks or states of the processes described herein may be embodied directly in hardware, in a software module stored in a non-transitory memory and executed by a hardware processor, or in a combination of the two. For example, each of the processes described above may also be embodied in, and fully automated by, software modules (stored in a non-transitory memory) executed by one or more machines such as computers or computer processors. A module may reside in a non-transitory computer readable medium such as RAM, flash memory, ROM, EPROM, EEPROM, registers, hard disk, an optical disc, memory capable of storing firmware, or any other form of computer-readable (e.g., storage) medium. A computer-readable medium can be coupled to a processor such that the processor can read information from, and write information to, the computer-readable medium. In the alternative, the computer-readable medium may be integral to the processor. The processor and the computer-readable medium may reside in an ASIC. The computer-readable medium may include non-transitory data storage (e.g., a hard disk, non-volatile memory, etc.).

The processes, methods, and systems may be implemented in a network (or distributed) computing environment. For example, the central control unit or base station or other components of a cart containment system can be implemented in a distributed, networked, computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network, a terrestrial or satellite network, or any other type of communication network.

Depending on the example, certain acts, events, or functions of any of the processes or methods described herein can be performed in a different sequence, may be added, merged, or left out altogether. Thus, in certain examples or implementations, not all described acts or events are necessary for the practice of the processes. Moreover, in certain examples or implementations, acts or events may be performed concurrently, e.g., through multi-threaded processing, interrupt processing, or via multiple processors or processor cores, rather than sequentially. In any apparatus, system, or method, no element or act is necessary or indispensable to all examples and implementations, and the disclosed apparatus, systems, and methods can be arranged differently than shown or described.

Conditional language used herein, such as, among others, "can," "could," "might," "may," "e.g.," and the like, unless specifically stated otherwise, or otherwise understood within the context as used, is generally intended to convey that certain examples or implementations include, while other examples or implementations do not include, certain features, elements and/or states. Thus, such conditional language is not generally intended to imply that features, elements and/or states are in any way required for one or more examples or implementations or that one or more examples or implementations necessarily include logic for deciding, with or without author input or prompting, whether these features, elements and/or states are included or are to be performed in any particular example or implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain examples or implementations require at least one of X, at least one of Y and at least one of Z to each be present. In this specification and the appended claims, the articles "a" or "an" or "the" when referring to an element mean one or more of the element, unless the context clearly indicates otherwise.

While the above detailed description has shown, described, and pointed out novel features as applied to various examples and implementations, it will be understood that various omissions, substitutions, and changes in the form and details of the logical blocks, modules, and processes illustrated may be made without departing from the spirit of the disclosure. As will be recognized, certain examples of the inventions described herein may be embodied within a form that does not provide all of the features and benefits set forth herein, as some features may be used or practiced separately from others.

What is claimed is:

1. A system for reducing push-out theft, comprising:
a camera positioned to capture images of contents of shopping carts associated with a store, wherein the shopping carts have different respective identifiers; and
a computing system comprising one or more processors, the computing system programmed to implement at least:
an item classifier that assigns classifications to items detected in the shopping carts based on analyses of the images using a trained machine learning model; and
an exit manager that determines whether to authorize a shopping cart to exit the store based on at least (1) a classification assigned by the item classifier to at least one item in the shopping cart, and (2) indicia of whether the at least one item has been paid for;
wherein the computing system is additionally programmed to determine the identifier of a shopping cart imaged by said camera and to use the determined identifier to send a shopping-cart-specific command to the imaged shopping cart, said command based on an exit authorization determination made by the exit manager.

2. The system of claim 1, wherein the camera is mounted in a fixed location in the store.

3. The system of claim 2, wherein the imaged shopping cart comprises at least one wheel assembly that senses, and reports on a wireless network, wheel rotation events, and wherein the computing system is programmed to use the wheel rotation events to match the identifier of the imaged shopping cart to a cart track detected in a sequences of images captured by the camera.

4. The system of claim 1, wherein the camera is mounted to the shopping cart.

5. The system of claim 4, wherein the camera is part of a cart-mounted camera module that includes a processor configured to assess whether an item has been added to the shopping cart by comparing a first image captured by the camera to a second, subsequent image captured by the camera.

6. The system of claim 5, wherein the camera module further comprises a wireless transceiver, and the processor is configured to use the wireless transceiver to upload the second image on a wireless network for analysis in response to detecting a possible addition of an item to the shopping cart.

7. The system of claim 1, wherein the item classifier is configured to classify items detected in a shopping cart as merchandise versus non-merchandise items.

8. The system of claim 1, wherein the item classifier is configured to assign merchandise category classifications to items detected in a shopping cart.

9. The system of claim 1, wherein the item classifier is configured to classify an item added to the shopping cart based at least partly on a store location of the shopping cart at a time the item is added.

10. The system of claim 1, wherein the computing system is further programmed to:
identify, based on a monitored location of the shopping cart, a payment point potentially used to pay for merchandise in the shopping cart; and
compare a record of a transaction executed by the pay point to item classifications assigned by the item classifier to items detected in the shopping cart.

11. The system of claim 10, wherein the computing system is further configured to detect, based on the comparison, an underpayment event in which a customer pays for less than all items in the shopping cart.

12. The system of claim 10, wherein the computing system is further configured to determine whether the shopping cart returns to a merchandise area after payment without first exiting the store.

13. The system of claim 1, wherein the camera has a wavelength response that encompasses near IR and/or near UV.

14. A process for reducing push-out theft, comprising:
monitoring a location of a shopping cart in a store, said shopping cart being one of a plurality of shopping carts that are associated with the store, said shopping carts having different respective identifiers;
detecting an event in which an item is added to the shopping cart;
assigning a classification to the item based on at least one of the following: (1) a location of the shopping cart in the store at a time of the event, as determined from said monitoring, and (2) an image captured by a camera of the item in the shopping cart;
determining the identifier of the shopping cart;
subsequently, detecting that the shopping cart is exiting the store without indicia of an associated payment transaction;
in response to determining that the shopping cart is exiting, determining, based at least partly on the classification assigned to the item, whether to perform an anti-theft action; and
transmitting a shopping-cart-specific message to the shopping cart using the determined identifier, said message based on the determination of whether to perform an anti-theft action;
said process performed under control of program instructions executed by one or more processors.

15. The process of claim 14, wherein detecting said event comprises detecting, with a vibration sensor mounted to the shopping cart, vibration caused by the item being added to the shopping cart.

16. The process of claim 14, wherein the shopping cart comprises a camera module having a camera and a processor, and wherein detecting said event comprises, by the camera module, comparing a first image captured by the camera to a second, subsequent image captured by the camera to determine whether contents of the shopping cart have changed.

17. The process of claim 16, wherein the camera module further comprises a wireless transceiver, and the process further comprises, by the camera module, uploading the second image, or a representation of the second image, on a wireless network for analysis in response to detecting a change to basket contents.

18. The process of claim 14, wherein assigning a classification to the item comprises using a trained machine learning model to classify the item as merchandise versus non-merchandise.

19. The process of claim 14, wherein assigning a classification to the item comprises determining a merchandise identifier of the item.

20. The process of claim 14, wherein assigning a classification to the item comprises assigning a merchandise category to the item.

21. The process of claim 14, wherein the classification is assigned based at least partly on an image captured by a camera of the item in the basket of the shopping cart.

22. The process of claim 14, wherein the camera is mounted in a fixed location in the store.

23. The process of claim 22, wherein the shopping cart comprises a wheel assembly that senses, and reports on a wireless network, wheel rotation events, and wherein the process further comprises using the reported wheel rotation events to match the identifier of the shopping cart to a cart track detected in a sequence of images captured by the camera.

24. The process of claim 14, wherein the camera is mounted to a basket of the shopping cart.

25. The process of claim 14, wherein the classification is assigned based at least partly on a location of the shopping cart in the store at a time of the event.

26. The process of claim 14, further comprising:
identifying, based on the monitored location of the shopping cart, a payment point potentially used to pay for merchandise in the shopping cart; and
comparing a record of a transaction executed by the pay point to item classifications assigned to one or more items detected in the basket of the shopping cart.

27. The system of claim 1, wherein determining the identifier of the shopping cart comprises comparing cart motion data reported on a wireless network by the shopping cart with cart motion data detected from a sequence of images captured with said camera.

28. The process of claim 1, wherein the exit manager is configured to authorize a shopping cart containing one or more items to exit the store in response to a determination that the one or more items consist of non-merchandise items, as determined by said item classifier.

29. The system of claim 1, wherein the computing system is programmed to determine said identifier of the imaged shopping cart at least partly by comparing cart motion data reported on a wireless network by the imaged shopping cart with cart motion data detected from a sequence of images showing the shopping cart moving in the store.

30. The system of claim 14, wherein determining whether to perform an anti-theft action comprises determining whether a set of one or more items in the shopping cart consists of non-merchandise items.

31. A system for reducing push-out theft, comprising:
a camera positioned to capture images of contents of a shopping cart associated with a store, said camera mounted in a fixed location in the store; and
a computing system comprising one or more processors, the computing system programmed to implement at least:
an item classifier that assigns classifications to items detected in the images using a trained machine learning model; and
an exit manager that determines whether to authorize the shopping cart to exit the store based on at least (1) a classification assigned by the item classifier to at least one item in the shopping cart, and (2) indicia of whether the at least one item has been paid for;
wherein the shopping cart comprises at least one wheel assembly that senses, and reports on a wireless network, wheel rotation events, and wherein the computing system is programmed to use the wheel rotation events to match an identifier of the shopping cart to a cart track detected in a sequences of images captured by the camera.

32. The system of claim 31, wherein the wheel assembly additionally reports a heading of the shopping cart on the wireless network, and the computing system is programmed to additionally use said heading to match the identifier of the shopping cart to the cart track.

33. The system of claim 31, wherein the computing system is configured to use the identifier of the shopping cart to transmit to the shopping cart a shopping-cart-specific command that is based on a determination by the exit manager of whether the shopping cart is authorized to exit the store.

34. A process for reducing push-out theft, comprising:
monitoring a location of a shopping cart in a store;
detecting an event in which an item is added to the shopping cart;
assigning a classification to the item based on at least one of the following: (1) a location of the shopping cart in the store at a time of the event, as determined from said monitoring, and (2) an image captured by a camera of the item in the shopping cart, said camera mounted in a fixed location in the store;
subsequently, detecting that the shopping cart is exiting the store without indicia of an associated payment transaction; and
in response to determining that the shopping cart is exiting, determining, based at least partly on the classification assigned to the item, whether to perform an anti-theft action;
wherein the shopping cart comprises a wheel assembly that senses, and reports on a wireless network, wheel rotation events, and wherein the process further comprises using the reported wheel rotation events to match an identifier of the shopping cart to a cart track detected in a sequence of images captured by the camera;
said process performed under control of program instructions executed by one or more processors.

35. The process of claim 34, wherein the wheel assembly additionally reports a heading of the shopping cart on the wireless network, and the process further comprises using the reported heading to match the identifier of the shopping cart to the cart track.

36. The process of claim 34, further comprising using the identifier of the shopping cart to transmit a shopping-cart-specific message that is based on the determination of whether to perform the anti-theft action.

* * * * *

UNITED STATES PATENT AND TRADEMARK OFFICE
CERTIFICATE OF CORRECTION

PATENT NO. : 11,208,134 B2
APPLICATION NO. : 17/196843
DATED : December 28, 2021
INVENTOR(S) : Carter et al.

Page 1 of 1

It is certified that error appears in the above-identified patent and that said Letters Patent is hereby corrected as shown below:

In the Claims

In Column 54, at Line 57, in Claim 28, delete "process" and insert --system--.

In Column 55, at Line 1, in Claim 30, delete "system" and insert --process--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*